(12) United States Patent
Takakuwa et al.

(10) Patent No.: US 7,787,743 B2
(45) Date of Patent: Aug. 31, 2010

(54) INFORMATION RECORDING MEDIUM, INFORMATION RECORDING DEVICE AND METHOD, INFORMATION REPRODUCTION DEVICE AND METHOD, INFORMATION RECORDING/REPRODUCTION DEVICE AND METHOD, COMPUTER PROGRAM FOR CONTROLLING RECORDING OR REPRODUCTION, AND DATA STRUCTURE CONTAINING CONTROL SIGNAL

(75) Inventors: Nobuyuki Takakuwa, Saitama (JP); Yasuko Fukuda, Saitama (JP); Takao Sawabe, Saitama (JP); Tohru Kanegae, Saitama (JP); Masanori Nakahara, Saitama (JP); Takeshi Koda, Saitama (JP)

(73) Assignee: Pioneer Corporation, Tokyo (JP)

( * ) Notice: Subject to any disclaimer, the term of this patent is extended or adjusted under 35 U.S.C. 154(b) by 1179 days.

(21) Appl. No.: 11/377,294

(22) Filed: Mar. 17, 2006

(65) Prior Publication Data

US 2006/0210250 A1 Sep. 21, 2006

Related U.S. Application Data

(62) Division of application No. 10/562,948, filed as application No. PCT/JP2004/009487 on Jun. 29, 2004.

(30) Foreign Application Priority Data

Jul. 1, 2003 (JP) ............................. 2003-189821

(51) Int. Cl.
*H04N 5/91* (2006.01)
*H04N 7/00* (2006.01)
*H04N 7/26* (2006.01)
*H04N 5/00* (2006.01)

(52) U.S. Cl. ...................... 386/46; 386/124; 386/125; 386/126

(58) Field of Classification Search .................. 386/1, 386/46, 95, 124–126
See application file for complete search history.

(56) References Cited

U.S. PATENT DOCUMENTS

| 5,915,067 | A | 6/1999 | Nonomura et al. |
| 5,963,704 | A | 10/1999 | Mimura et al. |
| 6,067,400 | A | 5/2000 | Saeki et al. |
| 6,134,200 | A | 10/2000 | Timmermans |
| 6,226,446 | B1 * | 5/2001 | Murase et al. ............... 386/95 |

(Continued)

FOREIGN PATENT DOCUMENTS

CN 1212569 A 3/1999

(Continued)

*Primary Examiner*—Marsha D Banks Harold
*Assistant Examiner*—Marc Dazenski
(74) *Attorney, Agent, or Firm*—Young & Thompson

(57) ABSTRACT

An information recording medium (100) on which there are recorded: a series of content information which includes an image portion which can be a background image; button information (301) for defining a button menu which allows an operation as for the content information and which is displayed during the reproduction of the content information; and play list information (120) for defining reproduction sequence of the content information by a unit of item, which constitutes the content information and which is accessible upon reproduction, the button information including a plurality of button pages (301p) each of which can constitute the button menu and whose display can be changed to each other.

8 Claims, 34 Drawing Sheets

U.S. PATENT DOCUMENTS

| | | | |
|---|---|---|---|
| 6,246,401 B1 * | 6/2001 | Setogawa et al. | 715/723 |
| 6,469,718 B1 * | 10/2002 | Setogawa et al. | 715/810 |
| 2002/0194618 A1 | 12/2002 | Okada et al. | |

FOREIGN PATENT DOCUMENTS

| | | |
|---|---|---|
| CN | 1216196 A | 5/1999 |
| EP | 0 738 078 | 10/1996 |
| EP | 0 788 105 | 8/1997 |
| EP | 0 898 279 | 2/1999 |
| EP | 1 134 986 | 9/2001 |
| EP | 1 286 544 | 2/2003 |
| EP | 1 553 592 | 7/2005 |
| JP | 8-339663 | 12/1996 |
| JP | 10-283155 | 10/1998 |
| JP | 10-336568 | 12/1998 |
| JP | 11-69284 | 3/1999 |
| JP | 11-353858 | 12/1999 |
| JP | 2002-152641 | 5/2002 |
| JP | 2002-238032 | 8/2002 |
| JP | 2002-369154 | 12/2002 |
| RU | 2 073 913 | 2/1997 |
| WO | 03/036644 | 5/2003 |

* cited by examiner

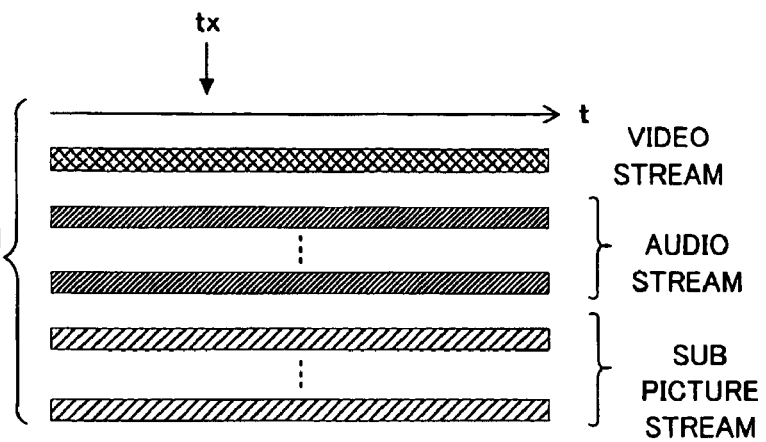
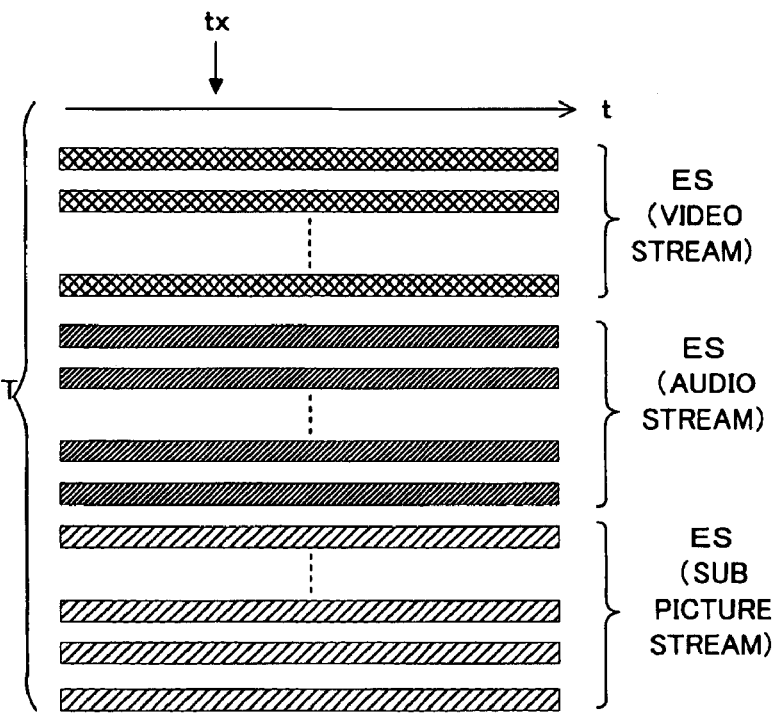
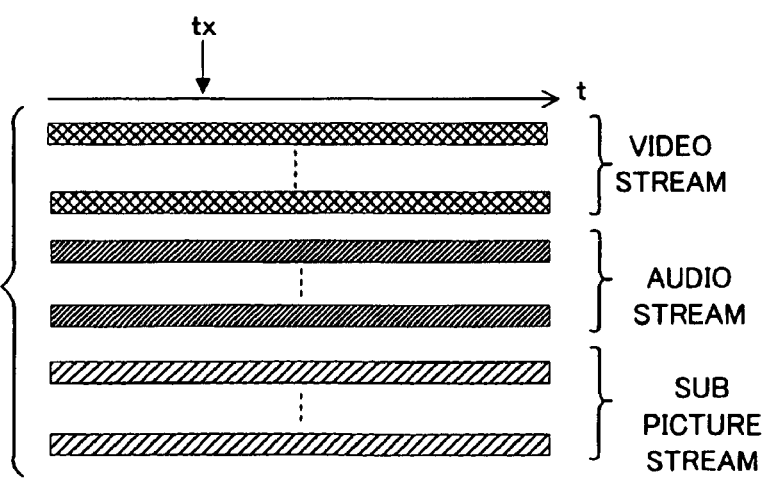

FIG. 20(a)

| header | Size, Display Position etc. of Background Image etc. |
|---|---|
| Background Image Data | Image Data |

| header | Quantity of Button Pages, Quantity of Button Images, etc. | | |
|---|---|---|---|
| Button Page Info. | Button Page #1 (301p) | Button #1 | Button Image No. |
| | | | Display Position |
| | | | Near-by Button Info. |
| | | | Button Command |
| | | . . . | |
| | | Button #x | Button Image No. |
| | | | Display Position |
| | | | Near-by Button Info. |
| | | | Button Command |
| | . . . | | |
| | Button Page #m (301p) | Button #1 | Button Image No. |
| | | | Display Position |
| | | | Near-by Button Info. |
| | | | Button Command |
| | | . . . | |
| | | Button #y | Button Image No. |
| | | | Display Position |
| | | | Near-by Button Info. |
| | | | Button Command |
| Button Image | Button Image Data #1 | | |
| | . . . | | |
| | Button Image Data #n | | |

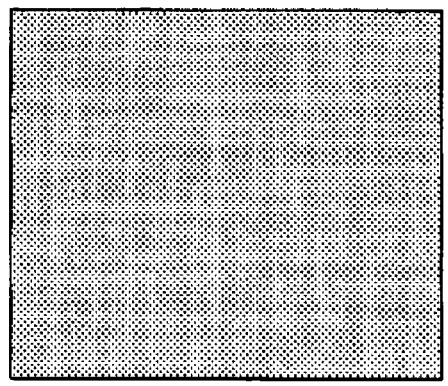
Background Image
FIG. 21(a)
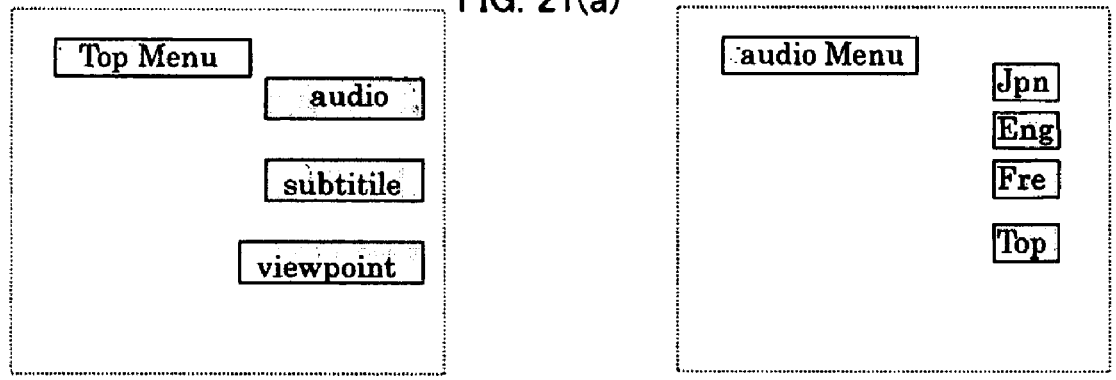
Button Page #1
FIG. 21(b)
Button Page #2
FIG. 21(c)
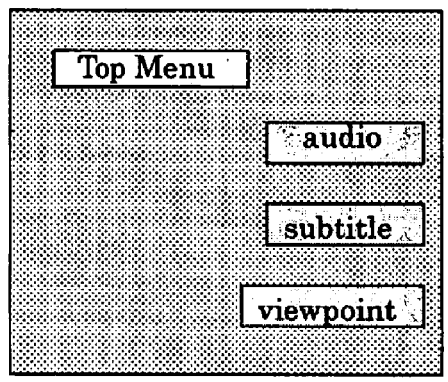
Display on Screen
FIG. 21(d)

FIG. 22

| header | Quantity of Button Pages=2, Quantity of Button Images=9, etc. | | |
|---|---|---|---|
| Button Page Info. | Button Page #1 (301p) | Button #1 | Button Image No. = #1 |
| | | | Display Position |
| | | | Near-by Button Info. = None |
| | | | Button Command = None |
| | | Button #2 | Button Image No. = #2 |
| | | | Display Position |
| | | | Near-by Button Info. = Bottom:Button#3 |
| | | | Button Command =「Display Button Page#2」 |
| | | Button #3 | Button Image No. = #3 |
| | | | Display Position |
| | | | Near-by Button Info. =Top:Button#2, Bottom:Button#4 |
| | | | Button Command |
| | | Button #4 | Button Image No. = #4 |
| | | | Display Position |
| | | | Near-by Button Info. =Top:Button#3 |
| | | | Button Command |
| | Button Page #2 (301p) | Button #1 | Button Image No. = #5 |
| | | | Display Position |
| | | | Near-by Button Info. = None |
| | | | Button Command = None |
| | | Button #2 | Button Image No. = #6 |
| | | | Display Position |
| | | | Near-by Button Info. =Bottom:Button#3 |
| | | | Button Command =「Set Audio to Japanese」 |
| | | Button #3 | Button Image No. = #7 |
| | | | Display Position |
| | | | Near-by Button Info. =Top:Button#2, Bottom:Button#4 |
| | | | Button Command=「Set Audio to English」 |
| | | Button #4 | Button Image No. = #8 |
| | | | Display Position |
| | | | Near-by Button Info. =Top:Button#3, Bottom:Button#5 |
| | | | Button Command=「Set Audio to French」 |
| | | Button #5 | Button Image No. = #9 |
| | | | Display Position |
| | | | Near-by Button Info. =Top:Button#4 |
| | | | Button Command=「Display Button Page#1」 |
| Button Image | Button Image Data #1 =Image Data of 「Top Menu」 | | |
| | Button Image Data #2 =Image Data of 「Audio」 | | |
| | Button Image Data #3 =Image Data of 「Subtitle」 | | |
| | Button Image Data #4 =Image Data of 「View point」 | | |
| | Button Image Data #5 =Image Data of 「Audio Menu」 | | |
| | Button Image Data #6 =Image Data of 「Japanese」 | | |
| | Button Image Data #7 =Image Data of 「English」 | | |
| | Button Image Data #8 =Image Data of 「French」 | | |
| | Button Image Data #9 =Image Data of 「Top」 | | |

P List Info. table

| Field Name | | | Description Content |
|---|---|---|---|
| P list General Info. | | | P list size, total P list quantity, etc. |
| P List Pointer table | P list #1 Pointer | | P list #1 Info. Storage Address |
| | P list #2 Pointer | | P list #2 Info. Storage Address |
| P list #1 Info. table | P list #1 General Info. | | Item total quantity which constitutes P list #1 = 2, Sub-Item total quantity = 1, Other Info. |
| | P list #1 Item Info. table | Item#1 Info. | Relevant AU number in AU table in Object Info. File, etc. |
| | | Item#2 Info. | Relevant AU number in AU table in Object Info. File, etc. |
| | P list #1 Sub-Item Info. table | Sub-Item# 1 Info. | Type=menu during playback content, Relevant AU number in Object Info. File, etc |
| | Other Info. | | Others |
| P list #2 Info. table | P list #2 General Info. | | Item total quantity which constitutes P list #2 = 1, Sub-Item total quantity = 1, Other Info. |
| | P list #2 Item Info. table | Item#1 Info. | Relevant AU number in AU table in Object Info. File, etc. |
| | P list # 2 Sub-Item Info. table | Sub-Item# 1 Info. | Type=menu during playback content, Relevant AU number in Object Info. File, etc |
| | Other Info. | | Others |

FIG. 24

| AU Table | | | | |
|---|---|---|---|---|
| Field Name | | | | Content |
| AU table General Info. | | | | Quantity of AUs, Pointer to each AU, etc. |
| AU Table | AU #1  1 3 2 | PU #1 | ES_Table Index #1 | Stream information table Index No. = 1 |
| | | | ES_Table Index #2 | 2 |
| | | | ES_Table Index #1 | 3 |
| Packet No. Discontinuity Info.  3 0 2 1 | | | | Packet No. Discontinuity Start Point, Off set Value, etc. |
| Other Info. | | | | Information table Position, etc. |

131

134

| Information table | | |
|---|---|---|
| Field Name | | Content |
| Stream Information Table | General Info. | Quantity of Indexes, etc. |
| | Index #1 | ES_PID value = 100 |
| | | Type = Background |
| | | Address Info. |
| | Index #2 | ES_PID = 110 |
| | | Type = Button Data |
| | | Page Attribute = DTS Support |
| | | Address Info |
| | Index #3 | ES_PID = 111 |
| | | Type = Button Data |
| | | Page Attribute = No DTS Support |
| | | Address Info |
| | Other Info. | Other Info. |

134d

INFORMATION RECORDING MEDIUM, INFORMATION RECORDING DEVICE AND METHOD, INFORMATION REPRODUCTION DEVICE AND METHOD, INFORMATION RECORDING/REPRODUCTION DEVICE AND METHOD, COMPUTER PROGRAM FOR CONTROLLING RECORDING OR REPRODUCTION, AND DATA STRUCTURE CONTAINING CONTROL SIGNAL

CROSS REFERENCE TO RELATED APPLICATIONS

This application is a divisional of co-pending application Ser. No. 10/562,948, filed Dec. 29, 2005. application Ser. No. 10/562,948 is the 35 USC 371 National Stage of International application PCT/JP2004/009487 filed on Jun. 29, 2004, the entire contents of which are hereby incorporated by reference.

TECHNICAL FIELD

The present invention relates to: an information recording medium, such as a high density optical disc, onto which various information can be recorded at high density, such as main picture information or video information, audio information, sub-picture information, and reproduction control information; an apparatus for and a method of recording the information onto the information recording medium; an apparatus for and a method of reproducing the information from the information recording medium; an apparatus and a method capable of both recording and reproducing the information; a computer program for controlling the recording or reproduction; and a data structure including a control signal for reproduction control.

BACKGROUND ART

DVDs become common as optical discs on which various information is recorded, such as content information, which is video information, audio information, sub-picture information or the like, reproduction control information and so on. According to a DVD standard, the video information (video data), the audio information (audio data) and the sub-picture information (sub-picture data) are packetized each with the reproduction control information (navigation data), and are multiplexed and recorded on a disc in a program stream format of MPEG 2 (Moving Picture Experts Group phase 2), which is a high performance encoding technology. Among them, the video information has data, which is compressed in a MPEG video format (ISO 13818-2), by one stream in one program stream. On the other hand, the audio information is recorded in a plurality of formats (i.e. linear PCM, AC-3, MPEG audio and so on) and can have data for up to 8 streams in one program stream. The sub-picture information is defined by a bitmap, and is compressed and recorded in a run length method, and can have data for up to 32 streams in one program stream.

In the case of the DVD, as described above, a plurality of streams of the selectable audio information (e.g. streams of a stereo sound, a surrounding sound, an original English sound, a dubbed Japanese sound, and the like) and a plurality of streams of the selectable sub picture information (e.g. streams of Japanese subtitle, English subtitle, and the like) are multiplexed and recorded, by using the program stream format, with respect to one stream of the video information in one movie or film, for example.

Moreover, in the DVD, it is possible to display a menu screen, in order to instruct the reproduction and stop of video images, use the various functions of a player and change the setting of the player. The menu screen is constructed by displaying a selectable button or the like on a still screen which corresponds to a so-called still picture. A user selects the button, to thereby execute a corresponding command, such as changing the sound, subtitle, or point of view, for example.

DISCLOSURE OF INVENTION

However, in the DVD constructed in this manner, in terms of the standard thereof, the menu screen corresponds one-to-one with the still screen. Therefore, for example, if the menu screen is changed during reproduction on the player, it is necessary to read another still screen in addition to reading information about another menu screen. At the same time, it is necessary to display another menu screen on the read still screen. Therefore, there is a technical problem that the reading and display output processes required for the change of the menu screen weigh heavily on the player.

Moreover, in the DVD constructed in this manner, in the standard thereof, it is possible to read the information about the menu screen only after a user designates a menu screen to be displayed next. Therefore, it is impossible to read in advance even the menu screen that is expected to be necessary, such as the menu screen which is displayed after the display change. As a result, there is a technical problem that it needs a certain time to read the information about the menu screen and it is impossible to instantly change the menu screen.

In addition, by frequently changing the menu screen, there is a possibility to reduce a process performance because of an increase in the reading or display output process of the information about the menu screen. Thus, there is a technical problem that it may have a great effect on a series of reproduction of normal content information including a movie or the like.

It is therefore an object of the present invention to provide an information recording medium, an information recording apparatus and method, an information reproducing apparatus and method, an information recording/reproducing apparatus and method, a computer program for recording or reproduction control, and a data structure including a control signal for reproduction control, in which a plurality of menu screens can be easily changed and which do not weigh on the display output of the menu screen, in order to solve the above-mentioned problems, for example.

(Information Recording Medium)

The above object of the present invention can be achieved by an information recording medium on which there are recorded: content information; button information for defining a button menu which allows an operation as for the content information; and play list information for defining reproduction sequence of the content information by a unit of item, which constitutes the content information and which is accessible upon reproduction, the button information including a plurality of button pages each of which can constitute the button menu and whose display can be changed to each other.

According to the information recording medium of the present invention, there are recorded a series of content information which includes a title prepared from a movie or the like, and the button information for defining the button menu to perform an operation as for the content information. The button information is information to display the button menu which is displayed together with the content information, during the reproduction of the content information (i.e. during the reproduction of the title). Here, the "content information" of the present invention is provided with: the video information which indicates a still picture or a moving picture which constitutes a movie, animation, live-action film, and the like; and the audio information which indicates audio which constitutes music, a dialogue, a sound effect, and the like, along with the video information or independent from the video information. The video information which constitutes such content information may include a part which indicates a still picture or moving picture which can be a background image in displaying the "button menu" of the present invention. Moreover, the "button menu" of the present invention is one type of menu screen which can perform various operations and displayed on a screen, for example, and includes a menu screen in general on which the operation is performed by selecting a button displayed in the menu screen. Moreover, there is also recorded the play list information for defining the reproduction sequence of the content information.

Therefore, in the reproduction of the information recording medium, it is possible to reproduce the content information, such as the video information and the audio information, by reproducing a content information part specified by the play list information in order, in accordance with the play list information. In parallel with the reproduction of the content information, by reproducing a button information part, it is possible to reproduce the button information.

In particular, the button information has the plurality of button pages whose display can be changed. Each of the plurality of button pages has information which can be displayed and outputted as the button menu, during the reproduction of the information recording medium. The plurality of button pages may have a tree structure in which one button page and another button page are associated with each other. Then, during the reproduction of the button page, for example, by selecting a button page different from a button page which constitutes the currently displayed button menu by an instruction from a user or the like, it is possible to display another button menu. In other words, if the button page to be displayed is selected, it is possible to change the button menu, relatively easily. Therefore, it is unnecessary to change the button menu together with a still screen corresponding thereto one on one, so that it is possible to realize a multi-page menu (i.e. a plurality of menu screen display) by changing the button page.

In addition, it is possible to change the display of the button menu by changing the display of the plurality of button pages included in the same button information. In other words, there is no more need to read information from a plurality of data (regardless of a logically or physically plurality of data). Thus, there is a great advantage that it is possible to reduce a system resource, such as a memory consumption and load in a CPU required for the display change process of the button menu on an information reproducing apparatus.

As a result, according to the information recording medium of the present invention, it is possible to display or not to display the button menu, as occasion demands, by the user's operation during the reproduction of the content information. At the same time, it is possible to change the button menu, relatively easily and without reducing a process performance, by having the plurality of button pages.

In one aspect of the information recording medium of the present invention, the play list information includes: item information for specifying each item which constitutes the content information; and sub item information for specifying the button information corresponding to the each item as a sub item.

According to this aspect, the item information specifies each item which constitutes the content information, and the sub item information specifies the button information corresponding to the each item as the sub item. Therefore, in the reproduction of the information recording medium, it is possible to reproduce the content information, such as the video information and the audio information, by reproducing a content information part specified by the item information in order, in accordance with the item information. In parallel with the reproduction of the content information, by reproducing a button information part specified by the sub item information, in accordance with the sub item information, it is possible to reproduce the button information. The reproduction of the content information in parallel with the reproduction of the button information can be performed, technically with almost no problem, by properly reducing a reproduction rate on the information reproducing apparatus. Then, if the user desires to display he button menu, it is possible to immediately or instantly display the button menu that has been reproduced by using the sub item information but has never been displayed, onto the content information which is being reproduced by using the item information. On the contrary, for example, if the user does not desire to display the button menu, it is possible not to display the button menu that is being reproduced by using the sub item information, on the content information which is being reproduced by using the item information. Namely, it is possible to change the display/non-display of the button menu, as occasion demands, in accordance with the user's instruction by using a remote control operation, a panel operation, and the like.

In another aspect of the information recording medium of the present invention, at least one of the plurality of button pages includes button command information for defining the operation.

According to this aspect, it is possible to perform various operations (e.g. operations of giving an instruction to reproduce and stop, and changing a subtitle and audio, etc.), in accordance with the button command information. The button command information is preferably included with it associated with button image information described later. By this, it is possible to perform the various operations, relatively easily, by selecting and executing a predetermined button defined by the button image information in the button menu which is displayed and outputted on an information reproducing apparatus described later.

In another aspect of the information recording medium of the present invention, at least one of the plurality of button pages includes button control information being associated with at least one button image information which is displayed and outputted as the button menu, and for displaying and outputting the button image information.

According to this aspect, it is possible to properly display and output the button menu which includes at least one button image information (e.g. button image data described later, etc.), on the basis of the button control information (e.g. necessary button image information and information which indicates the display position or the like of the button image information). In addition, by separately having the button image information and the button control information, it is possible to repeatedly use the same button image information by using a plurality of button control information. In other words, if there is the button control information, there is no need to have the button image information for each button page, and it is possible to reduce a data amount. Incidentally, the above-mentioned button command information may be included in the button control information.

In another aspect of the information recording medium of the present invention, the button control information includes at least one of button image number information which indicates association with the button image information, display position information which indicates a display position on the button menu of a button defined by the button image information, and near-by button information which indicates a change in a state of the button caused by the operation.

According to this aspect, it is possible to display and output various buttons which constitute the button menu, in a desired aspect. As a result, it is possible to display and output it as the button menu which is more convenient for the user.

In another aspect of the information recording medium of the present invention, on which there is further recorded reproduction control information for controlling such that the button information specified by the sub item information is displayed, with it superimposed on or replaced by one portion of the content information corresponding to the button information specified by the sub item information, or is not displayed at all, selectively in accordance with external designation, in reproduction.

According to this aspect, the information reproducing apparatus performs control based on the reproduction control information stored in a navigation packet or the like, for example, to thereby display the button information specified by the sub item information as the button menu, with superimposing the button information onto or replacing it by one portion of the corresponding content information, selectively in accordance with the external designation. Alternatively, the information reproducing apparatus does not display the button information at all selectively in accordance with the external designation. Particularly, in displaying the button menu, the proper button menu corresponding to the content information can be immediately displayed, on the basis of the button information, which has been reproduced in parallel with the reproduction of the content information before displayed and which has been in a readily displayable condition.

In another aspect of the information recording medium of the present invention, the button information is recorded together with the content information, in a content space in which the content information is recorded and which occupies one area of a recording area.

According to this aspect, the content information and the button information are recorded in the same content space, so that the parallel or simultaneous reproduction of the both is relatively easy. Here, the "content space" of the present invention is a unit of record information in the recording area, which corresponds to a unit in performing a reproduction process with a player, and indicates a unit which corresponds to an area where the content information is recorded. In other words, the content information and the button information are recorded in the same content space, there is no need to transfer a space upon the reproduction in the parallel reproduction of the two information, and thus it is possible to perform the parallel reproduction, relatively easily. For example, the parallel reproduction of the both is performed by the same system parameter. Then, normally, the content information among them is always reproduced, displayed and outputted, while the button information is, if present, always reproduced and selectively displayed and outputted.

Incidentally, another button information, such as a disc menu (i.e. a menu common to the whole disc) and a title menu (i.e. a menu for each title), which constitutes another button menu, about the content information may be recorded in a system space which occupies a different area from the content space in the recording area.

In another aspect of the information recording medium of the present invention, on which there is further recorded background image information for defining a background image on which the button menu is superimposed and displayed.

According to this aspect, it is possible to properly display and output the button menu which is superimposed and displayed on the background image (or which is displayed on the background image). In this case, the play list information preferably includes information which associates the button information with the background image. More preferably, the information may be included in the sub item information.

Incidentally, the background image information may be recorded on the information recording medium as independent information, or may be recorded so as to be included in the content information, for example. Moreover, even if the button menu is displayed without superimposing it on the background image, it may be displayed with it superimposed on the image information (or a video image of the content information which is being reproduced, etc.) included in the content information, for example.

In another aspect of the information recording medium of the present invention, the sub item information may further specify a reproduction time point of the button information, on the basis of a reproduction time point of the item information.

According to this aspect, on the basis of the reproduction time point of the button information, which is specified by the sub item information with the reproduction time point of the item information as a standard, the information reproducing apparatus can display the button information as the menu screen, as occasion demands. Thus, whenever the button information in a non-display condition is displayed as the button menu in accordance with a remote control operation and the like, for example, it is possible to display the button menu properly corresponding to the item information which is being reproduced, regardless of the timing of the display start.

In another aspect of the information recording medium of the present invention, the sub item information may further specify a display position and a size of a small window, in displaying the button information as the small window on a display of the item information.

According to this aspect, in accordance with the display position and the size of the small window specified by the sub item information, the information reproducing apparatus can display the button information as the small window on the display of the content information. Namely, by adjusting or changing the display position and the size of the small window which is described in the sub item information, it is possible to display the button menu in the small window with a desired size at a desired display position.

In another aspect of the information recording medium of the present invention, the content information and the button information are multiplexed and recorded by a unit of packet, which is a physically accessible unit and which stores a piece of the content information and the button information respectively.

According to this aspect, the content information and the button information are multiplexed and recorded by the unit of packet in the content space. The reproduction in the content space is performed by reproducing the content information and the button information of such a packet unit through reproduction processes, such as demultiplexing and decoding. Normally, the packet associated with the content information among them is always reproduced, displayed and outputted, and the packet associated with the button information is, if present, always reproduced and selectively displayed and outputted.

Incidentally, the button information can constitute the button menu in the same manner as the present invention, even if the button information is not multiplexed and recorded by the packet unit but recorded as single data.

(Information Recording Apparatus and Method)

The above object of the present invention can be also achieved by an information recording apparatus, provided with: a first recording device for recording content information and button information for defining a button menu which allows an operation as for the content information; and a second recording device for recording play list information for defining reproduction sequence of the content information by a unit of item, which constitutes the content information and which is accessible upon reproduction, the button information including a plurality of button pages each of which can constitute the button menu and whose display can be changed to each other.

According to the information recording apparatus of the present invention, the first recording device, such as a controller, an encoder, a TS/PS object generator mentioned later, an optical pickup and a cutting device, records the content information and the button information as for the content information, into the recording area of the information recording medium, such as a DVD. In particular, the button information is recorded to include the plurality of button pages each of which can constitute the button menu and whose display can be changed to each other. In other words, the first recording device records the button information including the plurality of button pages each of which can constitute the button menu and whose display can be changed to each other. Then, for example, the second recording device, such as a controller, an encoder, a TS/PS object generator mentioned later, an optical pickup and a cutting device, records the play list information for defining the reproduction sequence of the content information by the unit of item.

Therefore, it is possible to record information onto the above-mentioned information recording medium of the present invention (including its various aspects), relatively efficiently.

Incidentally, the information recording apparatus of the present invention may also adopt various aspects, in association with various aspects of the information recording medium of the present invention mentioned above.

In one aspect of the information recording apparatus of the present invention, the play list information includes: item information for specifying each item which constitutes the content information; and sub item information for specifying the button information corresponding to the each item as a sub item.

According to this aspect, the second recording device can record the play list information which includes the item information and the sub item information, so that it is possible to record information onto the above-mentioned information recording medium of the present invention (including its various aspects), relatively efficiently.

The above object of the present invention can be also achieved by an information recording method, provided with: a first recording process of recording content information and button information for defining a button menu which allows an operation as for the content information; and a second recording process of recording play list information for defining reproduction sequence of the content information by a unit of item, which constitutes the content information and which is accessible upon reproduction, the button information including a plurality of button pages each of which can constitute the button menu and whose display can be changed to each other.

According to the information recording method of the present invention, by using a controller, an encoder, a TS/PS object generator mentioned later, an optical pickup, a cutting device or the like, the first recording process records the content information and the button information as for the content information, into the recording area of the information recording medium, such as a DVD. The second recording process records the play list information for defining the reproduction sequence of the content information by the unit of item. In particular, the button information is recorded to include the plurality of button pages each of which can constitute the button menu and whose display can be changed to each other. In other words, the first recording process records the button information to include the plurality of button pages each of which can constitute the button menu and whose display can be changed to each other. Then, for example, the second recording process records the play list information.

Therefore, it is possible to record information onto the above-mentioned information recording medium of the present invention (including its various aspects), relatively efficiently.

Incidentally, the information recording method of the present invention may also adopt various aspects, in association with various aspects of the information recording medium of the present invention mentioned above.

(Information Reproducing Apparatus and Method)

The above object of the present invention can be also achieved by an information reproducing apparatus for reproducing the above-mentioned information recording medium of the present invention (including its various aspects), the information reproducing apparatus provided with: a reproducing device for reproducing the content information, the button information and the play list information; a generating device for generating the button menu on the basis of the button information; a designating device for designating one button page out of the plurality of button pages; and a controlling device for controlling the generating device to generate the button menu constituted by the designated one button page.

According to the information reproducing apparatus of the present invention, the reproducing device, such as a controller, a decoder, a demultiplexer and an optical pickup, reproduces the play list information. Then, under the control of the controlling device such as a controller, the reproducing device reproduces the content information and the button information, in accordance with the reproduced play list information. At this time, for example, the reproduced content information is reproduced as the main pass, while the reproduced button information is reproduced as the sub pass. Along with the reproduction described above, a displaying and outputting device displays and outputs the content information.

Particularly in the present invention, the generating device can generate one button page which is designated by the operation of the designating device on the basis of the user's operation, as the button menu. Therefore, it is possible to properly change the display of the button menu, by properly changing the plurality of button pages on the basis of the user's designation, for example.

In addition, if there is external designation performed by an external inputting device, such a remote controller, like that the display of the button menu is desired or not desired, for example, the displaying and outputting device may display and output the reproduced button information by superimposing the button information onto or replacing it by one portion of the content information, or not display it at all, selectively in accordance with the external designation, under the control of the controlling device.

Therefore, it is possible to reproduce the information on the above-mentioned information recording medium of the present invention (including its various aspects), relatively efficiently.

Incidentally, the information reproducing apparatus of the present invention may also adopt various aspects, in association with various aspects of the information recording medium of the present invention mentioned above.

In one aspect of the information reproducing apparatus of the present invention, the controlling device controls the reproducing device to reproduce the content information and the button information, in accordance with the item information and the sub item information included in the play list information reproduced by the reproducing device.

According to this aspect, the reproducing device reproduces the content information in accordance with the item information, and reproduces the button information in accordance with the sub item information. Therefore, it is possible to reproduce the information on the above-mentioned information recording medium of the present invention (including its various aspects), relatively efficiently.

In another aspect of the information reproducing apparatus of the present invention, the designating device is a button in which the button command information is defined, and the controlling device controls the reproducing device and the generating device, in accordance with the button command information.

According to this aspect, it is possible to perform various operations, in accordance with the button command information which is externally designated by the designating device on the basis of the user's operation, for example. The designating device herein is a button which is displayed and outputted as the button menu. For example, if the button command information is individually associated with the button image information, it is preferable to execute a command indicated by the button command information by selecting and executing a button defined by the button image information. In other words, the button which constitutes the button menu preferably functions as a role of the trigger of process execution (i.e. preferably has an original function as the button).

In another aspect of the information reproducing apparatus of the present invention, the reproducing device pre-loads the button information before reproduction of the content information.

According to this aspect, by pre-loading (i.e. reproducing in advance) the button information before the reproduction of the content information, it is possible to display and output the button information (i.e. the button menu) without any load on the reproduction of the content information, even upon the reproduction of the content information.

Incidentally, the pre-loaded button information in this manner is preferably stored into a buffer memory or the like described later, for example, and can be read out (displayed and outputted) if needed. Then, in pre-loading, the entire button information recorded on the information recording medium may be pre-loaded, or one portion of the button information (i.e. at least one of the plurality of button pages) may be pre-loaded.

In another aspect of the information reproducing apparatus of the present invention, the information reproducing apparatus is further provided with a buffer memory for storing the generated button menu.

According to this aspect, the buffer memory, such as a ring buffer, maintains the reproduced button information (or the button page). At this time, the buffer memory may maintain it in a readily displayable and outputtable condition for a predetermined period, regardless of whether or not the button menu is displayed and outputted. As described above, by maintaining the button information in the buffer memory and taking it out from the buffer memory in accordance with a remote control operation or the like, it is possible to readily or immediately display the button information as the button menu any time. Incidentally, "to readily or immediately display" in the present invention is a concept which broadly includes not only the case where after an instruction to display is inputted, the button information can be displayed in such a short time that the user cannot recognize it, but also the case where the button information can be displayed in such a short time that the user can allow it.

In another aspect of the information reproducing apparatus of the present invention, the controlling device controls the displaying and outputting device to display and output the reproduced button information as a small window on the reproduced content information, in accordance with a display position and a size of the small window which is further specified by the sub item information included in the reproduced play list information.

According to this aspect, the displaying and outputting device displays and outputs the button information on the content information as the small window, in accordance with the display position and the size of the small window specified by the sub item information, under the control of the controlling device.

The above object of the present invention can be also achieved by an information reproducing method of reproducing the above-mentioned information recording medium of the present invention (including its various aspects), the information reproducing method provided with: a reproducing process of reproducing the content information, the button information and the play list information; a generating process of generating the button menu on the basis of the button information; a designating process of designating one button page out of the plurality of button pages; and a controlling process of controlling the generating process to generate the button menu constructed by the designated one button page.

According to the information reproducing method of the present invention, the first controlling process controls the reproducing process to reproduce the content information and the button information, in accordance with the play list information reproduced in the reproducing process, by using a controller or the like, for example. Moreover, the second controlling process controls the generating process to generate one button page as the button menu, selectively in accordance with the designation by the operation of the designating device. In other words, it is possible to change the button menu, as occasion demands, and display and output it.

Therefore, it is possible to reproduce the information on the above-mentioned information recording medium of the present invention (including its various aspects), relatively efficiently.

Incidentally, the information reproducing method of the present invention may also adopt various aspects, in association with various aspects of the information recording medium of the present invention mentioned above.

(Information Recording/Reproducing Apparatus and Method)

The above object of the present invention can be also achieved by an information recording/reproducing apparatus, provided with: a first recording device for recording content information and button information for defining a button menu which allows an operation as for the content information; and a second recording device for recording play list information for defining reproduction sequence of the content information by a unit of item, which constitutes the content information and which is accessible upon reproduction, the button information including a plurality of button pages each of which can constitute the button menu and whose display can be changed to each other, the information recording/reproducing apparatus further provided with: a reproducing device for reproducing the content information, the button information and the play list information; a generating device for generating the button menu on the basis of the button information; a designating device for designating one button page out of the plurality of button pages; and a controlling device for controlling the generating device to generate the button menu constituted by the designated one button page.

According to the information recording/reproducing apparatus of the invention, since it has both of the above-mentioned information recording apparatus of the present invention and the above-mentioned information reproducing apparatus of the present invention, it is possible to record and reproduce the information on the information recording medium of the invention (including its various aspects), relatively efficiently.

Incidentally, the information recording/reproducing apparatus of the present invention may also adopt various aspects, in association with various aspects of the information recording medium of the present invention mentioned above.

In one aspect of the information recording/reproducing apparatus of the present invention, the play list information includes: item information for specifying each item which constitutes the content information; and sub item information for specifying the button information corresponding to the each item as a sub item, and the controlling device controls the reproducing device to reproduce the content information and the button information, in accordance with the item information and the sub item information included in the play list information reproduced by the reproducing device.

According to this aspect, for example, the second controlling device can record the play list information which includes the item information and the sub item information, so that it is possible to record the information onto the information recording medium of the present invention (including its various aspects), relatively efficiently. Moreover, the reproducing device reproduces the content information in accordance with the item information included in the play list information, and reproduces the button information in accordance with the sub item information included in the play list information. Therefore, it is possible to reproduce the information on the information recording medium of the invention (including its various aspects), relatively efficiently.

The above object of the present invention can be also achieved by an information recording/reproducing method, provided with: a first recording process of recording content information and button information for defining a button menu which allows an operation as for the content information; and a second recording process of recording play list information for defining reproduction sequence of the content information by a unit of item, which constitutes the content information and which is accessible upon reproduction, the button information including a plurality of button pages each of which can constitute the button menu and whose display can be changed to each other, the information recording/reproducing method further provided with: a reproducing process of reproducing the content information, the button information and the play list information; a generating process of generating the button menu on the basis of the button information; a designating process of designating one button page out of the plurality of button pages; and a controlling process of controlling the generating process to generate the button menu constituted by the designated one button page.

According to the information recording/reproducing method of the invention, since it has both of the above-mentioned information recording method of the present invention and the above-mentioned information reproducing method of the present invention, it is possible to record and reproduce the information on the information recording medium of the present invention (including its various aspects), relatively efficiently.

Incidentally, the information recording/reproducing method of the present invention may also adopt various aspects, in association with various aspects of the information recording medium of the present invention mentioned above.

(Computer Program)

The above object of the present invention can be also achieved by a computer program for recording control to control a computer provided for the above-mentioned information recording apparatus of the present invention (including its various aspects), the computer program making the computer function as at least one portion of the first recording device and the second recording device.

According to the computer program for recording control of the present invention, the information recording apparatus of the present invention mentioned above may be realized relatively easily, by reading and running the computer program from a recording medium, such as a ROM, a CD-ROM, a DVD-ROM, a hard disk and so on, which stores the computer program thereon, or by downloading the computer program to the computer via the communication device and running it.

Incidentally, the computer program for recording control of the present invention may also adopt various aspects, in association with various aspects of the information recording medium of the present invention mentioned above.

The above object of the present invention can be also achieved by a computer program for reproduction control to control a computer provided for the above-mentioned information reproducing apparatus of the present invention (including its various aspects), the computer program making the computer function as at least one portion of the reproducing device, the generating device, the designating device and the controlling device.

According to the computer program for reproduction control of the present invention, the information reproducing apparatus of the present invention mentioned above may be realized relatively easily, by reading and running the computer program from a recording medium, such as a ROM, a CD-ROM, a DVD-ROM, a hard disk and so on, which stores the computer program thereon, or by downloading the computer program to the computer via the communication device and running it.

Incidentally, the computer program for reproduction control of the present invention may also adopt various aspects, in association with various aspects of the information recording medium of the present invention mentioned above.

The above object of the present invention can be also achieved by a computer program for record/reproduction control to control a computer provided for the information recording/reproducing apparatus of the present invention (including its various aspects), the computer program making the computer function as at least one portion of the first recording device, the second recording device, the reproducing device, the generating device, the designating device and the controlling device.

According to the computer program for record/reproduction control of the present invention, the information recording/reproducing apparatus of the present invention mentioned above may be realized relatively easily, by reading and running the computer program from a recording medium, such as a ROM, a CD-ROM, a DVD-ROM, a hard disk and so on, which stores the computer program thereon, or by downloading the computer program to the computer via the communication device and running it.

Incidentally, the computer program for record/reproduction control of the present invention may also adopt various aspects, in association with various aspects of the information recording medium of the present invention mentioned above.

The above object of the present invention can be also achieved by a computer program product for record control in a computer-readable medium for tangibly embodying a program of instructions executable by a computer provided for the above-mentioned information recording apparatus of the present invention (including various aspects), the program making the computer function as at least one portion of the first recording device and the second recording device.

The above object of the present invention can be also achieved by a computer program product for reproduction control in a computer-readable medium for tangibly embodying a program of instructions executable by a computer provided for the above-mentioned information reproducing apparatus of the present invention (including various aspects), the program making the computer function as at least one portion of the reproducing device, the generating device, the designating device and the controlling device.

The above object of the present invention can be also achieved by a computer program product for record/reproduction control in a computer-readable medium for tangibly embodying a program of instructions executable by a computer provided for the above-mentioned information recording/reproducing apparatus of the present invention (including various aspects), the program making the computer function as at least one portion of the first recording device, the second recording device, the reproducing device, the generating device, the designating device and the controlling device.

According to the computer program product for the record control, the reproduction control, or the record/reproduction control of the invention, at least one portion of the first recording device, the second recording device, the reproducing device, the generating device, the designating device and the controlling device of the present invention mentioned above may be embodied relatively easily, by reading and running the computer program product from a record medium, such as a ROM, a CD-ROM, a DVD-ROM, a hard disk and so on, which stores the computer program thereon, or by downloading the computer program product to the computer via the communication device and running it. More specifically, the computer program product may be made of computer readable codes (or computer readable commands) to make the computer function as at least one portion of the first recording device, the second recording device, the reproducing device, the generating device, the designating device and the controlling device.

(Data Structure Including Control Signal)

The above object of the present invention can be also achieved by a data structure including a control signal, provided with: content information; button information for defining a button menu which allows an operation as for the content information; and play list information for defining reproduction sequence of the content information by a unit of item, which constitutes the content information and which is accessible upon reproduction, the button information including a plurality of button pages each of which can constitute the button menu and whose display can be changed to each other.

According to the data structure including the control signal of the present invention, similarly to the case of the information recording medium of the present invention as mentioned above, it is possible to change the button menu, relatively easily and without reducing a process performance, by having the plurality of button pages. In addition, it is possible to display or not to display the button menu, as occasion demands, by the user's operation during the reproduction of the content information.

Incidentally, the data structure including the control signal of the present invention may also adopt various aspects, in association with various aspects of the information recording medium of the present invention mentioned above.

These effects and other advantages of the present invention become more apparent from the following embodiments and examples.

As explained above, according to the information recording medium of the present invention, on which there are recorded: the content information; the button information; and the play list information, the button information including the plurality of button pages. Thus, it is possible to change the button menu, relatively easily and without reducing a process performance, by the user's operation during the reproduction of the content information. According to the information recording apparatus or method of the present invention, it is provided with the first and second recording devices or the first and second recording processes, respectively. Thus, it is possible to multiplex and record the content information so that the content information can be reproduced while changing the button menu, as occasion demands. According to the information reproducing apparatus or method of the present invention, it is provided with the reproducing device, the generating device, the designating device, and the controlling device, or the reproducing process, the generating process, the designating process, and the controlling process, respectively. Thus, it is possible to properly perform the reproduction on the information recording medium of the present invention. Moreover, according to the computer program of the present invention, the computer is made function as the information recording apparatus, the information reproducing apparatus, or the information recording/reproducing apparatus. Thus, it is possible to efficiently record or reproduce the information on the information recording medium of the present invention.

BRIEF DESCRIPTION OF DRAWINGS

FIG. 2 are a schematic conceptual view of a conventional MPEG 2 program stream (FIG. 2(a)); a schematic conceptual view of a MPEG2 transport stream used in the embodiment (FIG. 2(b)); and a schematic conceptual view of a MPEG 2 program stream used in the embodiment (FIG. 2(c)).

FIG. 20 are diagrams showing the data structure of background image data (FIG. 20(a)) and the data structure of button data (FIG. 20(b)).

FIG. 21 are schematic diagrams conceptually showing a menu screen provided with the background image data and button pages.

FIG. 22 is a diagram conceptually showing the specific data structure of the button data which defines a button menu shown in FIG. 21 in the embodiment.

FIG. 23 is a conceptual view showing one specific example of a play list information file, which can display the button menu in the embodiment.

FIG. 24 is a conceptual view showing one specific example of an object list information file, which can display the button menu in the embodiment.

BEST MODE FOR CARRYING OUT THE INVENTION (Information Recording Medium)

With reference to FIG. 1 to FIG. 13, the information recording medium in an embodiment of the present invention will be discussed. In the embodiment, the information recording medium of the present invention is applied to an optical disc capable of recording (writing) and reproducing (reading).

Figure 1:
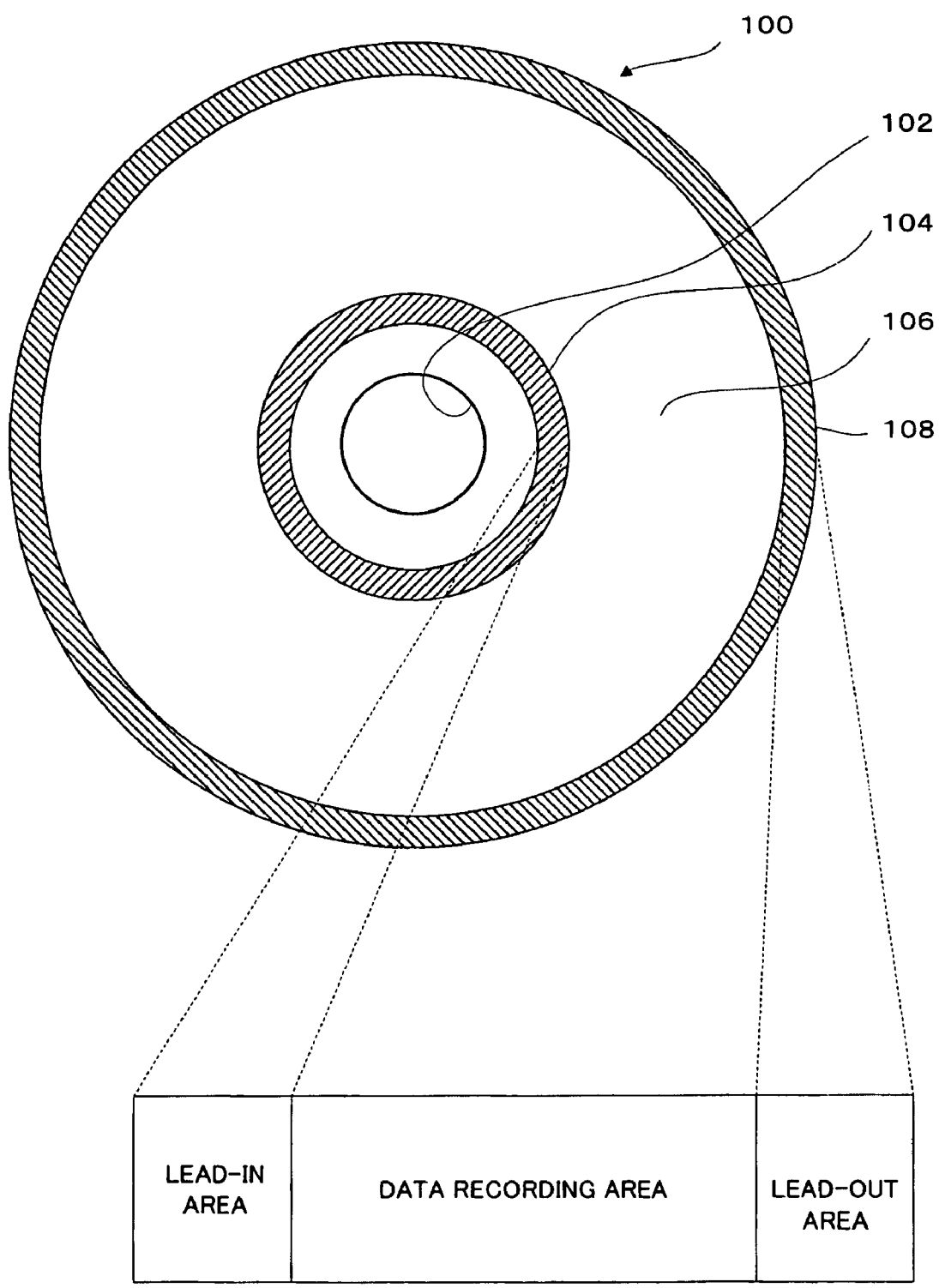
FIG. 1 is a diagram showing the basic structure of an optical disc as being one embodiment of an information recording medium of the present invention, the upper part being a schematic plan view of the optical disc having a plurality of areas, the corresponding bottom part being a schematic conceptual view of the area structure in the radial direction.

Firstly, with reference to FIG. 1, the basic structure of the optical disc in the embodiment will be discussed. FIG. 1 shows the basic structure of the optical disc having a plurality of areas in a schematic plan view in the upper part, in association with the area structure in the radial direction in a schematic conceptual view in the corresponding bottom part.

As shown in FIG. 1, an optical disc 100 is recordable by various recording methods, such as a magneto-optical method and a phase change method, capable of recording (writing) only once or a plurality of times. Similarly to DVDs, the optical disc 100 has a lead-in area 104, a data area 106 and a lead-out area 108, from the inner circumference around a center hole 102 to the outer circumference, on the recording surface of the disc main body which measures about 12 cm in diameter. In each area, groove tracks and land tracks may be alternately arranged, concentrically or spirally, around the center hole 102. The groove tracks may be wobbled. Furthermore, pre-pits may be formed on one or both of these tracks.

Incidentally, the present invention is not exclusively limited to the optical disc having three areas mentioned above.

Next, with reference to FIG. 2, the structures of a transport stream (TS) and a program stream (PS) recorded onto the optical disc in the embodiment will be discussed. FIG. 2(a) schematically shows the structure of a MPEG2 program stream in a conventional DVD, for comparison. FIG. 2(b) schematically shows the structure of a MPEG2 transport stream (TS). Moreover, FIG. 2(c) schematically shows the structure of a MPEG2 program stream in the present invention.

In FIG. 2(a), one program stream to be recorded onto the conventional DVD includes only one video stream for video data as main picture information or video information, along a time axis t, and further includes up to at most 8 audio streams for audio data as audio information, and up to at most 32 sub-picture streams for sub-picture data as sub-picture information (or still picture streams for still picture data). That is, the video data to be multiplexed at an arbitrary time point tx relates to only one video stream. For example, a plurality of video streams corresponding to a plurality of TV shows or a plurality of movies can not be included at the same time in the program stream. It is not possible to multiplex a plurality of TV shows etc. and transfer or record them, in the program stream format of a DVD having only one video stream, because at least one video stream is required for each TV show etc., in order to transfer or record the multiplexed TV show or the like which involves a video image.

In FIG. 2(b), one transport stream (TS) to be recorded onto the optical disc 100 in the embodiment includes a plurality of video streams as elementary streams (ES) for video data as video information, and further includes a plurality of audio streams as elementary streams (ES) for audio data as audio information and a plurality of sub-picture streams as elementary streams (ES) for sub-picture as sub-picture information. That is, the video data to be multiplexed at an arbitrary time point tx relates to a plurality of video streams. For example, a plurality of video streams that may correspond to a plurality of TV shows or a plurality of movies can be included at the same time into the transport stream. Thus, it is possible to multiplex a plurality of TV shows and transfer or record them, in the transport stream format having a plurality of video streams. However, the sub-picture stream is not transferred in digital broadcast employing the existing transport stream.

In FIG. 2(c), one program stream (PS) to be recorded onto the optical disc 100 in the embodiment includes a plurality of video streams for video data as video information, and further includes a plurality of audio streams for audio data as audio information and a plurality of sub-picture streams for sub-picture as sub-picture information. That is, the video data to be multiplexed at an arbitrary time point tx relates to a plurality of video streams. For example, a plurality of video streams that may correspond to a plurality of TV shows or a plurality of movies can be included at the same time into the program stream.

Incidentally, for convenience of explanation, the video stream, the audio stream and the sub-picture stream are arranged in this order from the top in FIG. 2(a) to FIG. 2(c). Nevertheless, this order or sequence does not correspond to order or sequence for multiplexing the streams by a packet unit as mentioned below. In the transport stream, conceptually, a set of one video stream, two audio streams and two sub-picture streams corresponds to one program, for example.

The above-mentioned optical disc 100 in the embodiment is constructed to multiplex and record the transport stream (TS) as shown in FIG. 2(b) within the limit of a recording rate, i.e., to record a plurality of shows or programs at the same time. Furthermore, in place of or in addition to this transport stream, the program stream (PS) as shown in FIG. 2(c) can be multiplexed and recorded on the same optical disc 100.

Particularly in the embodiment, background image data and button data described later (refer to FIGS. 20) may be multiplexed and recorded as the elementary stream in the transport stream shown in FIG. 2(b), for example, or may be multiplexed and recorded with them included in the sub picture stream or the like, for example. Alternately, the background image data and the button data may be recorded on the optical disc 100 without multiplexed, as JPEG data and bitmap data, for example.

Figure 3:
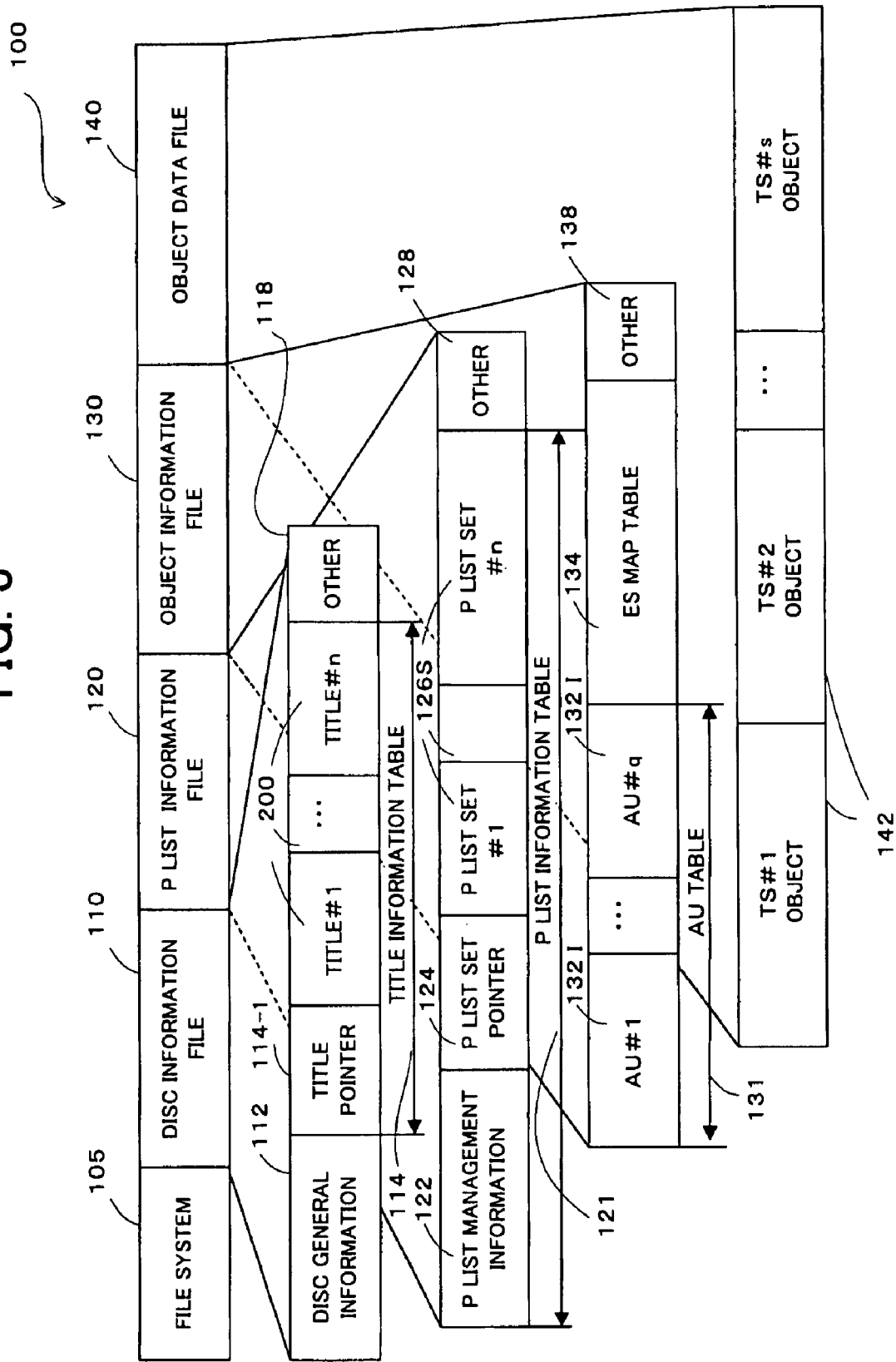
FIG. 3 is a diagram schematically showing a data structure recorded on the optical disc in the embodiment.
Figure 4:
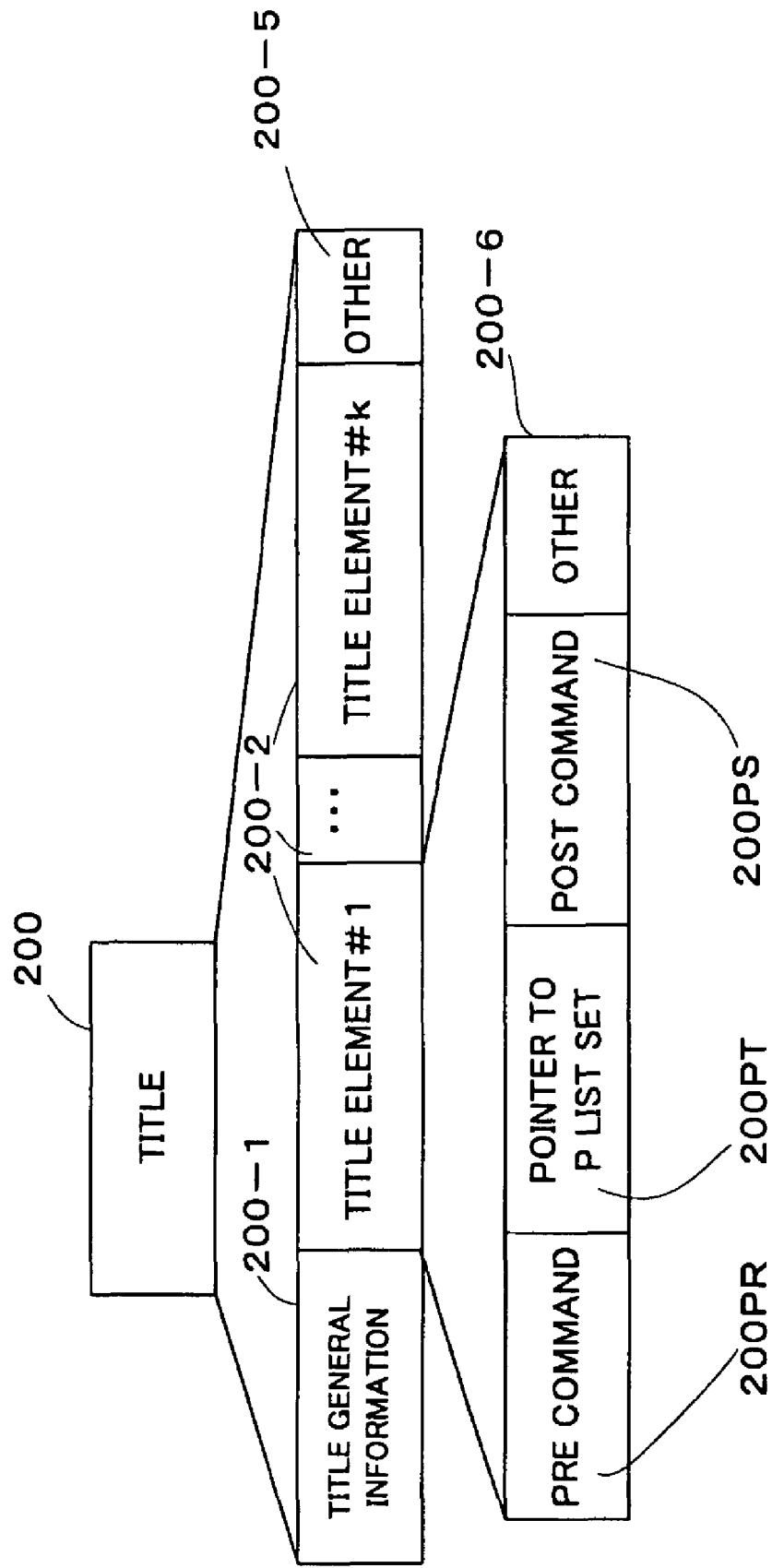
FIG. 4 is a conceptual view hierarchically showing a detailed data structure in each title shown in FIG. 3.
Figure 5:
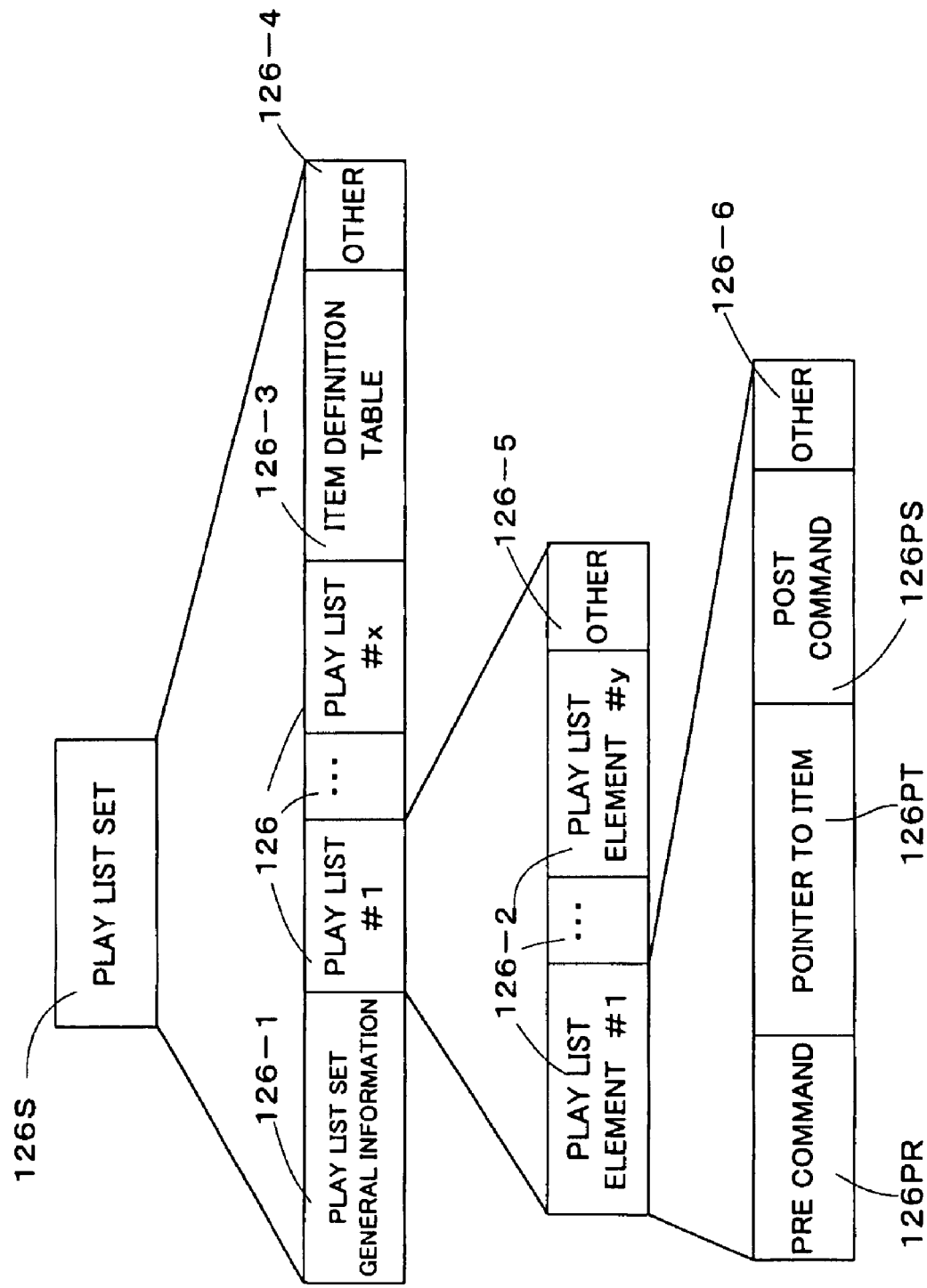
FIG. 5 is a conceptual view hierarchically showing a detailed data structure in each play list set shown in FIG. 3.
Figure 6:
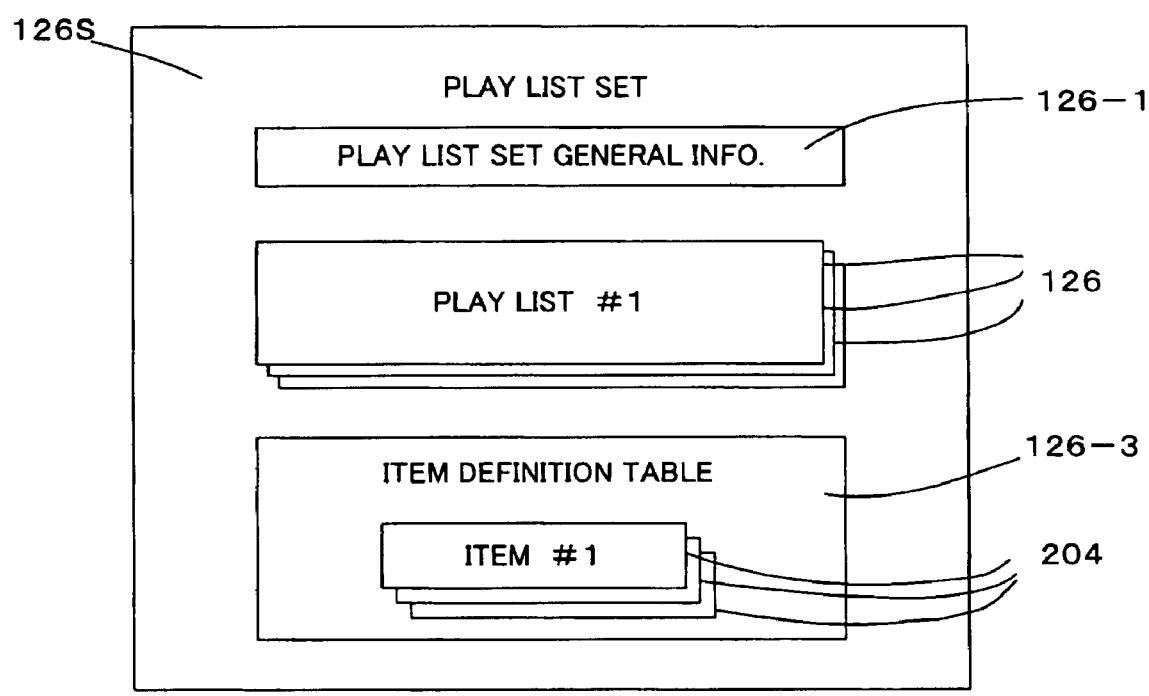
FIG. 6 is a conceptual view schematically showing the detailed data structure in each play list set shown in FIG. 3.
Figure 7:
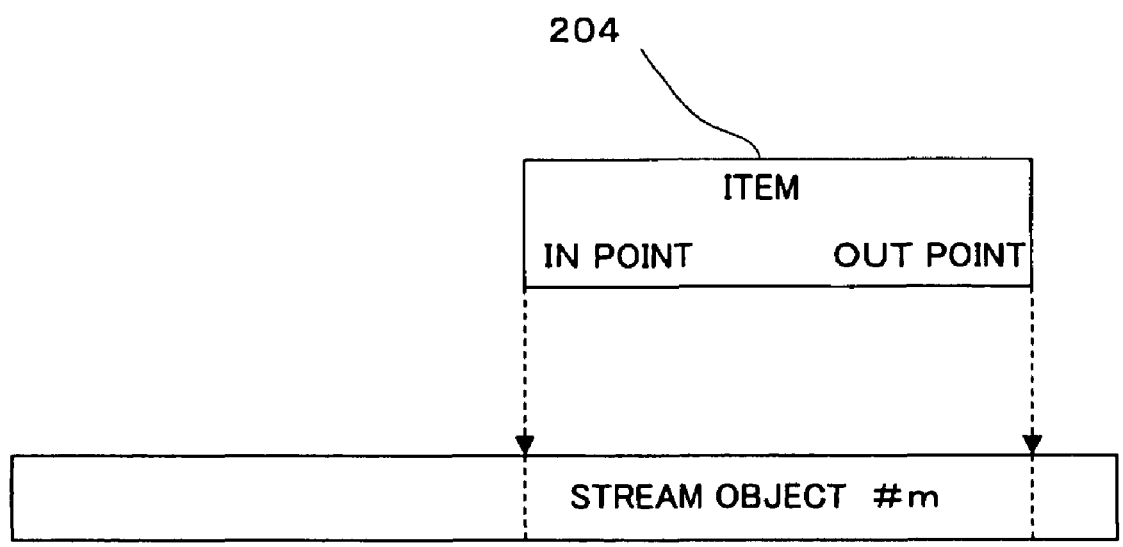
FIG. 7 is a conceptual view schematically showing a detailed data structure in each Item shown in FIG. 6.
Figure 8:
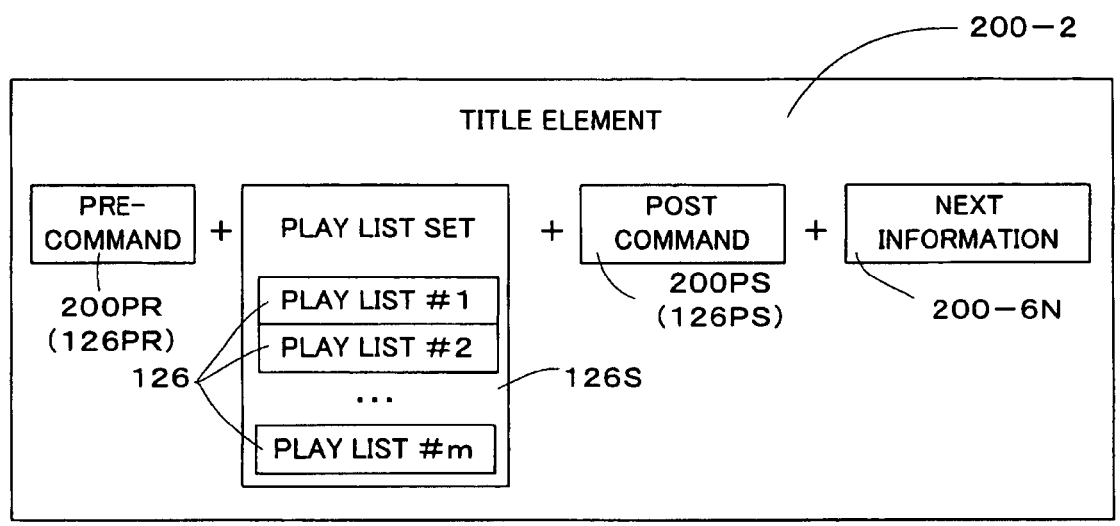
FIG. 8 is a conceptual view schematically showing the logical structure of data in each title element shown in FIG. 4.
Figure 9:
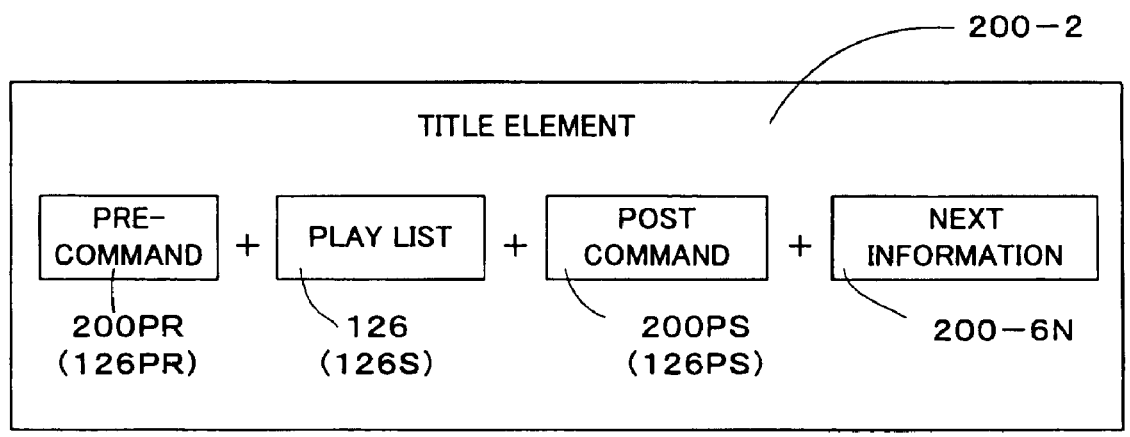
FIG. 9 is a conceptual view schematically showing the logical structure of the data in each title element shown in FIG. 4, if each play list set is provided with one play list in the embodiment.
Figure 10:
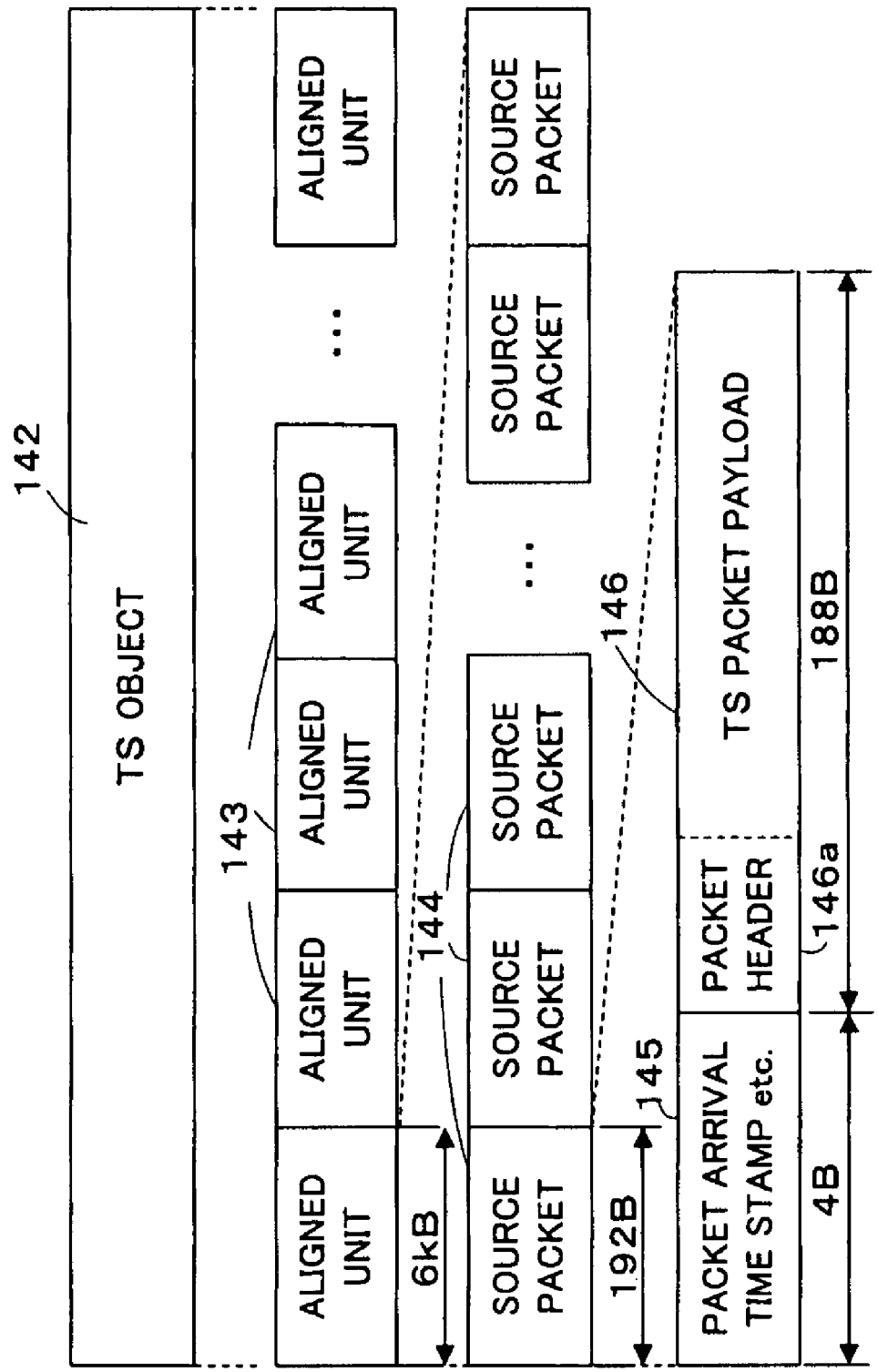
FIG. 10 is a conceptual view schematically showing a detailed data structure in each object shown in FIG. 3.

Next, with reference to FIG. 3 to FIG. 10, the structure of data to be recorded onto the optical disc 100 will be discussed. FIG. 3 schematically shows a data structure recorded on the optical disc 100. FIG. 4 schematically shows a detailed data structure in each title shown in FIG. 3. Each of FIG. 5 and FIG. 6 schematically shows the detailed data structure in each play (P) list set shown in FIG. 3. FIG. 7 schematically shows a detailed data structure in each Item shown in FIG. 6. FIG. 8 schematically shows the logical structure of data in each title element shown in FIG. 4. FIG. 9 schematically shows the logical structure of the data in each title element shown in FIG. 4, if each play list set is provided with one play list. FIG. 10 schematically shows a detailed data structure in each object shown in FIG. 3.

In the following explanation, the "title" means a reproduction unit, on the basis of which a plurality of "play lists" are executed continuously or sequentially, and which is a logically large grouped unit, such as one movie or one TV show. The "play list set" means a bundle of "play lists". For example, it may be a bundle of play lists to reproduce a plurality of content information which have a special relationship and which are switchable to each other in an angle reproduction or parental reproduction, or may be a bundle of play lists to reproduce content information related to a plurality of shows or programs broadcasted in the same time zone and collectively recorded. Alternatively, it may be a bundle of play lists to reproduce various content information, in one title, prepared on the basis of a required function, for example, on the basis of a video reproduction function (video performance) or audio reproduction function (audio performance) required for the information reproduction system, such as a high vision compatibility, a display resolution, a surround speaker compatibility and a speaker layout. The "play list" is a file for storing the information required to reproduce the "object" and consists of a plurality of "Items" each storing the information about a reproduction range of the object to access the object. The "object" is the entity information of content which constitutes the above-mentioned MPEG2 transport stream.

In FIG. 3, the optical disc 100 is provided with four files as a logical structure: a disc information file 110; a play (P) list information file 120; an object information file 130; and an object data file 140. The optical disc 100 is further provided with a file system 105 for managing these files. Incidentally, although FIG. 3 does not show directly the physical data arrangement on the optical disc 100, it is possible to perform the recording in such a manner that the arrangement shown in FIG. 3 corresponds to another arrangement shown in FIG. 1. That is, it is possible to record the file system 105 or the like into the data record area 106 following the lead-in area 104 and further record the object data file 140 or the like into the data record area 106. The file structure shown in FIG. 3 can be constructed, even without the lead-in area 104 or the lead-out area 108 shown in FIG. 1.

The disc information file 110 is a file for storing general information about the entire optical disc 100, and stores disc general information 112, title information table 114 and other information 118. The disc general information 112 stores the total quantity of titles or the like in the optical disc 100. The title information table 114 includes a title pointer 114-1 and a plurality of titles 200 (title #1-#m) whose record addresses are indicated by the title pointer. In each title 200, each title type (e.g. sequential reproduction type, branch type and so on), or the number (or numbers) of the play (P) list (or play (P) lists) which constitute (or constitutes) each title are stored as the logical information.

More specifically, for example, as shown in FIG. 4, each title 200 includes title general information 200-1, a plurality of title elements 200-2, and other information 200-5. Furthermore, each title element 200-2 is made of a pre-command 200PR, a pointer 200PT to a play list set, a post command 200PS, and other information 200-6.

The pointer 200PT indicates the recording position of a play list set 126S stored in the play list information file 120, which corresponds to content information to be reproduced on the basis of the title element 200-2 including the pointer 200PT. The pre-command 200PR indicates a command to be executed before the reproduction of the content information whose reproduction sequence is defined by one play list set 126S whose recording position is designated by the pointer 200PT. The post command 200PS is a command to be executed after the reproduction of the content information whose reproduction sequence is defined by the one play list set. The other information 200-5 included in the title element 200-2 includes next information which designates a title element for a next reproduction after the present reproduction of the title element, for example.

Therefore, upon the reproduction of the information recording medium by the information reproduction apparatus, the desired content information can be reproduced as the title element 200-2, by accessing the play list set 126S in accordance with the pointer 200PT and performing control to select a play list corresponding to the desired show or program or the like from among a plurality of play lists 126 included in the play list set 126S. Moreover, reproducing such a title element 200-2 solely or sequentially makes it possible to reproduce one title 200. Furthermore, it is possible to execute a command to be executed before the reproduction, in the content information whose reproduction sequence is defined by one play list set 126S whose recording position is designated by the pointer 200PT, in accordance with the pre-command 200PR. Moreover, it is possible to execute a command to be executed after the reproduction, in the content information whose reproduction sequence is defined by one play list set 126S whose recording position is designated by the pointer 200PT, in accordance with the post command 200PS. The post command 200PS may be a command to order the branch of the content information, a command to select a next title and so on. Additionally, it is possible to reproduce a next title element 200-2 to be reproduced after the presently reproduced title element 200-2, in accordance with the next information included in other information 200-5.

Again in FIG. 3, the play list information file 120 stores a play (P) list information table 121 which indicates the logical structure of each play list. This play list information table 121 is divided into play (P) list management information 122, a play (P) list set pointer 124, a plurality of play (P) list sets 126S (P list set #1-#n), and other information 128. In this play list information table 121, the logical information of each play list set 126S is stored in the order of the play list set number. In other words, the order for storing the each play list set 126S is play list set numbers. Furthermore, in the above-mentioned title information table 114, the same play list set 126S can be referred to from a plurality of titles 200. That is, the play list set #p in the play list information table 121 may be pointed by the title information table 114, even in the case that title #n and title #m use the same play list set #p.

As shown in FIG. 5, the play list set 126S includes play list set general information 126-1, a plurality of play lists 126 (play list #1-#x), an Item definition table 126-3, and other information 126-4. Each play list 126 includes a plurality of play list elements 126-2 (play list element #1-#y), and other information 126-5. Furthermore, each play list element 126-2 includes a pre-command 126PR, a pointer 126PT to an Item, a post command 126PS, and other information 126-6.

The pointer 126PT indicates a recording position of an Item defined by the Item definition table 126-3, the Item corresponding to the content information to be reproduced on the basis of the play list element 126-2 including the pointer 126PT.

As shown in FIG. 6, in the play list set 126S, a plurality of Items 204 are defined in the Item definition table 126-3. They are shared by a plurality of play lists 126. Furthermore, as the play list set general information 126-1, UI (User Interface Information) such as a reproduction time and the name of each play list 126 included in the play list set 126S, address information to each Item definition table 126-3 and so on are recorded.

Again in FIG. 5, the pre-command 126PR indicates a command to be executed before the reproduction of one Item 204 whose recording position is designated by the pointer 126PT. The post command 126PS indicates a command to be executed after the reproduction of the one Item 204. Other information 126-6 included in the play list element 126-2 may include the next information which designates the play list element 126-2 for a next reproduction after the present reproduction of the play list element 126-2.

As shown in FIG. 7, the Item 204 is a minimum unit to be displayed. In the Item 204, "IN-point information" which indicates the start address of an object and "OUT-point information" which indicates the end address of the object are recorded. Incidentally, each of the "IN-point information" and the "OUT-point information" may directly indicate the address, or indirectly indicate the address as a time period or time point on the reproduction time axis. In the figure, if a plurality of ESs (Elementary Streams) are multiplexed for the object shown by a "stream object #m", designating the Item 204 means designating a special ES or special combination of ESs.

As shown in FIG. 8, the title element 200-2 logically consists of the pre-command 200PR or 126PR, the play list set 126S in which one of the plurality of play lists 126 for reproduction is selected upon the reproduction, the post command 200PS or 126PS, and next information 200-6N. Therefore, a process of selecting the play list 126 from among the play list set 126S is executed, in accordance with some conditions or the like which are reproducible in a system, such as video resolution.

As shown in FIG. 9, however, if the play list set consists of a single play list, i.e., if the play list set 126S shown in FIG. 3 is replaced by a single play list 126, the title element 200-2 may logically consist of the pre-command 200PR or 126PR, the play list 126 to be reproduced upon the reproduction, the post command 200PS or 126PS, and the next information 200-6N. In this case, once the play list set is designated for the reproduction, the reproduction process of the single play list 126 is performed, regardless of the condition or the like which are reproducible in the system.

Again in FIG. 3, the object information file 130 stores therein a storage position (i.e. the logical address targeted for the reproduction) in the object data file 140 for each Item constructed in each play list 126, and/or various attribute information related to the reproduction of the Item. Particularly in this embodiment, the object information file 130 stores an AU table 131 including a plurality of AU (Associate Unit) information 132I (AU #1-AU#q) as mentioned below in detail, an ES (Elementary Stream) map table 134, and other information 138.

The object data file 140 stores a plurality of TS objects 142 for each transport stream (TS) (TS #1 object-TS #s object), i.e. a plurality of entity data of content to be actually reproduced.

Incidentally, each of the four kinds of files discussed with reference to FIG. 3 can be further divided into a plurality of files to be stored. All these files may be managed by the file system 105. For example, the object data file 140 can be divided into a plurality of data files, such as object data file #1, object data file #2 and so on.

As shown in FIG. 10, the TS object 142 shown in FIG. 3, as a logically reproducible unit, may be divided into a plurality of aligned units 143, each having a data amount of 6 kB, for example. The head of the aligned units 143 is aligned with the head of the TS object 142. Each aligned unit 143 is further divided into a plurality of source packets 144 each having a data amount of 192B. The source packet 144 is a physically reproducible unit, on the basis of which (i.e. by the unit of packet) at least the video data, the audio data and the sub-picture data from among the data on the optical disc 100 are multiplexed, and other information may be also multiplexed in the same manner. Each source packet 144 includes control information 145 having a data amount of 4 B to control the reproduction, such as the packet arrival time stamp or the like, which indicates the reproduction start time point of the TS (Transport Stream) packet on the reproduction time axis. Each source packet 144 includes a TS packet payload 146 having a data amount of 188B. The TS packet payload 146 has a packet header 146a at the head portion thereof. The video data may be packetized as a "video packet", the audio data may be packetized as an "audio packet", or the sub-picture data may be packetized as a "sub-picture packet". Alternatively, other data may be packetized.

Incidentally, if the background image data and the button data described later (refer to FIG. 20) are multiplexed on the optical disc 100, the background image data and the button data are also preferably packetized as shown in FIG. 10.

Figure 11:
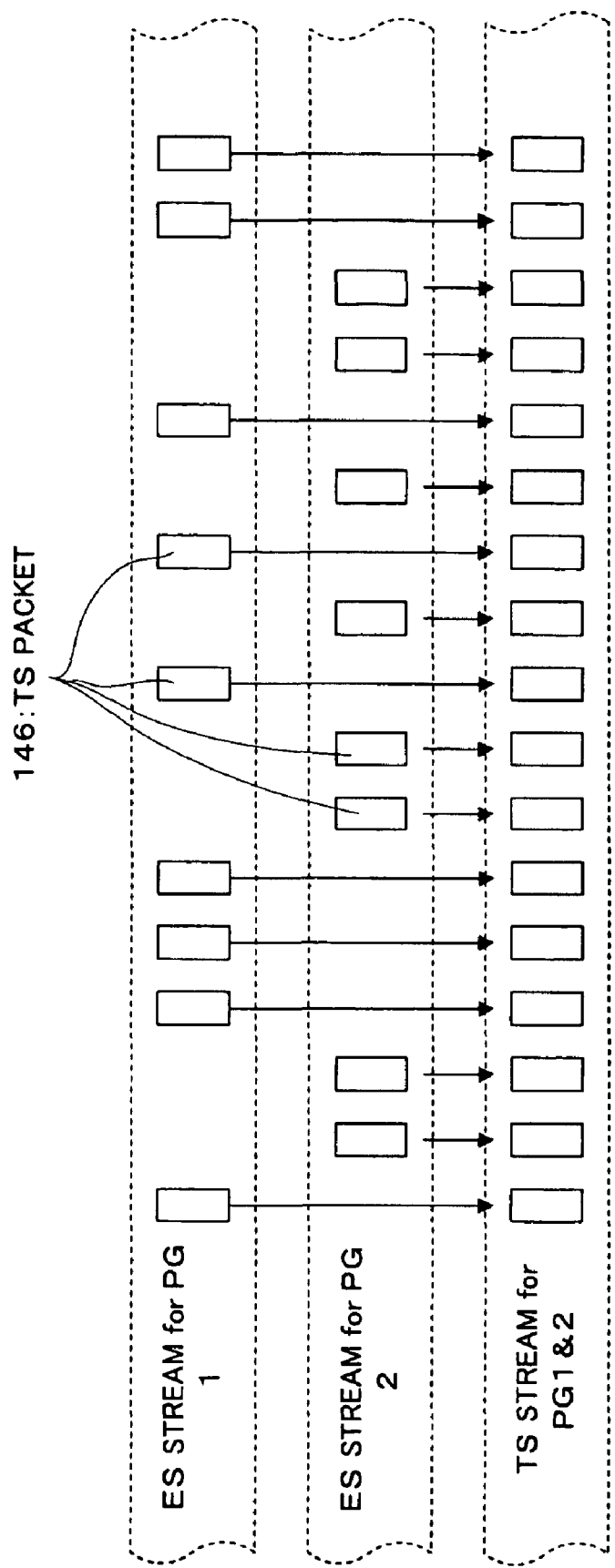
FIG. 11 is a diagram conceptually showing a situation that an elementary stream for a program #1, shown at the top, and an elementary stream for a program #2, shown in the middle, are multiplexed to form a transport stream for these two programs, with the horizontal axis as a time axis.
Figure 12:
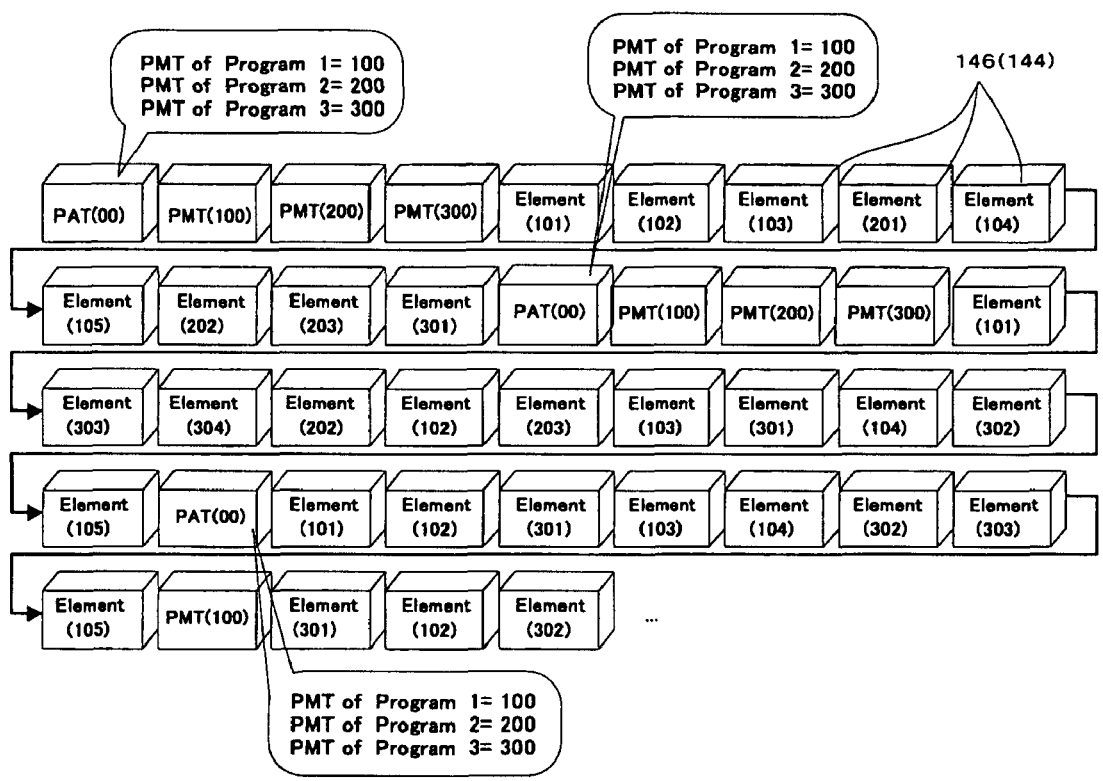
FIG. 12 is a conceptual view conceptually showing an image of TS packets multiplexed in one transport stream in the embodiment, as a packet arrangement along the time axis.

Next, with reference to FIG. 11 and FIG. 12, an explanation is given to such a situation that the video data, the audio data, the sub-picture data and the like are packetized by the TS packet payload 146 shown in FIG. 4 in the transport stream format as shown in FIG. 2(b). FIG. 11 conceptually shows a situation that an elementary stream (ES) for a program #1 (PG1), shown at the top, and an elementary stream (ES) for a program #2 (PG2), shown in the middle, are multiplexed to form a transport stream (TS) for these two programs (PG1&2), with the horizontal axis as a time axis. FIG. 12 conceptually shows an image of the TS packets multiplexed in one transport stream (TS), as a packet array along the time.

As shown in FIG. 11, the elementary stream for the program #1 (at the top) may be formed by discretely arranging TS packets (TS packet payloads 146), obtained by packetizing the video data for the program #1, along the time axis (the horizontal axis). The elementary stream for the program #2 (in the middle) may be formed by discretely arranging TS packet payloads 146, obtained by packetizing the video data for the program #2, along the time axis (the horizontal axis).

Then, these TS packet payloads 146 are multiplexed, so that the transport stream (at the bottom) for the two programs is made. Incidentally, this is omitted for convenience of explanation in FIG. 12, but in fact, as the elementary stream for the program #1, the elementary stream made of TS packet payloads obtained by packetizing the audio data and the sub-picture stream made of TS packet payloads obtained by packetizing the sub-picture data may be also multiplexed similarly, as shown in FIG. 2(b). In addition to this, as the elementary stream for the program #2, the elementary stream made of TS packet payloads obtained by packetizing the audio data and the sub-picture stream made of TS packet payloads obtained by packetizing the sub-picture data may be also multiplexed similarly.

As shown in FIG. 12, in this embodiment, a plurality of TS packet payloads 146 multiplexed in this manner forms one TS stream. Then, the plurality of TS packets 146 are multiplexed and recorded onto the optical disc 100 in this multiplexed manner, with the information such as the packet arrival time stamp 145 being added. Incidentally, in FIG. 12, the TS packet payload 146 which consists of the data that constitutes a program #i (i=1, 2, 3) is indicated by "Element (i0j)", wherein, j (j=1, 2, . . . ) is a sequential number for each stream which constitutes the program. This (i0j) is defined as a packet ID which is an identification number of the TS packet payload 146 for each elementary stream. This packet ID is fixed at an inherent value for a plurality of TS packet payloads 146 to be multiplexed at the same time point, so that the plurality of TS packets 146 are distinguished from each other even if multiplexed at the same time point.

Furthermore, in FIG. 12, a PAT (Program Association Table) and PMTs (Program Map Tables) are also packetized by the TS packet payload 146 unit and multiplexed. The PAT among them stores a table which indicates a plurality of PMT packet IDs. Particularly, the PAT is defined by MPEG2 standard so that (000) is given as a predetermined packet ID, as shown in FIG. 12. That is, from among a plurality of packets multiplexed at the same time point, the TS packet payload 146 obtained by packetizing the PAT is detected, as the TS packet 146 whose packet ID is (000). The PMT stores a table which indicates the packet ID for each of the elementary streams that form each program, in one or more programs. Any packet ID can be given to the PMTs, however, their packet IDs are indicated by the PAT detectable with the packet ID (000) as mentioned above. Therefore, among a plurality of packets multiplexed at the same time point, the TS packets 146 obtained by packetizing the PMTs (i.e. TS packet payloads 146 to which packet IDs (100), (200) and (300) are given in FIG. 12) are detected on the basis of the PAT.

If the transport stream as shown in FIG. 12 is transferred digitally, the tuner refers to the PAT and the PMT constructed in this manner, to thereby extract the multiplexed packets corresponding to the desired elementary stream and decode the extracted packets.

In this embodiment, these PAT and PMT are included as the TS packet payloads 146 to be stored in the TS object 142 shown in FIG. 10. That is, when the transport stream as shown in FIG. 12 is transferred, the transferred stream can be directly recorded onto the optical disc 100 as it is, which is a great advantage.

Furthermore in this embodiment, these PAT and PMT recorded in this manner are not referred to upon reproduction of the optical disc 100. Instead, referring to the AU table 131 and the ES map table 134, shown in FIG. 3 and mentioned in detail later, makes it possible to perform the reproduction more effectively and apply to the complicated multi-vision reproduction or the like. For this, in this embodiment, a relationship between packets and the elementary stream obtained by referring to the PAT and the PMT on decoding or recording, for example, is stored in the object information file 130, in a form of AU table 131 and ES map table 134, without packetizing or multiplexing.

Figure 13:
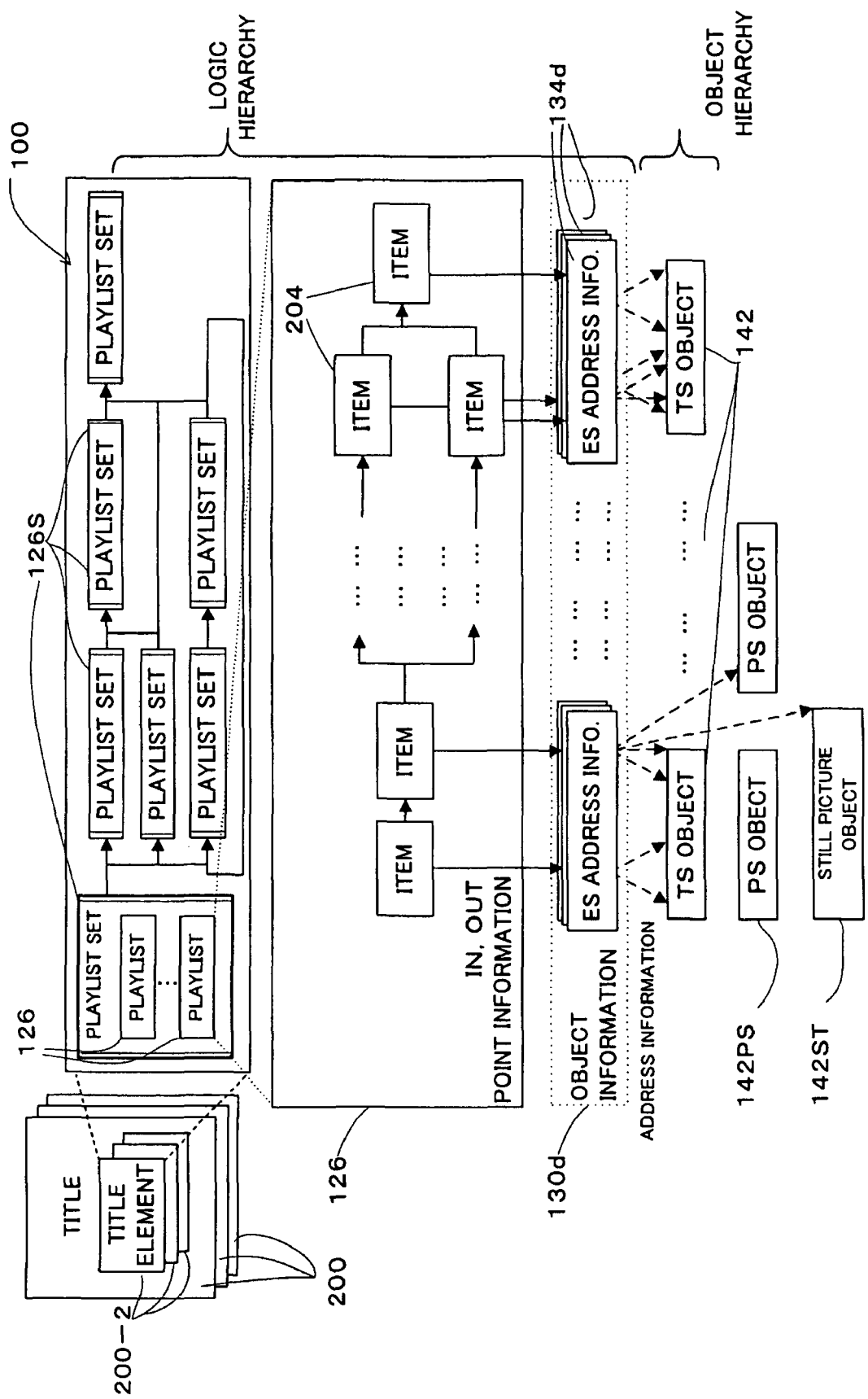
FIG. 13 is a diagram schematically showing the logical structure of data on the optical disc in the embodiment, focusing on development from a logical hierarchy to an object hierarchy or an entity hierarchy.

Next, with reference to FIG. 13, the logical structure of data on the optical disc 100 will be discussed. FIG. 13 schematically shows the logical structure of data on the optical disc 100, focusing on the development from the logical hierarchy to the object hierarchy or the entity hierarchy.

In FIG. 13, one or more titles 200 each of which is a logically large unit, such as one movie or one TV show, are recorded on the optical disc 100. Each title 200 includes one or more title elements 200-2. Each title element 200-2 logically consists of a plurality of play list sets 126S. In each title element 200-2, the plurality of play list sets 126S may have a sequential structure or may have a branch structure.

Incidentally, in the case of a simple logical structure, one title element 200 consists of one play list set 126S. Furthermore, one play list set 126S consists of one play list 126. Moreover, it is possible to refer to one play list set 126S from the plurality of title elements 200-2 or the plurality of titles 200.

Each play list 126 is logically made of a plurality of Items (play Items) 204. In each play list 126, a plurality of Items 204 may have the sequential structure or may have the branch structure. On the other hand, it is possible to refer to one Item 204 from a plurality of play lists 126. The aforementioned IN-point information and OUT-point information recorded on/in the Item 204 logically designates the reproduction range of the TS object 142. Then, the object information 130d of the logically designated reproduction range is referred to and thereby the reproduction range of the TS object 142 is physically designated, via the file system finally. Here, the object information 130d includes various information to reproduce the TS object 142, such as the attribute information of the TS object 142 and ES address information 134d required for the data search in the TS object 142 (Incidentally, the ES map table 134 shown in FIG. 3 includes a plurality of ES address information 134d).

Then, when an information recording/reproducing apparatus reproduces the TS object 142 as mentioned below, a physical address to be reproduced in the TS object 142 is obtained from the Item 204 and the object information 130d so that a desired elementary stream is reproduced.

Incidentally, a EP (Entry Pass) map including a plurality of ES address information 134d, shown in the object information in FIG. 13, herein indicates an object information table in which the AU table 131 and the ES amp table 134 are listed.

As described above, in this embodiment, the IN-point information and OUT-point information recorded on/in the Item 204, as well as the ES address information 134d recorded in the ES map table 134 (refer to FIG. 3) of the object information 130d make it possible to perform the association from the logical hierarchy to the object hierarchy in the reproduction sequence so that the elementary stream can be reproduced.

As discussed above in detail, in the embodiment, the multiplexing and recording are performed by the unit of TS packet payload 146 on the optical disc 100. By this, the transport stream including a plurality of elementary streams as shown in FIG. 2(b) can be recorded onto the optical disc 100. According to this embodiment, if digital broadcast is recorded onto the optical disc 100, a plurality of shows or programs can be recorded at the same time, within the limit of a recording rate. Nevertheless, a recording method is employed herein, in which a plurality of shows or programs are multiplexed and recorded for one TS object 142. Hereinafter, an explanation will be given to an embodiment of the information recording/reproducing apparatus capable of performing such a recording process.

(Information Recording/Reproducing Apparatus)

Figure 14:
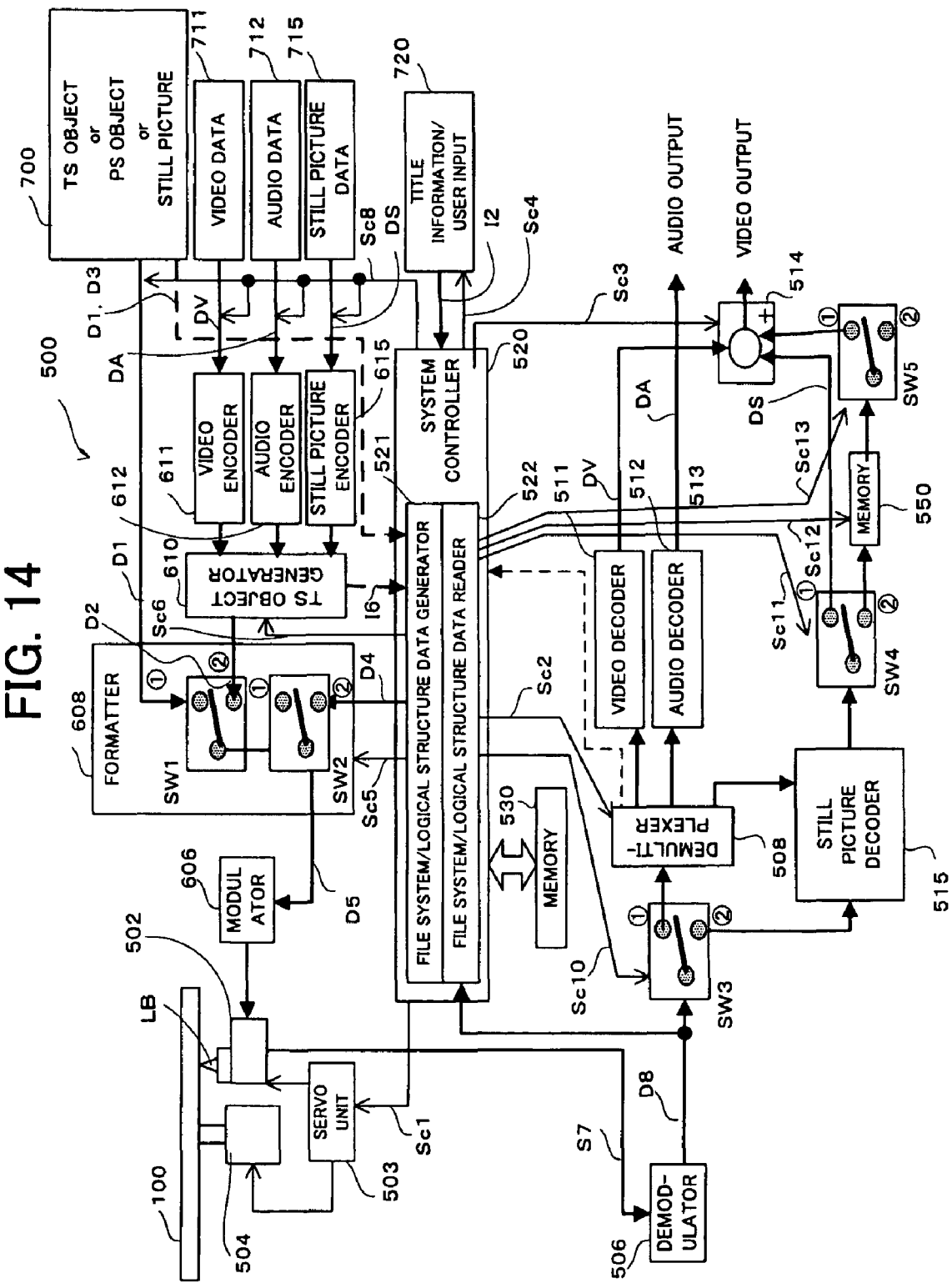
FIG. 14 is a block diagram showing an information recording/reproducing apparatus in the embodiment of the present invention.

Next, with reference to FIG. 14 to FIG. 19, an embodiment of the information recording/reproducing apparatus of the present invention is discussed. Here, FIG. 14 is a block diagram showing the information recording/reproducing apparatus. FIG. 15 to FIG. 19 are flowcharts showing the operation thereof.

In FIG. 14, an information recording/reproducing apparatus 500 is broadly divided into a reproduction system and a record system. The apparatus 500 is constructed to record the information onto the optical disc 100 mentioned above and reproduce the information recorded thereon. In this embodiment, the information recording/reproducing apparatus 500 is thus for recording and reproduction. Nevertheless, an embodiment of the information recording apparatus according to the present invention can be constructed basically with the record system of the apparatus 500, and an embodiment of the information reproducing apparatus according to the present invention can be constructed basically with the reproduction system of the apparatus 500.

The information recording/reproducing apparatus 500 is provided with: an optical pickup 502; a servo unit 503; a spindle motor 504; a demodulator 506; a demultiplexer 508; a video decoder 511; an audio decoder 512; an adder 514; a still picture decoder 515; a system controller 520; a memory 530; a memory 550; a modulator 606; a formatter 608; a TS/PS object generator 610; a video encoder 611; an audio encoder 612; and a still picture encoder 615. The system controller 520 includes a file system/logical structure data generator 521 and a file system/logical structure data reader 522. Furthermore, the memory 530 and a user interface 720 to give a user input, such as title information, are connected to the system controller 520.

Among these constitutional elements, the demodulator 506, the demultiplexer 508, the video decoder 511, the audio decoder 512, the adder 514, the still picture decoder 515, and the memory 550 mainly constitute the reproduction system. On the other hand, among these constitutional elements, the modulator 606, the formatter 608, the TS/PS object generator 610, the video encoder 611, the audio encoder 612 and the still picture encoder 615 mainly constitute the record system. The optical pickup 502, the servo unit 503, the spindle motor 504, the system controller 520, the memory 530 and the user interface 720 to give the user input, such as the title information, are generally shared for both the reproduction system and the record system. Furthermore, for the record system, a TS object data source 700 (or a PS object data source 700, or a still picture data source 700 of bitmap data and JPEG data etc.); a video data source 711; an audio data source 712; and a still picture data source 715 are prepared. Furthermore, the file system/logical structure data generator 521 disposed in the system controller 520 is used mainly in the record system, and the file system/logical structure reader 522 is used mainly in the reproduction system.

The optical pickup 502 irradiates the optical disc 100 with a light beam LB such as a laser beam, at the first power as reading light for the reproduction, and at the second power with the light beam LB being modified as writing light for recording. The servo unit 503 performs focus servo, tracking servo and the like for the optical pickup 502, as well as the spindle servo for the spindle motor 504, under the control of a control signal Sc1 outputted from the system controller 520, upon the reproduction and recording. The spindle motor 504 is constructed to rotate the optical disc 100 at a predetermined speed, under the spindle servo by the servo unit 503.

Incidentally, the still picture encoder 615 may be constructed to encode sub-picture data as the TS object. The still picture decoder 515 may be constructed to decode the sub-picture data.

(i) Structure and Operation of Record System:

Next, with reference to FIG. 14 to FIG. 18, the specific structure and the operation of each constitutional element which constitutes the record system of the information recording/reproducing apparatus 500 will be explained.

(i-1) In the case where the already prepared TS object is used:

This case will be discussed, with reference to FIG. 14 and FIG. 15.

In FIG. 14, the TS object data source 700 may be made of a memory storage, such as a video tape and a memory, to store TS object data D1.

Figure 15:
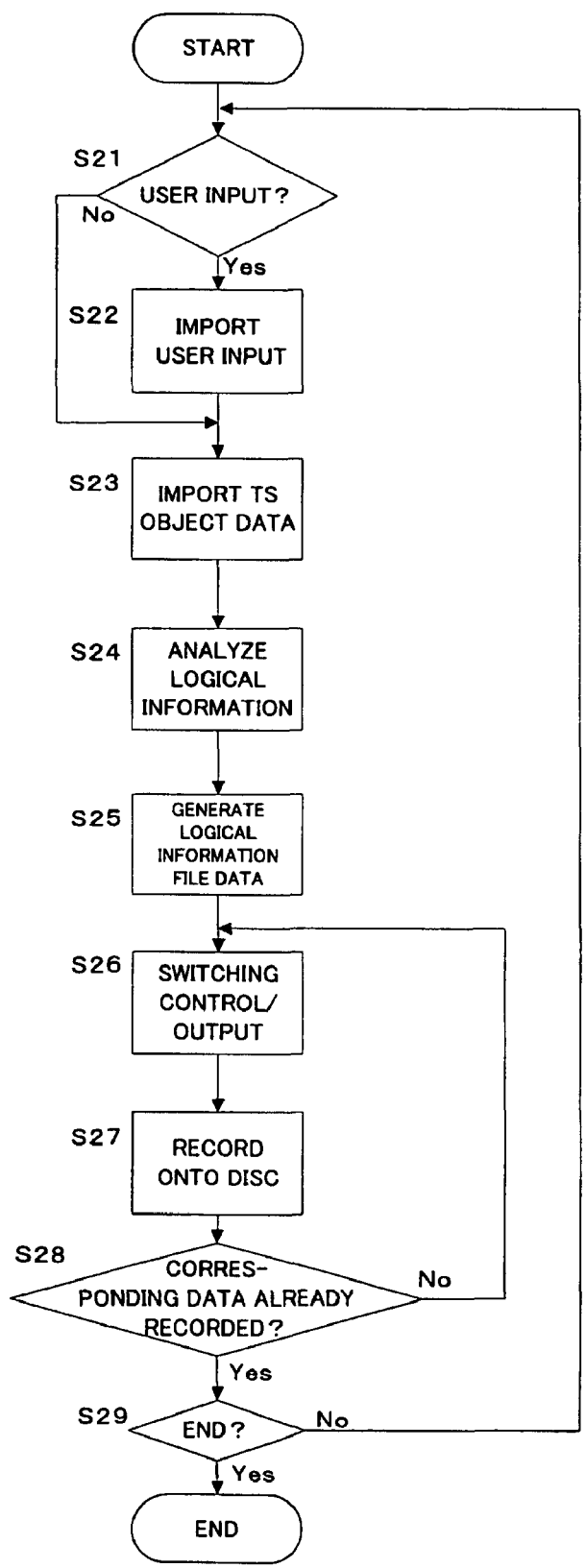
FIG. 15 is a flowchart showing the recording operation (part 1) of the information recording/reproducing apparatus in the embodiment of the present invention.

In FIG. 15, firstly, each title information (e.g. the content of the play list, etc.) to be logically constructed on the optical disc 100 by using the TS object data D1 is inputted into the system controller 520, as a user input I2 such as the title information, via the user interface 720. Then, the system controller 520 imports the user input I2, such as the title information, via the user interface 720 (step S21: Yes, and step S22). In this case, under the control of the control signal Sc4 from the system controller 520, the user interface 720 can perform an input process in response to the content to be recorded, such as selection via the title menu screen. Incidentally, if the user input is already performed (the step S21: No), these processes are omitted.

Then, the TS object data source 700 outputs the TS object data D1, under the control of a control signal Sc8 which indicates the data reading from the system controller 520. Then, the system controller 520 imports the TS object data D1 from the TS object data source 700 (step S23), and performs the data array analysis (e.g. a record data length, etc.) of the TS object data D1 and the analysis of each elementary stream structure (e.g. ES_PID (elementary stream packet identification number)), on the basis of the PAT and the PMT etc. packetized with the video data as mentioned above, due to the TS analysis feature in the file system/logical structure data generator 521 (step S24).

Then, the system controller 520 makes the file system/logical structure data generator 521 prepare the disc information file 110, the play list information file 120, the object information file 130, and the file system 105 (refer to FIG. 3), as logical information file data D4, on the basis of the analysis result of each elementary stream and the data array of the TS object data D1, as well as the user input I2, such as the imported title information (step S25). The memory 530 is used to prepare this logical information file data D4.

Incidentally, variations can be considered, obviously, such as preparing in advance data about the data array of the object data D1, the structure information of each elementary stream, and the like. They are also in the scope of the present invention.

In FIG. 14, the formatter 608 is an apparatus for formatting the data array to store both the TS object data D1 and the logical information file data D4 on the optical disc 100. More specifically, the formatter 608 is provided with a switch Sw1 and a switch Sw2, and is switching-controlled by a switch control signal Sc5 from the system controller 520. Upon the format of the TS object data D1, it connects the switch S21 to a ① side and connects the switch Sw2 to the ① side so as to output the TS object data D1 from the TS object data source 700. Incidentally, the transmission control of the TS object data D1 is performed by the control signal Sc8 from the system controller 520. On the other hand, upon the formatting of the logical information file data D4, the formatter 608 is switching-controlled by the switch control signal Sc5 from the system controller 520, and connects the switch Sw2 to a ② side so as to output the logical information file data D4.

In a step S26 in FIG. 15, by the switching-control performed by the formatter 608 constructed in this manner, (i) the logical information file data D4 from the file system/logical structure data generator 521 in the step S25 and (ii) the TS object data D1 from the TS object data source 700 are outputted via the formatter 608 (step S26).

A selection output from the formatter 608 is transmitted to the modulator 606 as disc image data D5, modulated by the modulator 606, and recorded onto the optical disc 100 via the optical pickup 502 (step S27). The disc recording control at this time is also performed by the system controller 520.

If the logical information file data D4 generated in the step S25 and the corresponding TS object data D1 are both not recorded, the operational flow returns to the step S26 to continue the recording (step S28: No). Incidentally, as for the recording order, either of the logical information file data D4 and the corresponding TS object data D1 can be firstly recorded.

On the other hand, if they are both recorded, it is judged whether or not to end the recording with respect to the optical disc 100 on the basis of the presence or absence of an end command or the like (step S29). If it is not to be ended (the step S29: No), the operational flow returns to the step S21 to continue the recording process. On the other hand, if it is to be ended (the step S29: Yes), a series of the recording process is ended.

In the above manner, the recording process in the case where the already prepared TS object is used is performed by the information recording/reproducing apparatus 500.

Incidentally, in the example shown in FIG. 15, after the logical information file data D4 is prepared in the step S25, the data output of the logical information file data D4 and the corresponding TS object data D1 is performed in the step S26. However, the output of the TS object data D1 and the recording onto the optical disc 100 may be performed before the step S25, and after the recording or in parallel with the recording, the logical information file data D4 can be generated or recorded.

In addition, in place of the TS object data source 700, it is possible to use the PS object data source or the still picture data source. In this case, the recording process for the TS object data D1 discussed above is performed in the same manner, with respect to the PS object data or the still picture data, such as bitmap data and JPEG data, in place of the TS object data D1. Then, the PS object data or the still picture data is stored into the object data file 140. Then, various logical information about the PS object data or the still picture data is generated under the control of the system controller 520, and stored into the disc information file 110, the play list information file 120, the object information file 130, and the like.

Moreover, in the embodiment, the recording process for the TS object data D1 discussed above is also performed in the same manner, with respect to the background image data and the button data (refer to FIG. 20), which is one example of the PS object data or the still picture data. Then, the background image data and the button data are stored into the object data file 140. Then, various logical information about background image data and the button data is generated under the control of the system controller 520, and stored into the disc information file 110, the play list information file 120, the object information file 130, and the like.

Figure 16:
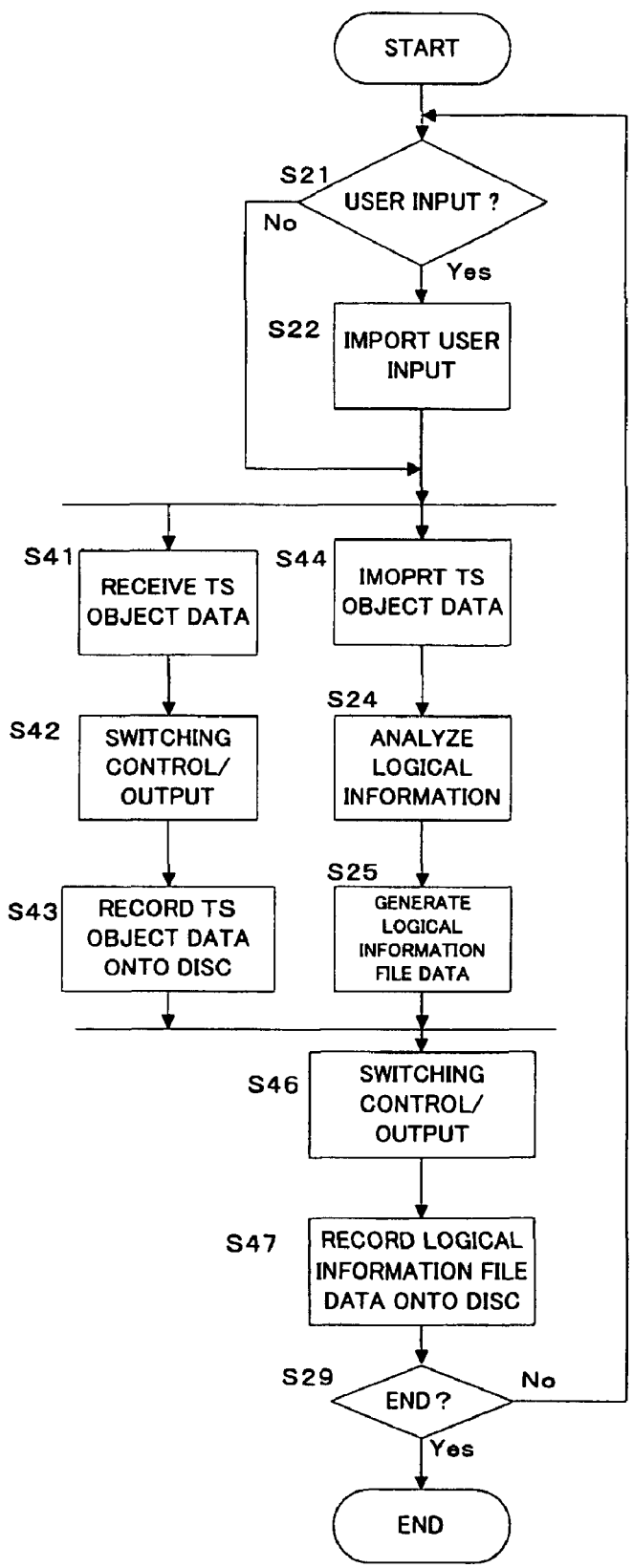
FIG. 16 is a flowchart showing the recording operation (part 2) of the information recording/reproducing apparatus in the embodiment of the present invention.

(i-2) In the case where the transport stream on air is received and recorded:

This case will be discussed with reference to FIG. 14 and FIG. 16. Incidentally, in FIG. 16, the same steps as those in FIG. 15 have the same step reference numbers, and their explanation is omitted, as occasion demands.

Again, in this case, the similar process is performed, as in "the case where the already prepared TS object is used" described above. Therefore, the following explanation is focused on the differences from this case.

In the case where the transport stream on air is received and recorded, the TS object data source 700, which is provided with a receiver (set top box) for receiving the digital broadcast on air, for example, receives the TS object data D1, and transmits it to the formatter 608 in real time (step S41). At the same time, reception information D3 (i.e. information corresponding to the data transmitted through the receiver and the interface of the system controller 520) including program construction information and ES_PID information described later, which are deciphered upon receiving, is imported into the system controller 520 and is stored into the memory 530 (step S44).

In the meantime, the TS object data D1 outputted to the formatter 608 is outputted to the modulator 606 under the switching-control by the formatter 608 (step S42), and is recorded onto the optical disc 100 (step S43).

Along with these operations, using the program construction information and the ES_PID information included in the reception information D3 imported upon receiving and stored in the memory 530, the file system/logical structure data generator 521 prepares the logical information file data D4 (step S24 and step S25). Then, after the completion of the recording of a series of the TS object data D1, this logical information file data D4 is additionally recorded onto the optical disc 100 (step S46 and step S47). Incidentally, these steps S24 and S25 may be performed after the step S43.

Moreover, as the occasion demands (e.g. in the case where one portion of the title is edited, or the like), by adding the user input I2, such as the title information, from the user interface 720 to the program construction information and the ES_PID information stored in the memory. 530, it is possible to prepare the logical information file data D4 by the system controller 520 and additionally record this onto the optical disc 100.

As described above, the information recording/reproducing apparatus 500 performs the recording process in the case where the transport stream on air is received and recorded in real time.

Incidentally, if all the reception data obtained upon broadcasting is once stored into an archive apparatus, and then, if this is used as the TS object source 700, the same process as that in "the case where the already prepared object is used" will do.

Figure 17:
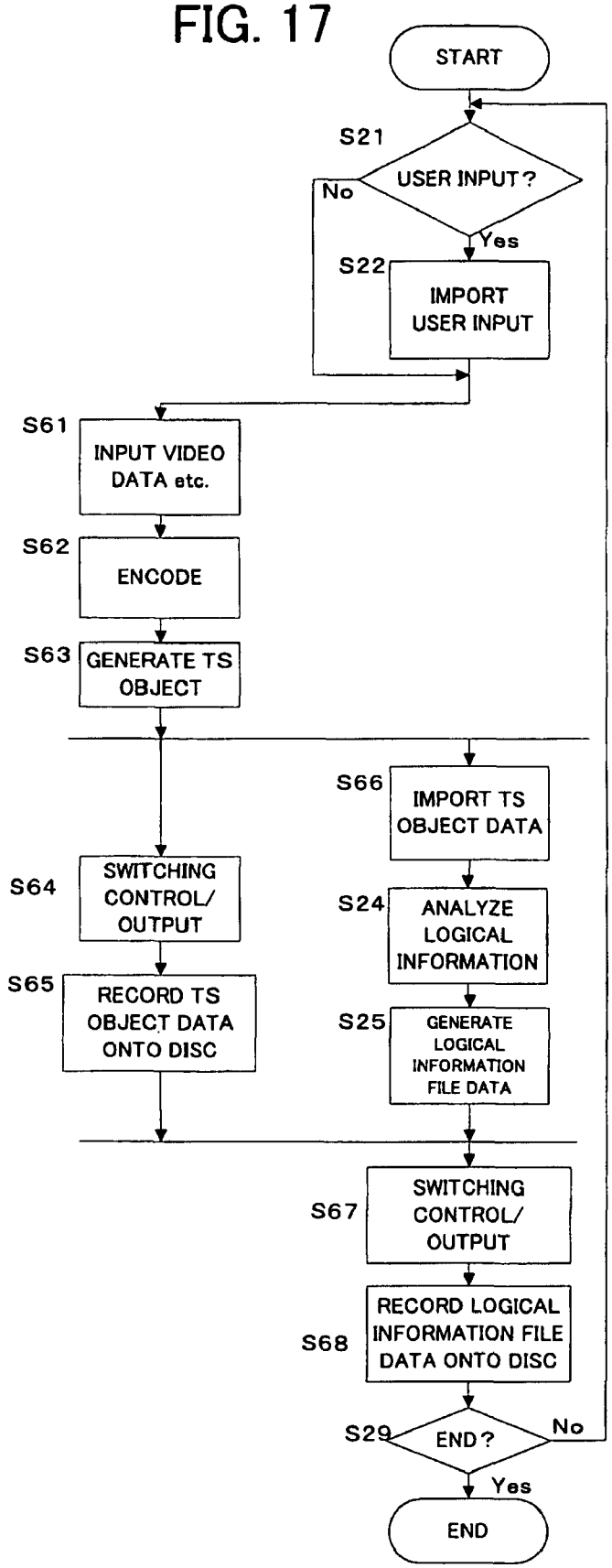
FIG. 17 is a flowchart showing the recording operation (part 3) of the information recording/reproducing apparatus in the embodiment of the present invention.

(i-3) In the case where the video data, the audio data and the sub-picture data are recorded:

This case will be discussed with reference to FIG. 14 and FIG. 17. Incidentally, in FIG. 17, the same steps as those in FIG. 15 have the same step reference numbers, and their explanation is omitted as occasion demands.

In the case where the video data, the audio data, and the sub-picture data are recorded, which are individually prepared in advance, the video data source 711, the audio data source 712, and the still picture data source 715 are individually provided with a memory storage, such as a video tape and a memory, and store video data DV, audio data DA, and sub-picture data DS, respectively.

These data sources are controlled by the control signal Sc8 which gives an instruction for reading out the data from the system controller 520, and they transmit the video data DV, the audio data DA, and the still picture data DS, to the video encoder 611, the audio encoder 612, and the still picture encoder 615, respectively (step S61). Then, the video encoder 611, the audio encoder 612, and the still picture encoder 615 execute a predetermined type of encode process (step S62).

The TS/PS object generator 610 is controlled by a control signal Sc6 from the system controller 520 and converts the data encoded in this manner to the TS object data which constitutes the transport stream (step S63). In this case, the data array information of each TS object data (e.g. a record data length and the like) and the construction information of each elementary stream (e.g. the ES_PID, as described later, and the like) are transmitted as information I6 from the TS/PS object generator 610 to the system controller 520 and are stored into the memory 530 (step S66).

On the other hand, the TS object data generated by the TS/PS object generator 610 is transmitted to the ② side of the switch Sw1 of the formatter 608. Namely, when formatting the TS object data from the TS object generator 610, the formatter 608 is switching-controlled by the switch control signal Sc5 from the system controller 520 to shift the switch Sw1 to the ② side and the switch Sw2 to the ① side, thereby outputting the TS object data (step S64). Then, this TS object data is recorded onto the optical disc 100 through the modulator 606 (step S65).

Along with these operations, using the data array information of each TS object data and the construction information of each elementary stream imported as the information I6 into the memory 530, the file system/logical structure data generator 521 prepares the logical information file data D4 (step S24 and step S25). Then, after the completion of the recording of a series of TS object data D2, the logical information file data D4 is additionally recorded onto the optical disc 100 (step S67 and step S68). Incidentally, the step S24 and the step S25 may be processed after the step S65.

Moreover, as the occasion demands (e.g. in the case where one portion of the title is edited), by adding the user input I2, such as the title information, from the user interface 720 to these information stored in the memory 530, it is possible to prepare the logical information file data D4 by the file system/logical structure generator 521 and additionally record this onto the optical disc 100.

As described above, the information recording/reproducing apparatus 500 performs the recording process in the case where the video data, the audio data, and the sub-picture data are recorded, which are individually prepared in advance.

Incidentally, this recording process is applicable even when an arbitrary content the user has is recorded.

Figure 18:
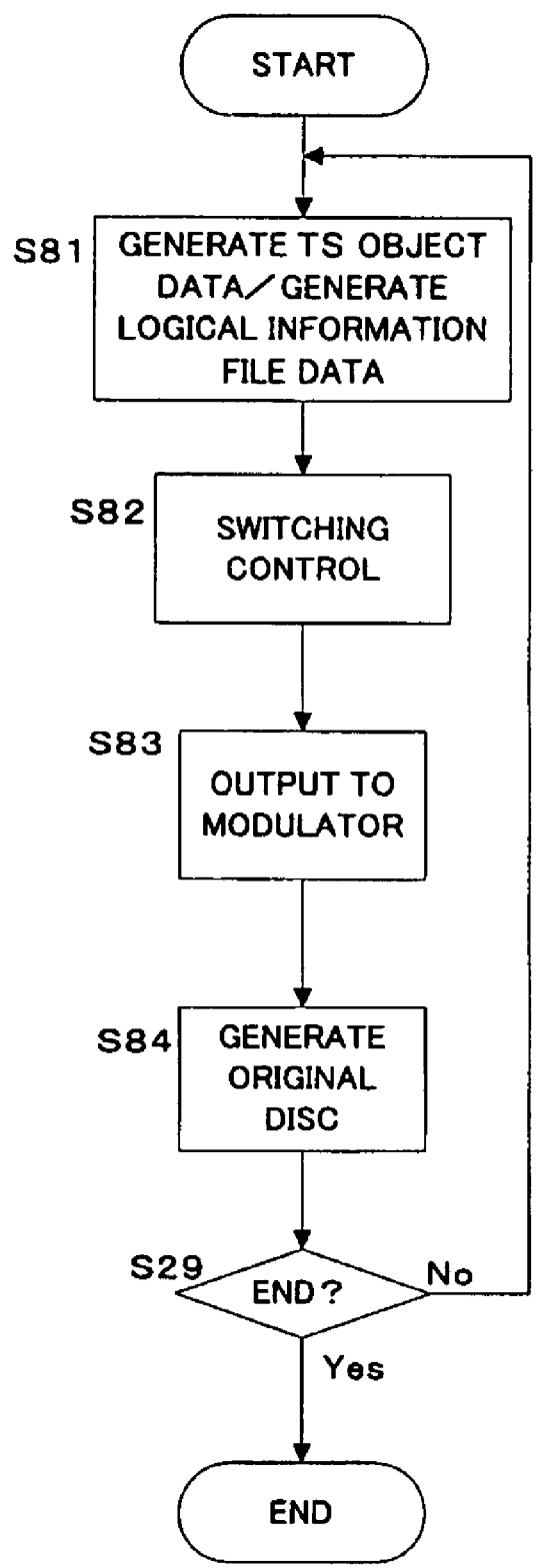
FIG. 18 is a flowchart showing the recording operation (part 4) of the information recording/reproducing apparatus in the embodiment of the present invention.

(i-4) In the case where the data is recorded by authoring:

This case will be explained with reference to FIG. 14 and FIG. 18. Incidentally, in FIG. 18, the same steps as those in FIG. 15 have the same step reference numbers, and their explanation is omitted as occasion demands.

In this case, by combining the three types of recording processes in the above-mentioned three cases, an authoring system generates the TS object, the logical information file data, and the like in advance (step S81), and then completes the process until switching-control performed at the formatter 608 (step S82). Then, the information obtained by this operation is transmitted, as the disc image data D5, to the modulator 606 equipped in front of and/or behind an original disc cutting machine (step S83), and this cutting machine prepares the original disc (step S84).

Particularly in this embodiment, in (i) Structure and Operation of Record System described above, the play list information file 120 is recorded such that the play list 126 includes the Item 204 which designates the content information and a Sub Item which designates the button data corresponding to each Item 204. Thus, as explained next, a button (or button menu) is reproduced by the corresponding Sub Item and the display of the reproduced button menu is selectively changed, during the reproduction and display output of the title by the Item, to thereby efficiently change the display of the button menu with the title reproduction continued. The "button menu" in the embodiment has a concept including a menu screen displayed on a screen which allows various operations and including a menu screen in general on which the operations are performed by selecting a button displayed thereon.

(ii) Structure and Operation in Reproduction System

Next, the specific structure and operation of each constitutional element which constitutes the reproduction system of the information recording/reproducing apparatus 500 will be discussed with reference to FIG. 14 and FIG. 19.

In FIG. 14, by the user interface 720, the title to be reproduced from the optical disc 100, its reproduction condition and the like are inputted to the system controller 520, as the user input I2, such as the title information. In this case, under the control of the control signal Sc4 from the system controller 520, an input process suitable for the content to be reproduced, such as selection on a title menu screen, can be achieved by the user interface 720.

Responding to this, the system controller 520 controls the disc reproduction with respect to the optical disc 100, and the optical pickup 502 transmits a reading signal S7 to the demodulator 506.

The demodulator 506 demodulates a record signal recorded onto the optical disc 100 from this reading signal S7, and outputs it as demodulated data D8. The logical information file data (i.e. the file system 105, the disc information file 110, the P list information file 120, and the object information file 130, shown in FIG. 3) included in this demodulated data D8 as being a not-multiplexed information part is supplied to the system controller 520. On the basis of this logical information file data, the system controller 520 executes various reproduction control, such as a process of determining a reproduction address and controlling the optical pickup 502.

On the other hand, depending on whether the TS object data is included as the multiplexed information part in the demodulated data D8, or whether the still picture data is included, or whether both data are included, a shift switch Sw3 is shifted to the demultiplexer 508 side which is the ① side or shifted to the still decoder 515 side which is the ② side, under the control of a control signal Sc10 from the system controller 520. By this, the TS object data is selectively supplied to the demultiplexer 508, and the still picture data is selectively supplied to the still picture decoder 515.

Then, as for the TS object data included as the multiplexed information part in the demodulated data D8, the demultiplexer 508 demultiplexes the TS object data, under the control of a control signal Sc2 from the system controller 520. Here, when the access to the reproduction position address is ended under the reproduction control by the system controller 520, the control signal Sc2 is transmitted to start the demultiplexing.

The video packet, the audio packet, and the sub-picture packet are individually transmitted from the demultiplexer 508, and supplied to the video decoder 511, the audio decoder 512 and the still picture decoder 515, respectively. Then, the video data DV, the audio data DA and the sub-picture data DS are individually decoded. Then, the video data DV is supplied to the adder 514, and the audio data DA is outputted as an audio output.

In the embodiment, the sub-picture data or still picture data outputted from the still picture decoder 515 is supplied to a switch SW4. The SW4 is shifted to the adder 514 side which is the side or shifted to the memory 550 side which is the ② side, under the control of a control signal Sc11 from the system controller 520, depending on whether the data supplied from the still picture decoder 515 is the sub-picture data DS or the still picture data. By this, the sub-picture data DS is selectively supplied to the adder 514, and the still picture data is selectively supplied to the memory 550.

The adder 514 is controlled by a control signal Sc3 which gives an instruction of mixing from the system controller 520, and mixes or superimposes, in predetermined timing, the video data DV and the sub-picture data DS, which are respectively decoded at the video decoder 511 and the still picture decoder 515. The result is outputted as a video output from the information recording/reproducing apparatus 500 to a TV monitor, for example. In addition, the adder 514 mixes or superimposes the still picture data supplied from a switch SW5 in predetermined timing, as described later, with the video data DV and the sub-picture data DS.

In this case, the sub-picture data DS may be separately supplied to the adder 514 via a not-illustrated memory. Alternatively, the sub-picture data DS may be temporarily stored in the memory 550 once, as in the case of the still picture data described later. In this case, it is preferable that the sub-picture data DS is outputted from the memory 550, selectively or in predetermined timing, under the control of the control signal from the system controller 520, and then superimposed on the video data DV, as occasion demands. In other words, as compared to the case where the sub-picture data outputted from a sub-picture decoder 513 is superimposed as it is, it is easier to control the timing and the necessity of the superimposing. For example, under the output control using the control signal, it is possible to select whether or not subtitles using the sub-picture are displayed or whether or not a menu screen using the sub-picture is displayed.

On the other hand, as for the still picture data (e.g. the background image data or the button data described later) supplied to the still picture decoder 515, the SW4 is shifted to the ② side under the control of the control signal Sc11. In other words, it is preferable that the background image data and the button data used for button-menu display are stored in the memory 550 before the display output. By this, it is possible to perform the display output of the button menu, with it separated from the reproduction of the normal content, such as the video data. Thus, it is possible to display the button menu without any influence on the content reproduction.

In addition, the background image data and the button data are supplied to the adder 514 via the switch SW5, in predetermined timing or selectively, under the control of the control signal Sc12. By this, the still picture data (i.e. the background image data or the button data, for example) is superimposed on the video data DV and the sub-picture data DS, as occasion demands. In other words, as compared to the case where the still picture data outputted from the still picture decoder 515 is superimposed as it is, it is easier to control the timing and the necessity of the superimposing. For example, under the output control using the control signal Sc12, it is possible to select whether or not a still picture, such as a menu screen or a window screen, using the still picture data or a still picture as being a background image using the still picture data is displayed on a main picture (or video) or sub-picture.

Additionally, under the control of a control signal Sc13 from the system controller 520, the still picture data may be outputted via another route (not shown), with the aid of the shift switch Sw5 shifted to ② side.

Incidentally, in outputting the background image data and the button data in the switch SW5, it is preferable to supply the button menu which is prepared by superimposing or overlapping a button image defined by the button data, onto a background image which is defined by the background image data, under the control of the control signal Sc 13 form the system controller 520. Incidentally, the button menu will be discussed later in detail (refer to FIG. 21 etc.).

On the other hand, the audio data DA decoded by the audio decoder 512 is outputted, as an audio output, from the information recording/reproducing apparatus 500 to an external speaker, for example.

Incidentally, although the packets obtained by packetizing the PAT or the PMT, included in the transport stream shown in FIG. 6, are included as a part of the demodulated data D8, they are discarded or abandoned on the demultiplexer 508.

Here, the specific example of a reproduction process routine performed by the system controller 520 will be discussed with reference to a flowchart of FIG. 19.

Figure 19:
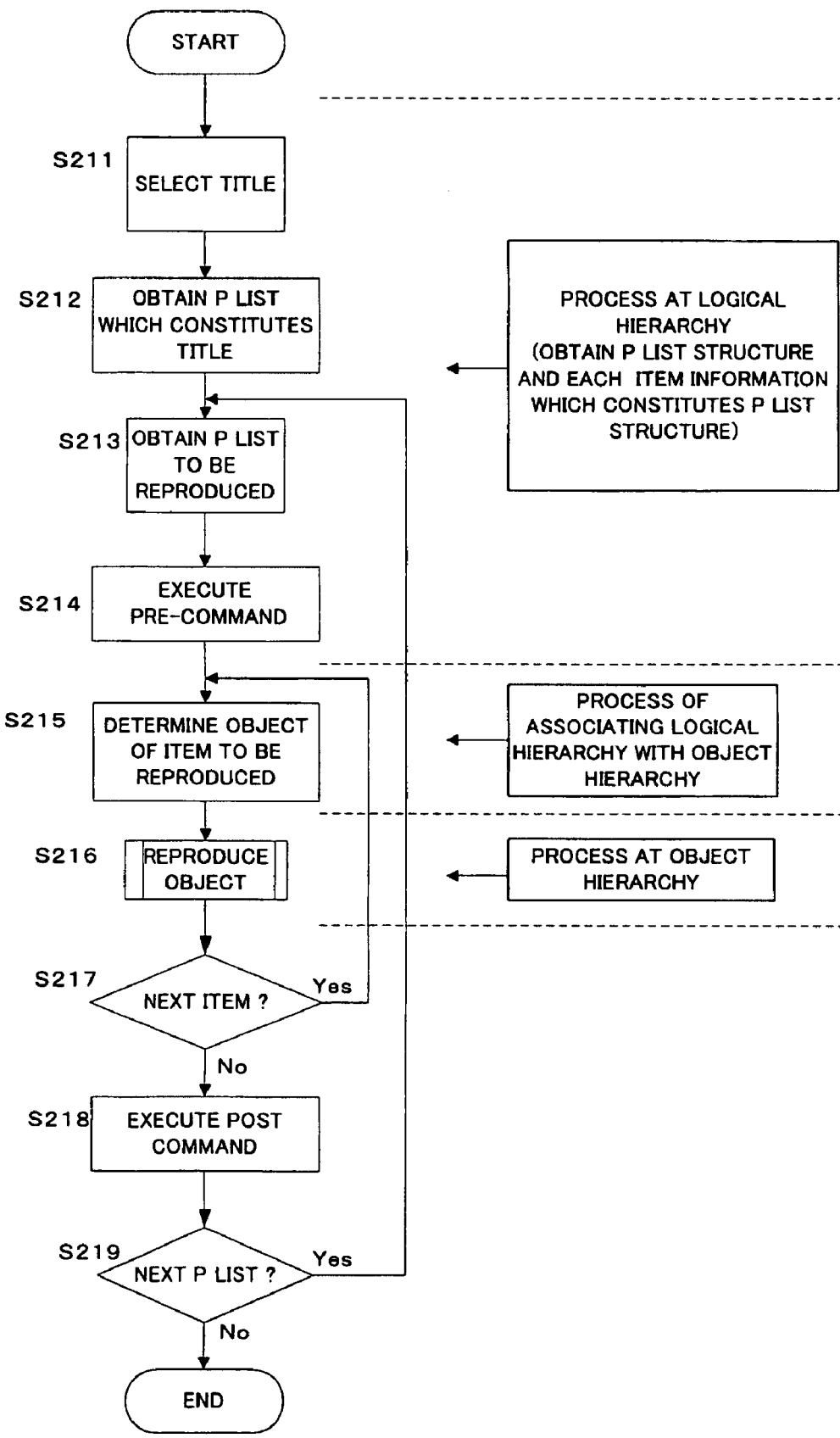
FIG. 19 is a flowchart showing the reproduction operation of the information recording/reproducing apparatus in the embodiment of the present invention.

In FIG. 19, it is assumed that as an initial state, the recognition of the optical disc 100 in the reproduction system and the recognition of a volume structure and a file structure by the file system 105 (refer to FIG. 3) have been already completed by the system controller 520 and the file system/logical structure data reader 522 inside of the system controller 520. Here, an explanation is made on the operational flow after obtaining the total quantity of the titles from the disc general information 112 in the disc information file 110 and then selecting one title 200 from the total title quantity.

Firstly, the selection of the title 200 is performed via the user interface 720 (step S211). Responding to this, the system controller 520 obtains the information about the reproduction sequence from a reading result of the file system/logical structure data reader 522. Incidentally, in the selection of the title 200, the desired title element(s) 200-2 (refer to FIG. 4) may be selected from among all the title elements 200-2 which constitute the title 200, with the aid of an external input operation by the user with using a remote controller and the like. Alternatively, one title element 200-2 may be selected automatically depending on a system parameter or the like adjusted for the information recording/reproducing apparatus 500.

Then, the content of a plurality of play lists 126 which constitute a play list set 126S corresponding to the selected title 200 (title element 200-2) is obtained. Here, as a process at a logical hierarchy, the information about the structure of each play list 126 and each Item 204 which constitutes each play list 126 (refer to FIG. 5, FIG. 6 and FIG. 13) is obtained (step S212).

Then, the content of the play list 126 to be reproduced is obtained from among the plurality of play lists 126 obtained in the step S212. For example, herein, the reproduction is started from the play list #1, and the content of the corresponding play list 126 is obtained (step S213). The content of the play list 126 may be one or more play list elements 126-2 (refer to FIG. 5), which are obtained in the obtaining process in the step S213.

Then, the pre-command 126PR (refer to FIG. 5) included in this play list 126 is executed (step S214). Incidentally, it is possible for the pre-command 126PR to select one of the plurality of play lists 126 which have a certain relationship to constitute the play list set 126S. If the play list element 126-2 which constitutes the play list 126 does not have the pre-command 126PR, this process is omitted.

Then, the TS object 142 (refer to FIG. 3 and FIG. 10) to be reproduced is determined (step S215), on the basis of the Item 204 (refer to FIG. 5 to FIG. 7) identified by the play list 126 obtained in the step S213. More specifically, on the basis of the Item 204, the object information file 130 (refer to FIG. 3) related to the TS object 142 as the reproduction target is obtained, and a stream number, address and the like of the TS object 142 to be reproduced are identified.

Incidentally, in this embodiment, also the AU (Association Unit) information 132I and PU (Presentation Unit) information 302I described below are also obtained as the information stored in the object information file 130. On the basis of these information, the above-mentioned logical hierarchy is associated with the object hierarchy (refer to FIG. 13).

Then, the reproduction of the TS object 142 determined in the step S215 is actually started. That is, on the basis of the process at the logical hierarchy, the process at the object hierarchy is started (step S216).

During the reproduction of the TS object 142, it is judged whether or not there is a next Item 204 which constitutes the play list 126 to be reproduced (step S217). Then, as long as there is the next Item 204 (the step S217: Yes), the operational flow goes back to the step S215 to repeat the above-mentioned determination and reproduction of the TS object 142.

On the other hand, in the judgment in the step S217, if it is judged that there is no next Item 204 (the step S217: No), the post command 126PS (refer to FIG. 5) corresponding to the presently executed play list 126 is executed (step S218). Incidentally, if the play list element 126-2 which constitutes the play list 126 does not have the post command 126PS, this process is omitted.

Then, it is judged whether or not there is a next play list 126 which constitutes the selected title 200 (step S219). If there is any (the step S219: Yes), the operational flow goes back to the step S213 to repeat the processes after the obtaining process of the play list 126 to be reproduced.

On the other hand, in the judgment in the step S219, if it is judged that there is no next play list 126 (the step S219: No), i.e. if the all play lists 126 to be reproduced corresponding to the title 200 selected in the step S211 are completely reproduced, a series of reproduction operations or processes is ended.

As discussed above, the information recording/reproducing apparatus 500 in this embodiment reproduces the optical disc 100.

Particularly in the embodiment, the determination of the Item and the Sub Item associated with the reproduction is performed in determining the object in the step S215. Following this step, in the reproduction of the object in the step S216, while the menu is in a readily displayable condition by reproducing the button menu by using the corresponding Sub Item during the title reproduction by the Item and the display output, the menu is displayed and outputted in response to the instruction by the user and the like. By these, the display of the menu button, such as small window display and semitransparent superimpose display, is immediately performed if the user desires or in the similar case, with the title reproduction continued. On the other hand, if the user does not desire or in the similar case, such a menu display is not performed. In addition, it is possible to easily change the display of the button menu, by changing a button page described later, by an instruction to operate from the user. The selective menu display on a title screen performed by using the Sub Item, the button page, and the like as described above, will be described later in detail.

(Specific Example of Changing Display of Button Menu)

Next, with reference to FIG. 20 to FIG. 26, a detailed explanation will be given to the data structure which can change the display of the button menu, and the change control upon the reproduction thereof, in the button menu displayed during the title reproduction, for example.

At first, with reference to FIG. 20, the data structure of the background image data and the button data used for menu display in the embodiment will be discussed. FIG. 20 are diagrams showing the data structure of the background image data and the data structure of the button data.

As shown in FIG. 20(*a*), the background image data includes header information and background image data. The header information includes information about the size and the display position of a background image. The background image data includes image data which is the entity information of an image used for the background image. The image data may be still picture data, such as JPEG and bitmap image. Alternatively, an I picture in the video stream included in the MPEG 2 transport stream or the like may be used as the background image data.

As shown in FIG. 20(*b*), button data 301, which is one example of the "button information" of the present invention, includes: header information; button page information; and button image information.

The header information has information about the quantity of a button page #i (301*p*) and the quantity of button images used for the button page #i (301*p*).

The button page information has the button page #i (i=1, 2, . . . , m) 301*p*. Incidentally, the number shown by the "#i" is referred to as a "button page number", below, as occasion demands. Each button page #i (301*p*) is information about at least one button used for the button menu defined by the button page #i (301*p*), and has a button #j (j=1, 2, . . . , x) which is one example of the "button control information" of the present invention. Each button page #i (301*p*) preferably has the button #j, by the quantity of buttons used for the button menu which is defined by the button page #i (301*p*), individually.

Then, the button page #i (301*p*) is preferably exclusively displayed if it is displayed and outputted as the button menu. In other words, it is preferable to select any one button page out of the plurality of button page #i (301*p*), and display and output the button menu constructed by the selected button page. Then, the button page #i (301*p*) can be displayed and outputted, as occasion demands, in accordance with the user's instruction by using a remote controller or the like, for example.

Then, the button #j has a "button image number", a "display position", a "nearby button information", a "button command", and the like.

The button image number" includes a number for identifying the button image data included in the button image.

The "display position" includes information about the display position of each button #j in the button menu. The display position may be indicated by coordinate information in the button menu or the like, for example.

The "nearby button information" includes information which indicates a button at a destination to which the selection state is transferred from the button #j that is now selected, by the user's operation instruction in the button menu. Incidentally, a button in which the "nearby image information" is not set can be merely treated as a not-selectable text label, on the button menu. Incidentally, in order to identify the button used as the text label, more properly, the button may be also provided with flag information to distinguish or identify the selectable button and the not-selectable text label button.

The "button command" includes information about a command to be executed if the button #j is selected and determined by the user.

The button image information has button image data #k (k=1, 2, . . . , n) which is the entity information of the button image used in the button menu defined by each button page #i (301*p*). The button image data may be still picture data, such as JPEG and bitmap image.

Then, each of the background image data and the button data shown in FIG. 20 may be multiplexed in the MPEG transport stream, for example, and recorded onto the optical disc 100, as described above. Alternatively, it may be recorded as a single file without being multiplexed.

Next, with reference to FIG. 21 to FIG. 24, the specific display content of the button menu and the specific data structure to realize the button menu will be discussed.

At first, with reference to FIG. 21 and FIG. 22, the specific display content of the button menu will be discussed. FIGS. 21 are plan views conceptually showing the display content of the button menu on the screen and the display method thereof. FIG. 22 is a conceptual view showing one specific example of the button data 301 used to display the button menu shown in FIG. 21.

As shown in FIG. 21(*a*), the background image of the button menu is defined by the background image data.

As shown in FIG. 21(*b*), four buttons are displayed by a button page #1 (301*p*). In this case, the four buttons (e.g. a TOP MENU button, an audio button, a subtitle button, and a view point button) are defined by the button page #1 (301*p*) included in the button data 301. Then, as described later, the "TOP MENU button" is defined in a not-selectable state and treated as a text label.

Alternatively, as shown in FIG. 21(*c*), five buttons are displayed by a button page #2 (301*p*). In this case, the five buttons (e.g. an audio MENU button, a Japanese button, an English button, a French button, a TOP button) are defined by the button page #2 (301*p*) included in the button data 301. Then, as described later, the "audio MENU button" is defined in a not-selectable state and treated as a text label. Incidentally, the specific data structure of the button data 301 which can display the button menu shown in FIG. 21(*b*) and FIG. 21(*c*) will be discussed in detail later (refer to FIG. 22).

Then, the background image shown in FIG. 21(*a*) and the button menu shown in FIG. 21(*b*) are superimposed, to thereby display one button menu shown in FIG. 21(*d*). On the other hand, the background image shown in FIG. 21(*a*) and the button menu shown in FIG. 21(*c*) are superimposed, to thereby display another button menu which is not illustrated. It is possible to change the display of these two button menus, by selecting the button page 301*p* to be displayed, as occasion demands, in accordance with the user's operation and instruction. The process related to the change operation will be discussed in detail later (refer to FIG. 25 etc.).

Alternatively, even without the background image data shown in FIG. 21(*a*), the button menu shown in FIG. 21(*b*) or the like may be directly superimposed on the currently reproduced content and displayed.

Next, the data structure of the button data 301 which can display the button menu shown in FIG. 21(*b*) and FIG. 21(*c*) will be discussed with reference to FIG. 22.

As shown in FIG. 22, the button data 301 has: the header information; the two button pages #1 and #2; and the button image information.

Discussing about the two button pages 301p, the button page #1 (i.e. the button page 301p which constitutes the button menu shown in FIG. 21(b)) includes four buttons (buttons #1 to #4).

In the button #1, the "button image number" is #1 and the image data of "TOP MENU" corresponds to it. In the "display position", the coordinate information to display the button #1 is recorded. Moreover, any information is not recorded in the "nearby button information", so that the button is treated as a text label which does not have a function as the button (i.e. which is not-selectable). Furthermore, since it has not function as the button, a command to be executed is not set in the "button command".

The buttons #2 to #4 have respective information in the same manner. For example, information which indicates "bottom: button #3" is recorded in the "nearby button information" of the button #2. Therefore, in the case where the button #2 is in the selected state, if the user transmits an instruction to select the bottom from the user interface 720, such as a remote controller, the selection state of the button #2 is canceled and the button #3 becomes in the selected state.

Moreover, a command to "display the button page #2" is set in the "button command" of the button #2. In other words, if the user selects and executes the button #2, the button page is changed, and the display is changed to the button page #2. Namely, the display is changed from the button menu shown in FIG. 21(d) to the button menu formed by superimposing FIG. 21(a) and FIG. 21(c).

The button page #2 (301p) also has the same data structure as that of the button page #1 (301p) and includes the five buttons (button #1 to #5). Then, a command to "display the button page #1" is set in the "button command" of the button #5. Thus, if the button #5 is selected and executed, the button menu shown in FIG. 21(c) is displayed. Moreover, a command to "set the audio to Japanese", a command to "set the audio to English", and a command to "set the audio to French" are set in the "button commands" of the buttons #2 to #4, respectively. Therefore, if any one of the buttons #2 to #4 is selected, the audio of the currently reproduced title can be changed to Japanese, English, or French, respectively.

Moreover, the button image information includes nine types of button image data #1 to #9 used for the button pages #1 and #2. Each image includes the button image data used for the display of the button #1 to #4 included in the button page #1 (301p) or the button image data used for the display of the button #1 to #5 included in the button page #2 (301p).

Next, the data structure of the play list information file 120 (play list information table 120) to display and output the button data 301 shown in FIG. 22 will be discussed with reference to FIG. 23. FIG. 23 is a conceptual view showing one specific example of the play list information file which is used to display the button menu shown in FIGS. 21.

As shown in FIG. 23, the play list information file 120 includes play list general information, a play list pointer table, and a play list #i (1, 2, . . . ) information table.

Among them, the "play list general information" has overall information about the entire play list information table, such as a play list size and the total quantity of the play lists.

The "play list pointer table" has a play list #i (i=1, 2, . . . ) pointer for indicating the storage address of play list #i (i=1, 2, . . . ) information.

The "play list #i information table" has: (i) play list #i (i=1, 2, . . . ) general information; (ii) a play list #i (i=1, 2, . . . ) Item information table; and (iii) a play list #i (i=1, 2, . . . ) Sub Item information table.

Namely, in the embodiment, particularly, the play list #i information table is divided into: the play list #i (i=1, 2, . . . ) Item table, provided with Item information which constitutes the play list information for defining reproduction sequence about the video stream for display of the video; and the play list #i (i=1, 2, . . . ) Sub Item table, provided with Sub Item information (or Sub Item information, if needed, in the embodiment) for defining reproduction sequence about a stream to display the "button menu" or the like, for example. In other words, in the embodiment, the play list for displaying the video as the main pass is provided with a plurality of Items (or master Items). On the other hand, the play list for displaying the "button menu" as the sub pass is provided with one or more Sub Items.

The "play list #i general information" has the total quantity (which is "2" in this example) of Items which constitute the play list #i, the total quantity (which is "1" in this example) of Sub Items which constitute the play list #i, and other information. As the other information, the "play list #i general information" may have information, such as a Sub Item information number for specifying the "button menu" which is default, for example. Incidentally, "the "button menu" which is default" indicates default that is used in a (master) Item or Items in which the Sub Item related to the "button menu" is not registered.

The "play list #i Item information table" is provided with Item information #i (two Item information in this example). Each Item information has information for indicating a relevant AU number in the AU table in the object information file 130. Incidentally, as other information, there may be provided information for indicating the presence or absence of the Sub Item information or its number, the type of the Sub Item information if there is any Sub Item information, a start time point of the object data corresponding to the relevant Item, a display time length, and relative display coordinates with respect to the video screen.

The "play list #i Sub Item information table" is provided with Sub Item information #i (one Sub Item information in this example). Each Sub Item information has information for indicating the type of the Sub Item information (e.g. a "menu during playback content" type (a type of the menu which can be sequentially displayed during reproduction), and other types), and the relevant AU number in the AU table in the object information file 130.

As described above, if the object data is reproduced on the basis of the play list information table which is divided into the Item information (i.e. the master Item information) and the Sub Item information, the "button menu" can be displayed on the video screen as the sub pass, in accordance with the menu display command or the like by a user, while the content, such as a movie, which constitutes the video screen is displayed as the main pass.

Incidentally, the more detailed data structure of the play list information table 120 will be discussed in detail later (refer to FIG. 28 to FIG. 34).

Next, the data structure of the object information file 130 (object information table) for displaying and outputting the button data 301 shown in FIG. 22 will be discussed with reference to FIG. 24. FIG. 24 is a conceptual view showing one specific example of the object list information file, which is used to display the button menu in FIG. 21.

As shown in FIG. 24, an object information table is stored in the object information file 130. Then, the object information table is provided with the AU table 131 shown in the upper part of FIG. 24 and the ES map table 134 (i.e. a stream information table) shown in the lower part.

In the upper part of FIG. 24, the AU table 131 may have a structure that allows the required quantity of tables to be added for each Field. For example, if there are four AUs, it may have such a structure that the quantity of the Fields increases to four.

In the AU table 131, there are stored "AU table general information" in which the quantity of AUs and the pointer to each AU, and the like are written, and "the other information."

The AU table 131 describes therein the Index number (Index number=...) of the corresponding ES map table 134, as the AU information 132I which indicates an ES table Index #m in each PU #m corresponding to each AU #n. Here, the "AU" is a unit corresponding to a "show" in TV broadcast, for example, as mentioned above (especially, in the case of "multi-vision" broadcasting, it is a unit of a group of a plurality of "visions" which is changeable or selectable), and it includes one or more PUs, each of which is a reproduction unit. Moreover, the "PU" is a group of mutually changeable elementary streams which are included in each AU, as described above, and the ES table Index #m corresponding to each PU is specified by the PU information 302I. For example, if multi-view contents are provided with the AU, the AU stores therein a plurality of PUs, and each PU stores therein the pointers to a plurality of elementary stream packet IDs which indicates the packets which constitute the contents of each view. This indicates the Index number in the ES map table 134, as described later.

In the lower part of FIG. 24, in the ES map table 134, there are stored general information, a plurality of Indexes #m (m=1, 2, ...), and the "other information", for each Field.

The "general information" describes therein the size of the ES map table, the total quantity of Indexes, and the like.

The "Index #m" includes the elementary stream packet ID (ES_PID) of the entire elementary stream to be used for the reproduction, the corresponding Index number and the address information of the elementary stream.

Particularly in the embodiment, the "Index #m" includes information about the data type of the elementary stream specified by the Index #m. The data type is shown by information which indicates a background image type, a button data type, and-the-like. Specifically, the system controller 520 can recognize, relatively easily, that the elementary stream specified by the Index #1 is the background image data and that the elementary stream specified by the Index #2 or #3 is the button data, for example.

Now it is assumed that the background image shown in FIG. 21(*a*) is designated by the Index #1 and that the button data 301 including the button page shown in FIG. 21(*b*) is designated by the Index #2. At this time, the elementary stream specified by the ES_PID specified by the Indexes #1 and #2 (i.e. PID="100" and PID="110") is obtained, to thereby reproduce or display and output the button menu.

Incidentally, at least one of the "Index #m" may include page attribute information. The page attribute information indicates information about the menu content supported by the button menu displayed by the button data 301 if the plurality of button data 301 are recorded on the optical disc 100. Then, it is preferable for the information recording/reproducing apparatus 500 to select the button data 301 for defining the button menu which can be properly reproduced on the information recording/reproducing apparatus 500 and which can properly execute the user's instruction (i.e. the button command) based on the button menu, by referring to the page attribute information. Specifically, if the information recording/reproducing apparatus 500 supports "DTS" in the audio data, it is possible to obtain, display and output the button data 301 specified by the Index #2. On the other hand, if the information recording/reproducing apparatus 500 does not support the "DTS" in the audio data, it is preferable to obtain, display and output the button data 301 specified by the Index #3.

Moreover, in the embodiment, for example, if the elementary stream is the MPEG 2 video stream, as described above, since only the TS packet number of the packet at the head of the I picture and the corresponding display time length are written on the ES map table 134 as the address information, i.e. the ES address information 134d, the data amount is tried to be reduced.

By virtue of such a construction, it is possible to obtain the elementary stream packet ID (ES_PID) of the actual elementary stream, from the Index number of the ES map 134 specified from the AU table 131. Moreover, since the address information of the elementary stream corresponding to the elementary stream packet ID can be also obtained at the same time, it is possible to reproduce the object data on the basis of these information.

According to the data structure of the optical disc 100 explained above, even in adding a new title to the optical disc 100, necessary information can be easily added, which is useful. On the other hand, even if some information becomes unnecessary as a result of editing or the like, for example, what is to be done is simply not to refer to the information, and it is not necessary to actually delete the information from the table, which is useful, as well.

Incidentally, in FIG. 24, even the ES_PID that is not referred to from the AU table 131 in the upper part is not described in the ES map table 134 in the lower part; however, it is possible to describe the ES_PID that is not referred to, for each Index, in this manner. However, if the more versatile ES map table 134 is prepared in advance by describing the ES_PID that is not referred to in this manner, it is not necessary to reconstruct the ES map table, in reediting the content, such as trying the authoring operation again, which is advantageous.

Figure 25:
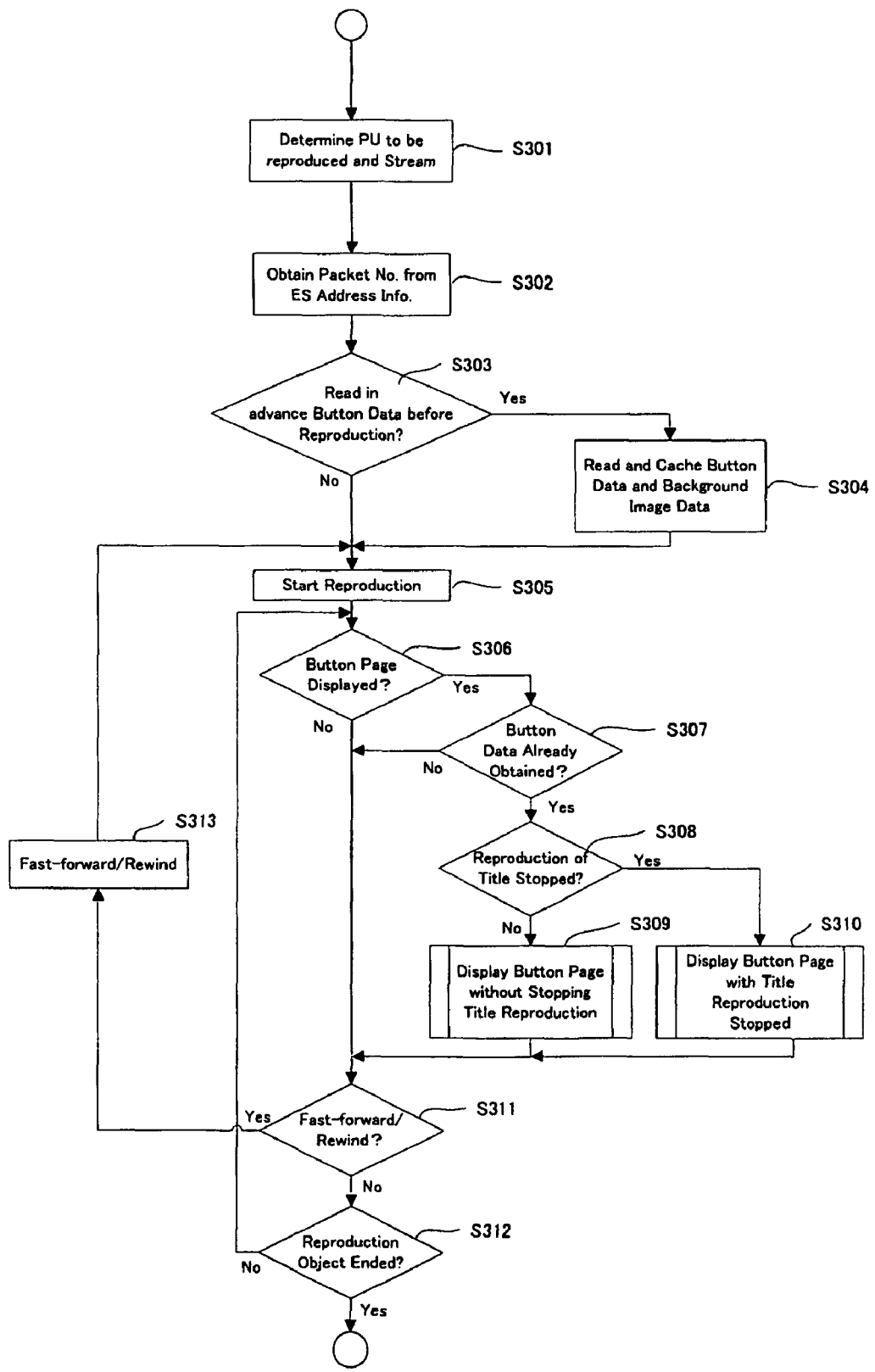
FIG. 25 is a flowchart showing an entire reproduction process flow, in displaying the button menu in the embodiment.
Figure 26:
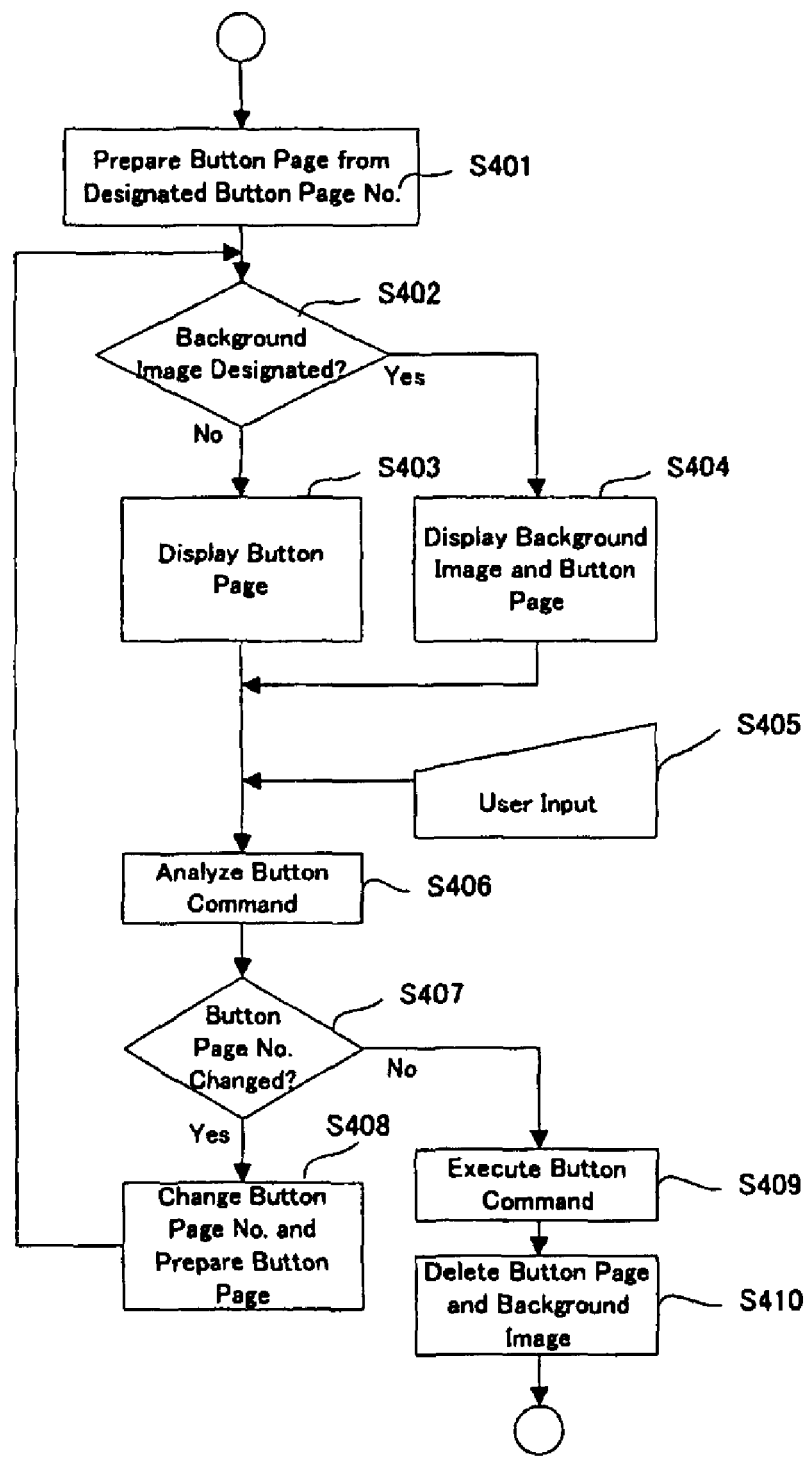
FIG. 26 is a flowchart showing a flow of a detailed display process of the button page in displaying the button menu in the embodiment.

Next, an explanation will be given to a process on the information recording/reproducing apparatus 500 in changing the display of the button page, as described above, with reference to FIG. 25 and FIG. 26. FIG. 25 is a flowchart showing the detail of a process of changing the display of the button page, which is performed as a part of the processes in the step S215 and the step S216 shown in FIG. 19. FIG. 26 is a flowchart showing the detail of a process of displaying the button page in the step S309 and the step S310 shown in FIG. 25.

In FIG. 25, it is assumed that as an initial state, the recognition of the optical disc 100 in the reproduction system and the recognition of a volume structure and a file structure by the file system 105 (refer to FIG. 3) have been already completed by the processes in the step S211 to the step S215 shown in FIG. 19. Moreover, it is also assumed that is has been completed to select one title from the disc general information 112 in the disc information file 110 and obtain the information of the reproduction-targeted object (AU and PU information). Here, an explanation is given to the operational flow after the determination of the object (PU) to be reproduced (i.e. the operational flow after the step S215, and particularly the operational flow in the step S216).

At first, on the basis of the obtained reproduction-targeted object, the object to be reproduced, i.e. PU to be reproduced, is determined, and at the same time, the elementary stream corresponding to the PU is determined (step S301). After the PU to be reproduced and the stream are determined, the packet number related to the TS object as being the reproduction target is obtained on the basis of the ES address (refer to FIG. 24) included in the ES map table (step S302).

Then, it is judged whether or not to read in advance the button data 301 for the button menu which is used for the reproduction of the object determined in the step S301, before the reproduction of the object (step S303). In the judgment herein, if it is not desired to influence the reproduction of the title because of the display of the button menu, such as a case where it is desired to display the button menu without stopping the reproduction of the title, it is judged to read in advance. On the other hand, if there is little possibility to influence the reproduction of the title even if the button menu is displayed so as to reproduce the button data 301 as needed which is multiplexed with the video data, such as a case where the button menu is displayed on the still screen of the object in which the display thereof is under suspension, it may be judged not to read in advance. Even in this case, however, it may be judged to read in advance the button data 301, before the reproduction of the title.

As a result, if it is judged to read in advance the button data 301 (the step S303: Yes), the button data 301 and the background image data area read and cached into the memory 550 (step S304). Then, after that, the reproduction of the title (i.e. the TS object 146) determined in the step S211 in FIG. 19 is started (step S305).

On the other hand, if it is judged not to read in advance the button data 301 (the step S303: No), the reproduction of the title is started as usual (the step S305).

During the reproduction of the title, the input instruction of the user by the user interface 720, for example, is monitored. Specifically, it is judged whether or not there is an instruction to display the button page 301p (i.e. the button menu constructed by the button page) given by the user (step S306). Alternatively, a flag may be provided in the Item information to display the button page at a time point when the reproduction of the Item is ended, to thereby monitor its timing.

As a result, if it is judged that there is an instruction to display the button page 301p (the step S306: Yes), it is judged whether or not the button data 301 is already obtained (step S307). In the judgment, if the button data 301 or the background image data is cached in advance in the step S304, it is judged that the button data 301 is already obtained. Moreover, if the reading process is not performed in the step S304, and if the obtainment of the button data 301 multiplexed with the content information, such as the video information, is completed, it is judged that the button data 301 is already obtained.

As a result of the judgment, if the button data 301 is not obtained yet (the step S307: No), the button page 301p cannot be displayed. Thus, the fact (e.g. the fact that the button menu cannot be displayed) is displayed on the screen or the like, and the reproduction of the content is continued.

On the other hand, if the button data 301 is already obtained (the step S307: Yes), it is judged whether or not to display the button page 301p with the reproduction of the title temporarily stopped (step S308). In other words, it is judged whether or not the button page 301p (i.e. the button defined by the button page 301p, or the like) is superimposed and displayed on the screen which displays the currently reproduced title, or whether or not the button page 301p is superimposed and displayed on the screen which displays the temporarily stopped title or a blue back screen or the like, for example.

As a result of the judgment, if it is judged to display the button page 301p without stopping the reproduction of the title temporarily (the step S308: No), the button page 301p is displayed without stopping the reproduction of the title (step S309).

On the other hand, if it is judged to display the button page 301p with the reproduction of the title temporarily stopped (the step S308: Yes), the button page 301p is displayed with the reproduction of the title stopped (step S310).

Incidentally, the display process of the button page 301p in the step S309 and the step S310 will be discussed in detail later (refer to FIG. 26).

After the display process of the button page 301p is ended, the normal title reproduction is continued, and it is judged whether or not there is an instruction to fast-forward/rewind from the user (step S311).

On the other hand, as a result of the judgment in the step S306, if there is no instruction to display the button page 301p (the step S306: No), the content reproduction is continued in the same manner, and it is judged whether or not there is an instruction to fast-forward/rewind from the user (the step S311).

As a result of the judgment, if the instruction to fast-forward/rewind is inputted (the step S311: Yes), a fast-forwarding/rewinding process is performed in accordance with the user's instruction (step S313).

On the other hand, if the instruction to fast-forward/rewind is not inputted (the step S311: No), it is judged whether or not a reproduction object is ended (step S312).

As a result of the judgment, if the reproduction object is not ended (the step S312: No), the operational flow returns to the step S306 to perform a series of processes again.

On the other hand, if the reproduction object is ended (the step S312: Yes), the reproduction process of the object is ended.

Next, with reference to FIG. 26, the "display process of the button page" in the step S309 and the step S310 in FIG. 25 will be discussed in more detail. Incidentally, a difference in the "display process of the button page" in the step S309 and the "display process of the button page" in the step S310 is whether or not the title reproduction is stopped; however, they have common process in the button page display process, so that the same flowchart will be used for explanation.

As shown in FIG. 26, at first, the button page 301p is constructed on the basis of the designated button page number (step S401). In other words, the button page 301p to be displayed is selected from the plurality of button page #j (301p) included in the button data 301. At this time, the button page #1 (301p) is designated as the button page (301p) which is to be firstly displayed by default. Alternatively, in accordance with the user's designation, a predetermined button page 301p may be designated. Moreover, a button page number when the button page 301p is previously displayed may be stored, to thereby designate the button page 301p having the button page number. After that, it is judged whether or not a background image to superimpose and display the button page 301p thereon is designated (step S402). The designation may be performed by the operation of the system controller 520, for example.

As a result of the judgment, if the background image is not designated (the step S402: No), the button page 301p (button menu) is displayed, to thereby wait for the user's input (step S403). Incidentally, if the background image is not designated, the button page 301p is displayed on the screen; however, at that time, the title reproduction may be continued or stopped (i.e. still screen).

On the other hand, if the background image is designated (the step S402: Yes), the button page 301p is superimposed and displayed on the background image, to thereby wait for the user's input (step S404).

The display and output of the button page 301p herein may be performed by reading the button image by using the still picture decoder 515, for example, under the control of the system controller 520, for example.

If there is an input from the user based on the displayed button page 301p (step S405), the button command corresponding to the input from the user is analyzed (step S406). Then, it is judged whether or not the button command is a button command which instructs the change of the displayed button page 301p (step S406).

As a result, if it is judged that it instructs the change of the displayed button page 301p (step S408: Yes), the button menu is prepared from the changed button page 301p (step S408). Then, the operational flow returns to the step S402 to perform a series of processes again.

On the other hand, if it is judged that it does not instruct the change of the displayed button page 301p (step S408: No), the button command analyzed in the step S406 is executed (step S409). Specifically, an audio change process is performed, or a subtitle change is performed, for example. After the execution of the button command, the button page and the background image, if displayed, are deleted (step S410), and the normal title reproduction process without the button menu displayed is continued.

By the reproduction operation explained above, it is possible to display or not to display the button menu, as occasion demands, in accordance with the user's operation during the title reproduction, for example. At the same time, it is possible to change the display of the button menu, relatively easily, by having a plurality of button page information. In particular, by pre-loading the button data 301 in advance, it is possible to change the display of the button menu without any influence on the reproduction of the content information (i.e. without reducing a process performance).

(Access Flow Upon Reproduction)

Figure 27:
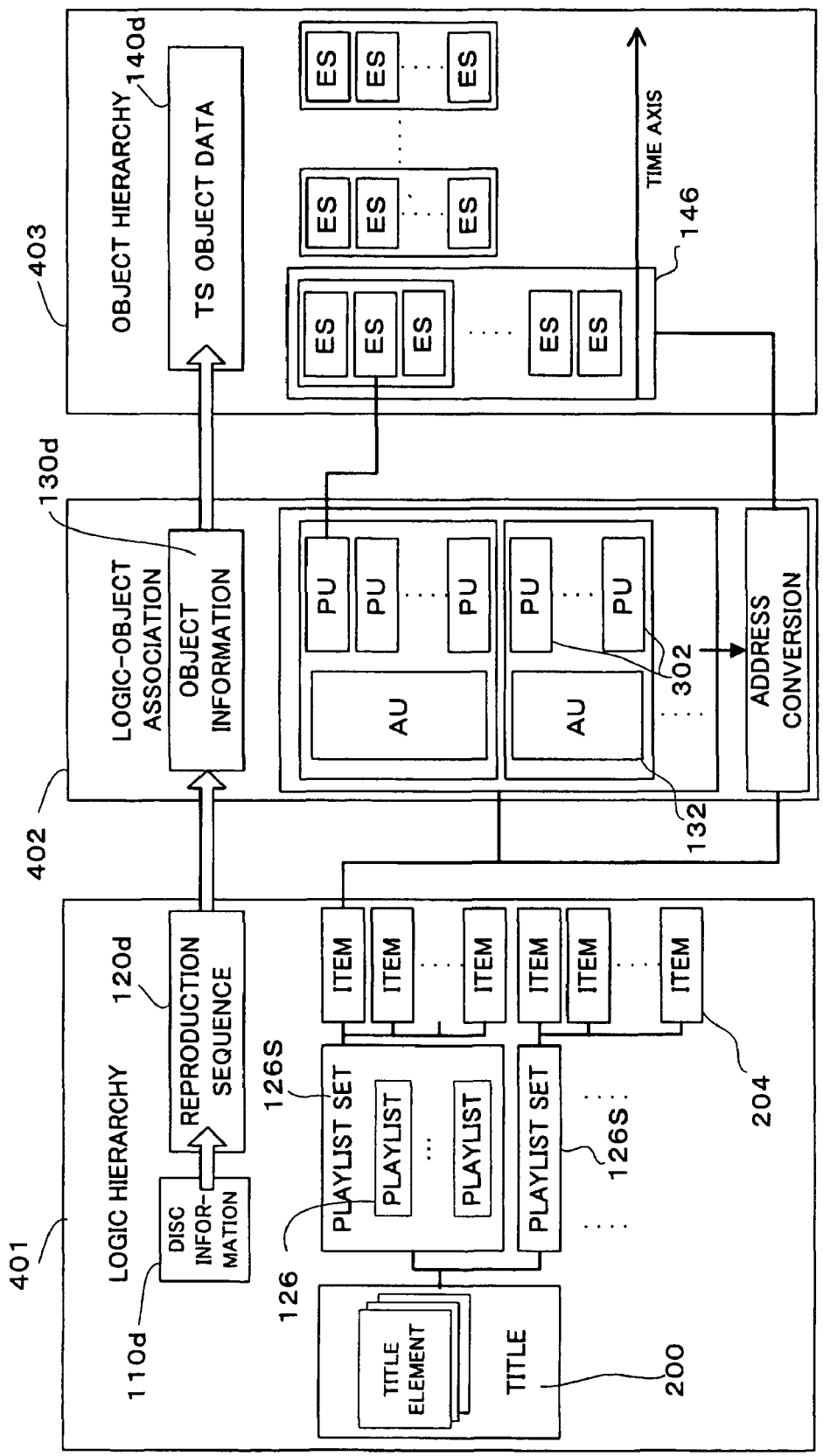
FIG. 27 is a diagram conceptually showing an entire access flow upon reproduction in the embodiment, in association with the logical structure of the optical disc.

Next, with reference to FIG. 27, the access flow upon reproduction by the information recording/reproducing apparatus 500, employing the AU (Association Unit) information 132 and the PU (Presentation Unit) information 302, is explained as one of the features of this embodiment, with the logical structure of the optical disc 100. FIG. 27 conceptually shows an entire access flow on reproduction, in association with the logical structure of the optical disc 100.

In FIG. 27, the logical structure of the optical disc 100 is categorized roughly into the following three hierarchies: a logical hierarchy 401; an object hierarchy 403; and a logic-object association hierarchy 402 which mutually associates those two hierarchies.

Among them, the logical hierarchy 401 is a hierarchy for logically specifying various logical information to reproduce the desired title during the reproduction, as well as the play (P) list to be reproduced and its constitutional content. In the logical hierarchy 401, disc information 110d which indicates all the titles 200 and the like on the optical disc 100 is written within the disc information file 110 (refer to FIG. 3), and further, reproduction sequence information 120d of all the contents on the optical disc 100 is written within the play list information file 120 (refer to FIG. 3). More specifically, the structure of one or more play list sets 126S is written, as the reproduction sequence information 120d, with respect to one or more title elements 200-2 included in each title 200. Furthermore, each plat list set 126S includes one or more play lists 126, and the structure of one or more Items 204 is written in each play list 126. Then, in the access upon the reproduction, the logical hierarchy 401 as described above specifies the title 200 to be reproduced, the play list 126 corresponding to this, and further the Item 204 corresponding to this.

Next, the logic-object association hierarchy 402 is a hierarchy for specifying the attribute and the physical storage address of the TS object data 140d to be reproduced, so as to specify the combination and/or the structure of the TS object data 140d as being the entity data and to perform address conversion to the object hierarchy 403 from the logical hierarchy 401, on the basis of the information specified in the logical hierarchy 401 as described above. More specifically, in the logic-object association hierarchy 402, the object information data 130d, which separates a group of the contents which constitute each Item 204 into units of the AU 132 and which finely separates each AU 132 into units of the PU 302, is written in the object information file 130 (refer to FIG. 3).

Here, the "PU (Presentation Unit) 30 " is a unit for associating and uniting a plurality of elementary streams by the reproduction switchable unit. If there are three audio streams in the PU 302, the user can freely switch these three audio (e.g. audio for each language), during the reproduction of this vision.

On the other hand, the "AU (Associate Unit) 132 " is a unit for uniting a plurality of elementary streams, such as video streams, in the TS object used in one title, and made of one or more PUs 302. More specifically, it is a unit for uniting the elementary stream packet IDs (ES_PID) for each TS object, indirectly via the PU 302. This AU 132 corresponds to an assembly made of a plurality of shows or programs having a specific relationship in view of the contents, such as a plurality of shows or programs switchable to each other in the multiple source broadcasting. The PUs 302 which belongs to the same AU 132 correspond to a group of one or more elementary stream which constitutes a plurality of shows or programs switchable to each other by the user's operation during the reproduction.

Therefore, if the AU 132 to be reproduced is identified, and the PUs which belong to the AU are identified, the elementary stream to be reproduced is identified. That is, a desired elementary stream can be reproduced from the multiplexed and recorded ones from the optical disc 100, without using the PAT or the PMT shown in FIG. 12.

The elementary stream to be actually reproduced herein is identified, specified, or designated by the ES_PID that is a packet ID (refer to FIG. 12) of the elementary stream, on the basis of the PU information 302. At the same time, the information which indicates the start time point and the end time point of the reproduction is converted to the elementary stream address information, and thereby the content in a specific area (or a specific time range) of a specific elementary stream is reproduced.

Thus, in the logic-object association hierarchy 402, the address conversion is performed from a logical address related to each Item 204 to a physical address related to each PU 302.

Next, the object hierarchy 403 is a physical hierarchy to reproduce the actual TS object data 140d. In the object hierarchy 403, the TS object data 140d is written within the object data file 140 (refer to FIG. 3). More specifically, TS packet payloads 146 which constitute a plurality of elementary streams (ES) are multiplexed at every time point. The multiplexed packets are disposed along a time axis to form a plurality of elementary streams (refer to FIG. 11). Then, a plurality of TS packet payloads multiplexed at each time point are associated with a PU 302 identified or specified by the logic-object association hierarchy 402, for each elementary stream. Incidentally, it is possible to associate a plurality of PUs 302 with one elementary stream (e.g. sharing one elementary stream related to the same audio data or sharing one elementary stream related to the same sub-picture data, among a plurality of switchable shows or programs).

As described above, in the object hierarchy 403, the object data is actually reproduced, by using the physical address obtained from the conversion in the logic-object association hierarchy 402.

As described above, the three hierarchies shown in FIG. 27 allow an access to the optical disc 100 upon the reproduction.

Incidentally, in FIG. 27 and in the explanation, both the Item other than the Sub Item and the Sub Item are included in the "Item 204 " and illustrated for convenience. Namely, the association between the logical hierarchy 401 and the logic-object association hierarchy 402 is as shown with the Item 204, in the case of either the Item other than the Sub Item or the Sub Item.

(Structure of Each Information File)

Next, with reference to FIG. 28 to FIG. 34, an explanation will be given to a specific example of the data structure of various information files constructed on the optical disc 100 in this embodiment, i.e. the data structure of (1) the disc information file 110 and the play list information file 120 discussed with reference to FIG. 3.

With reference to FIG. 28 to FIG. 34, an explanation will be given to each constitutional element and a hierarchy structure therebetween or thereamong in specific examples of these files. FIG. 28 to FIG. 34 are conceptual views, schematically showing the hierarchy structures of these files. Incidentally, in FIG. 28 to FIG. 34, the same file, data, information, and the like as those already explained with reference to FIG. 3 to FIG. 9 and the like carry the same reference numerals, and the detailed explanations of them are omitted. In addition, disc information file 110 and the play list information file 120, the object information file 130 to be recorded onto the optical disc 100 has been explained with reference to FIG. 24, so that its explanation is omitted here.

Figure 28:
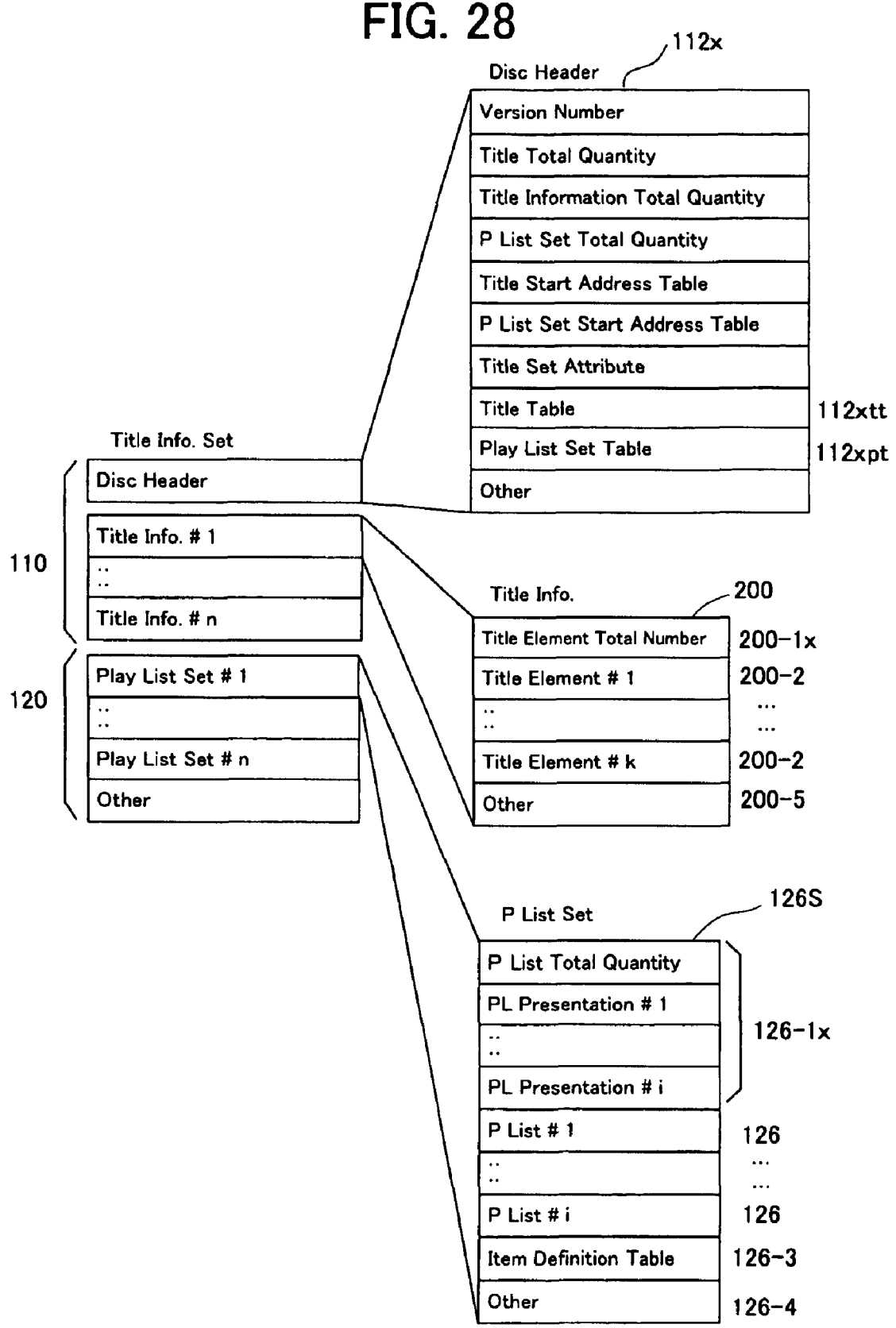
FIG. 28 is a conceptual view schematically showing the hierarchy structure in one specific example of a title information set in the embodiment.

Firstly, as shown in FIG. 28, a "title information set" associated with this specific example is an information set including the disc information file 110 and the play list information file 120, shown in FIG. 3 and the like.

The title information set is provided with: one disc header 112x; a plurality of title information 200 (title information #1, . . . , #n); a plurality of play (P) list sets 126S (P list sets #1, . . . , #n); and other information.

(1) Disc Header:

Firstly, from among the title information set shown in FIG. 28, the disc header 112x will be explained with reference to FIG. 28 and FIG. 29.

In FIG. 28, the disc header 112x is shown in a branched form on the upper right of the figure, and has a plurality of fields for various information, such as a version number, the title total quantity, the title information total quantity, and the play (P) list set total quantity, in order from the top in FIG. 28, as information corresponding to the disc general information 112 shown in FIG. 3. The disc header 112x has: a title start address table, as a table for information corresponding to the title pointer 114-1 shown in FIG. 3; and a play (P) list set start address table, as a table for information corresponding to the play list set pointer 124 shown in FIG. 3. The disc header 112x has a field for information which indicates a title set attribute for indicating the attribute of each title set. Moreover, the disc head 112x has a title table 112xtt and a play list set table 112xpt.

As described above, the disc header 112x having the plurality of fields and tables is to collectively manage a plurality of titles of the entire recording area on the disc.

Here, the "version number" is a version number in the standard, and according to ISO 646, it is regarded as a code "0070", for example. The "title total quantity" is the total quantity of the titles of the entire recording area on the disc. The "title information total quantity" is the total quantity of the title information of the entire recording area on the disc. The "play list set total quantity" is the total quantity of the play list sets of the entire recording area on the disc. The "title start address table" indicates the start address of each title, as a relative byte number from the head of the title set. This byte number is counted from zero, for example. The "play list set start address table" indicates the start address of each play list set, as a relative byte number from the head of the title set. This byte number is counted from zero, for example. The "title set attribute" indicates the attribute of the title set, such as the data length of the title set, the type of language used in the title set (Japanese, English, etc.), and the name of the title set.

Figure 29:
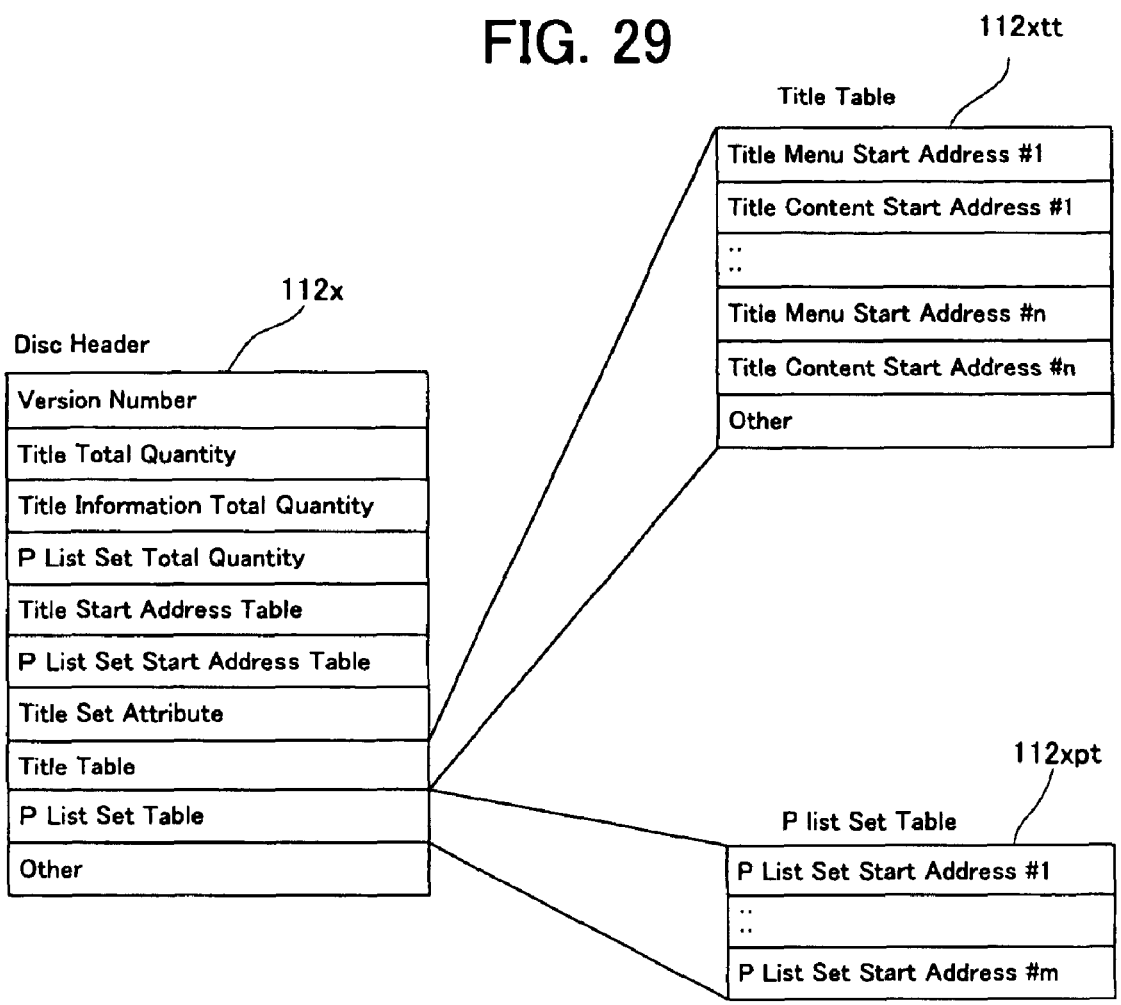
FIG. 29 is a conceptual view schematically showing the hierarchy structure in one specific example of a disc header in the embodiment.

In FIG. 29, the title table 112xtt is shown in a branched form on the upper right of the figure, and has a plurality of fields for recording a plurality of title menu start address information #1, . . . , #n, and a plurality of title content start address information #1, . . . , #n, in such a form that they make pairs for each number, in order from the top of the figure.

Here, the "title menu start address" indicates the start address of the title information including each title menu, as a relative byte number from the head of the title set. This byte number is counted from zero, for example. The title menu start address "0" is assigned to the disc menu about the entire disc. The "title content start address" indicates the start address of the title information including each content title, as a relative byte number from the head of the title set. Here, the "content title" is a title for indicating the content of each title. This byte number is counted from zero, for example. The title content start address "0" is assigned to a first play title which is unconditionally reproduced at the initial stage of the title reproduction, for example.

In FIG. 29, the play list set table 112xpt is shown in a branched form on the lower right of the figure, and has a plurality of fields for recording a plurality of play (P) list set start addresses #1, . . . , #m.

Here, the "play list set start address" indicates the start address of each play list set, as a relative byte number from the head of the title set. This byte number is counted from zero, for example.

(2) Title Information:

Next, from among the title information set shown in FIG. 28, the title information 200 is explained with reference to FIG. 28 and FIG. 30.

In FIG. 28, the title information 200 is shown in a branched form on the center right of the figure, and has a field for recording information 200-1x which indicates the total quantity of the title elements corresponding to the title general information 200-1 shown in FIG. 4, and further, a plurality of fields for recording the plurality of title elements 200-2 (title elements #1, . . . #k) and the other information 200-5, in order from the top in FIG. 28.

Here, the "title element total quantity" indicates the total quantity of the title elements included in the title information.

Figure 30:
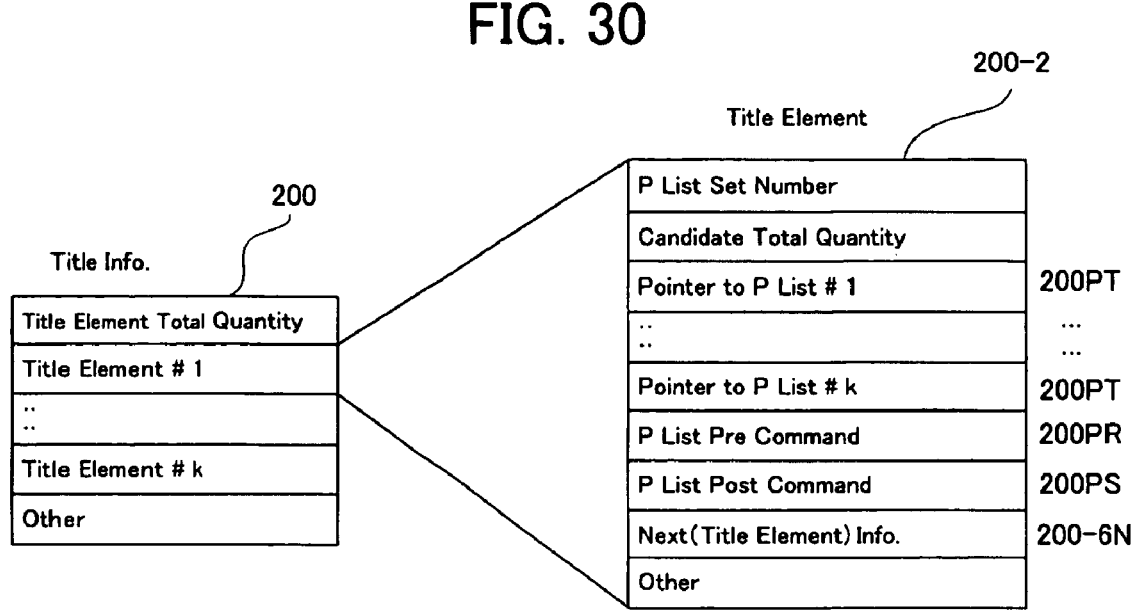
FIG. 30 is a conceptual view schematically showing the hierarchy structure in one specific example of title information in the embodiment.

In FIG. 30, each title element 200-2 is shown in a branched form on the right of the figure, and has a plurality of fields for recording the play list set number, the candidate total quantity, the pointers 200PT to the plurality of play (P) lists (i.e. P lists #1, . . . , #k), in order from the top in FIG. 30. Moreover, it has a plurality of fields for recording the P list pre-command 200PR, the P list post command 200PS, the next information 200-6N which indicates the title element to be reproduced next and the like. Incidentally, the other information in the title element 200-2 is information about each title element, such as the title type, for example, a sequential type and a branch type or the like.

Here, the "play list set number" indicates the identification (ID) number of the play list set. The "candidate total quantity" indicates the total quantity of the play lists which can be a candidate of the title element. The pointer 200PT to the P list", the "P list pre-command 200 PR", the "P list post command 200 PS", and the "next information 200-6N" are the same as those described above. For example, the pointer 200PT to the P list" indicates the ID (identification) number of the play list in the play list set.

(3) Play List Set:

Next, from among the title information set shown in FIG. 28, the play list set 126S will be discussed with reference to FIG. 28 and FIG. 31 to FIG. 34.

In FIG. 28, the play list set 126S is shown in a branched form on the lower right of the figure, and has fields for recording information 126-1x which includes the play (P) list total quantity and a plurality of play list (PL) presentations (PL presentations #1, . . . , #i), as information corresponding to the play list set general information 126-1 shown in FIG. 5, in order from the top in FIG. 28. Moreover, the play list set 126S has a plurality of fields for recording the plurality of play (P) lists 126 (i.e. P lists #1, . . . , #i), the Item definition table 126-3, and the other information 126-4.

Here, the "play list total quantity" indicates the total quantity of the play lists in the play list set.

Figure 31:
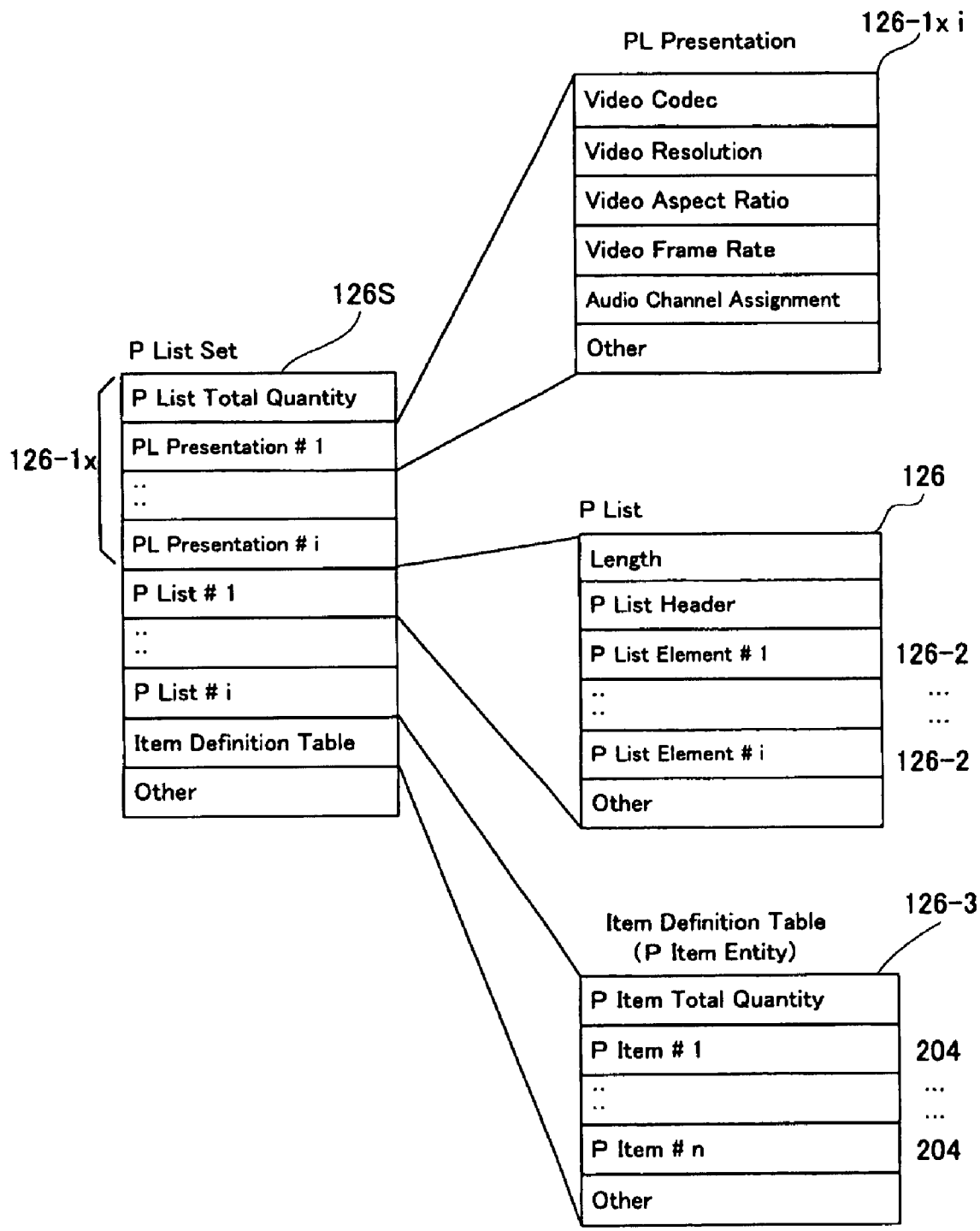
FIG. 31 is a conceptual view schematically showing the hierarchy structure in one specific example of the play list set in the embodiment.

In FIG. 31, each PL presentation 126-1xi is shown in a branched form on the upper right of the figure, and has a plurality of fields for recording information which indicates a video codec, video resolution, a video aspect ratio, a video frame rate, an audio channel assignment and so on, in order from the top in FIG. 31.

Here, the "video codec" is used in recording the video information associated with the play list set, and thus indicates the type of the video codec to be used upon the reproduction thereof. The "video resolution" indicates video resolution used in recording the video information associated with the play list corresponding to the main pass (i.e. the video stream for providing the video) from among the play list set. The "video aspect ratio" indicates a video aspect ratio used in recording the video information associated with the play list corresponding to the main pass from among the play list set. The "video frame rate" indicates a video frame rate used in recording the video information associated with the play list corresponding to the main pass from among the play list set. The "audio channel assignment" indicates the assignment of an audio channel used in recording the audio information associated with the play list corresponding to the main pass from among the play list set.

In FIG. 31, each play list 126 is shown in a branched form on the center right of the figure, and has a plurality of fields for recording information which indicates the data length of the play list 126, a play list header, the plurality of play list elements 126-2 (i.e. P list elements #1, . . . , #i) and the like, in order from the top in FIG. 31.

Here, the "length" of the play list indicates the length of the following play list, with the byte number. This indicates the length of the data which does not include the field itself. The "play list header" indicates information about the total quantity of the play list elements included in the play list, the reproduction time length of the play list, the name of the play list, and the like.

Figure 32:
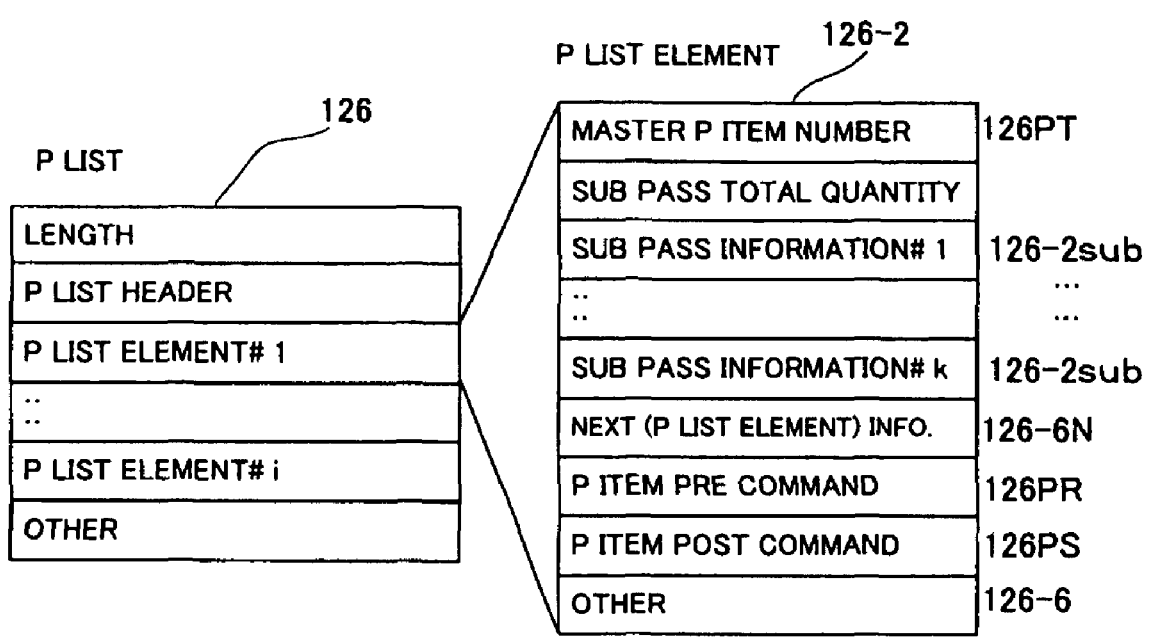
FIG. 32 is a conceptual view schematically showing the hierarchy structure in one specific example of the play list in the embodiment.

Moreover, in FIG. 32, each play list element 126-2 is shown in a branched form on the right of the figure, and has a plurality of fields for recording the pointer 126PT which indicates the Item number of a master play (P), the sub pass total quantity, a plurality of sub pass information 126-2sub (i.e. sub pass information #1, . . . , #k), the next information 126-6N, the pre-command 126PR about the play (P) Item, the post command 126PS about the play (P) Item, and the other information 126-6, and the like.

Here, the "pointer 126PT", the "pre-command 126PR", and the "post command 126PS" are the same as described above. Moreover, the "sub pass total quantity" indicates the total quantity of the sub passes which exist in the play list element. The "next information 126-6N" indicates the play list element to be reproduced next.

Figure 33:
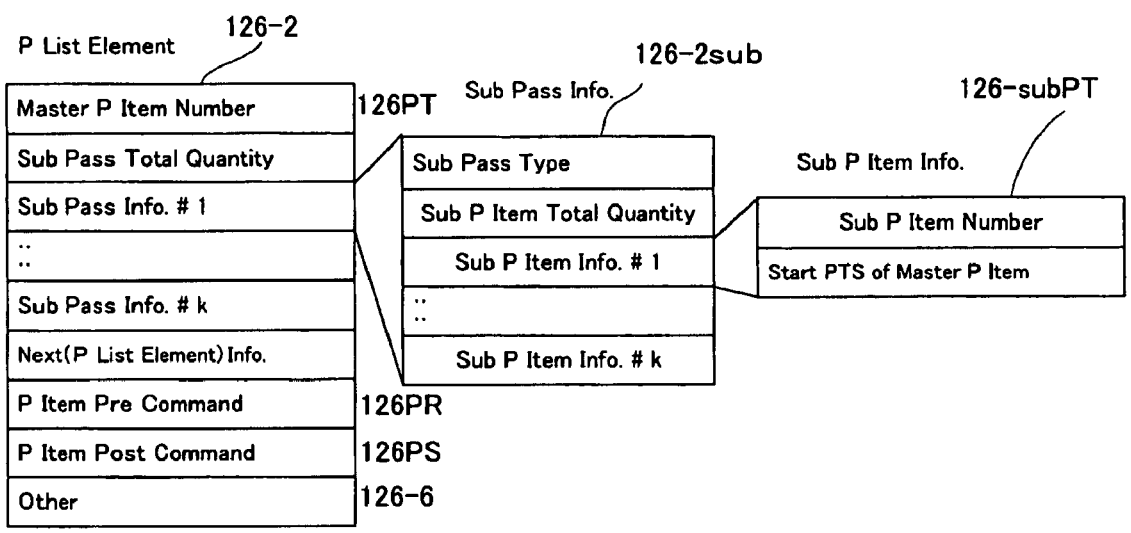
FIG. 33 is a conceptual view schematically showing the hierarchy structure in one specific example of a play list element in the embodiment.

Moreover, in FIG. 33, each sub pass information 126-2sub is shown in a form branched to the right toward the center, in the figure, and has a plurality of fields for recording a sub pass type, the sub play (P) Item total number, and a plurality of sub play (P) Item information 126-subPT (i.e. sub P Item information #1, . . . , #k), in order from the top in the figure.

Here, the "sub pass type" indicates what type of display is performed by the sub pass, such as various menu display. The "sub P Item total quantity" indicates the total number of sub play Items of the sub pass.

Each sub play (P) Item information 126-subPT is shown in a form branched toward the right end from the center in the figure, and has a plurality of fields for recording a sub play (P) Item number and a start PTS of the master play (P) Item, in order from the top in the figure.

Here, the "sub P Item number" indicates the ID (identification) number of the play Item of the sub pass. The "start PTS (Presentation Time Stamp) of the master play Item" indicates the reproduction time point of the Sub Item on the reproduction time axis of the master play Item.

On the other hand, in FIG. 31, the Item definition table 126-3 is shown in a branched form toward the lower right of the figure, and has a plurality of fields for recording the play (P) Item total number, and a plurality of play (P) Items 204 (i.e. P Items #1, . . . , #n), and the like, in order from the top in the figure.

Here, the "play Item total quantity" indicates the total quantity of the Items 204 on the Item definition table.

Figure 34:
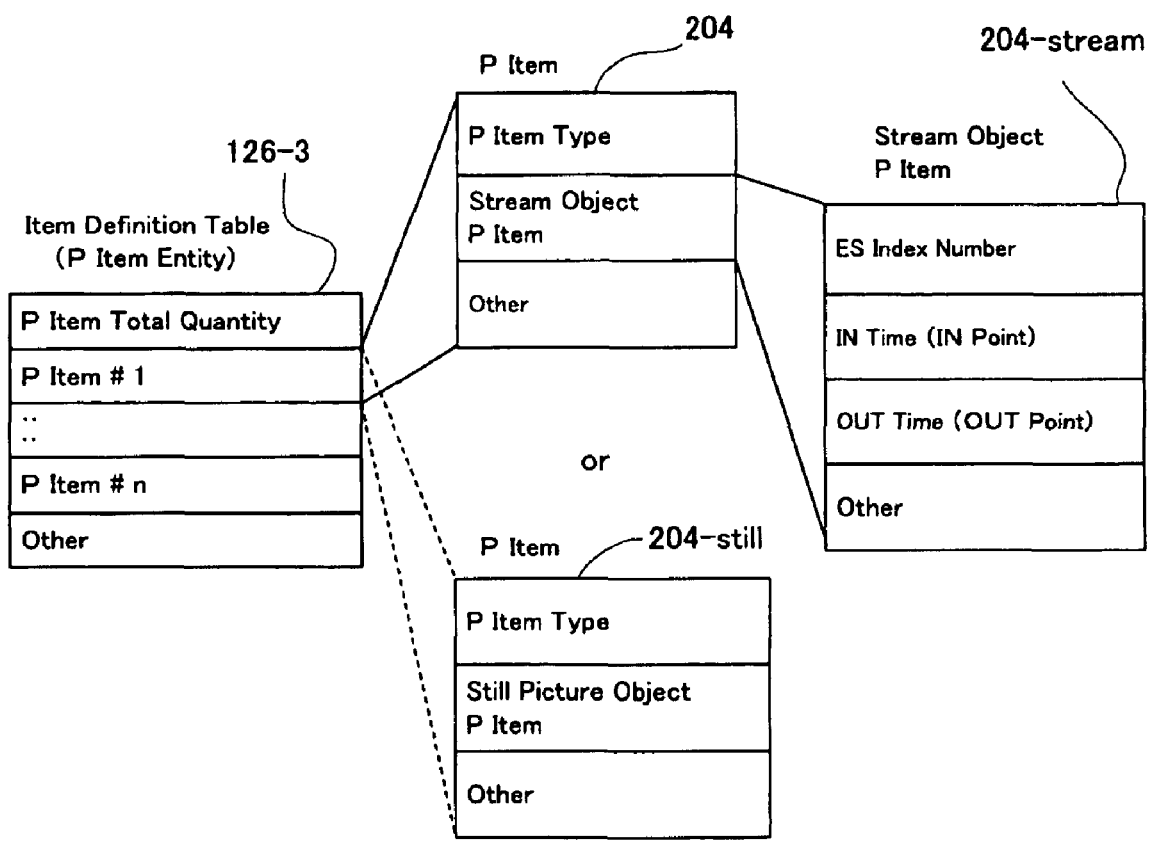
FIG. 34 is a conceptual view schematically showing the hierarchy structure in one specific example of an Item definition table in the embodiment.

In FIG. 34, each Item 204 is shown in a branched form to the upper right side toward the center of the figure, and has a plurality of fields for recording a play (P) Item type, a stream object play (P) Item 204-stream, and the like, in order from the top in the figure.

Here, the "play (P) Item type" indicates the type of the play Item. For example, in the case of the Item for the stream object for the moving picture or video, it is set to a code "00h", and in the case of the Item for the stream object for the still picture, it is set to a code "10h". In the case of the Item for the object for various menus, it is set to a code "20h".

Moreover, the stream object play (P) Item 204-stream is shown in a form branched to the right end from the center in the figure, and has information for indicating an ES (Elementary Stream) index number, an IN time (IN point), an OUT time (OUT point), and the like, which are related to each play Item, in order from the top in the figure.

Here, the "ES index number" indicates the ID (identification) number and the type of the elementary stream to which the IN time and the OUT time are applied. Moreover, the "IN time (IN point)" and the "OUT time (OUT point)" are as descried above, and the reproduction time point and the end time point of the Item are written on a time basis of 90 kHz, for example.

Incidentally, in FIG. 34, the Item definition table 126-3 may include an Item 204-still for the still picture object, in place of such an Item 204 for the stream object, i.e. the Item 204 for the moving picture or video. In this case, the Item 204-still has information for indicating the type of the play Item, a still picture object play Item (P Item), and the like.

Incidentally, the data amount of each of the title information set explained above may be a fixed byte or a variable byte. Moreover, each field may have a structure in which a required number of each table can be added.

Particularly, in the embodiment, the sub play (P) Item information 126-subPT shown in FIG. 33 specifies the Sub Item for displaying the button menu screen, which is explained with reference to FIG. 20 to FIG. 26. This Sub Item, as shown in FIG. 34, corresponds to the Item 204 indicated by the "master P Item number" in the play list element 126-2. As a result, the reproduction of the title based on the video stream is executed as the main pass, in accordance with the stream object play Item 204-stream (refer to the right end of FIG. 34) which specifies the Item 204. In parallel with this execution, the reproduction of the button menu is performed as the sub pass, in accordance with the Sub Item information 126-subPTm (refer to the right end of FIG. 33) which specifies the Sub Item.

Now, an explanation is given, regarding the reproduction order of various files or the like, in the reproduction of the optical disc 100 having such a data structure as the one specific example, explained with reference to FIG. 28 to FIG. 34.

Firstly, the disc header 112x is reproduced out of the title information set shown in FIG. 28. As a part of that, the title table 112xtt shown in FIG. 29 is reproduced, and from it, the title menu start address or title content start address is obtained.

Next, in accordance with the obtained address information, the reproduction of the title information 200 shown in FIG. 28 is started. More specifically, the reproduction of the title element 200-2 shown in FIG. 30 is performed, to thereby obtain the play list set number. Moreover, the pointers 200PT to the play lists #1 to #k are obtained. Incidentally, by adopting such a construction that the play list 126 is specified by the pointer 200PT, it is possible to share, among the plurality of titles, the plurality of play lists which are in the play list set specified by the reproduction of the title element 200-2 in advance.

Next, the play list set table 112xpt shown in FIG. 29 is reproduced, to thereby obtain the play list set start address. On the basis of this, the reproduction of the play list set 126S shown in FIG. 31 is started, and the PL presentation 126-1xi is firstly reproduced.

Then, the PL presentation 126-1xi, which is one example of the required function information, is compared with the reproduction function (i.e. video performance, audio performance, and the like) of the information reproduction system during the reproduction of the optical disc 100, and thus, one optimum play list 126 is selected from the play list set 126S shown in FIG. 31.

Next, the selected play list 126 is reproduced. More specifically, the play list element 126-2 shown in FIG. 32 is reproduced. At this time, firstly, the pre command 126PR is executed, then, the master P Item number shown in FIG. 33 is obtained. Then, the Item definition table shown in FIG. 34 is referred to, to thereby reproduce the relevant Item 204. The reproduction of this Item 204 is performed by reproducing the relevant TS object in accordance with the ES index number, the IN time and the OUT time, which are obtained by reproducing the stream object P Item 204-stream (refer to FIG. 24). Then, the post command 126PS shown in FIG. 32 is executed. Moreover, the play list element to be reproduced next is specified in accordance with the next information 126-6N, and the reproduction thereof is repeated in the same manner.

Particularly in the embodiment, in parallel with the reproduction of the stream object P Item 204-stream, shown in FIG. 34, for the main pass, the corresponding sub play (P) Item information 126-subPT, shown in FIG. 33, is also reproduced for the sub pass. Then, in accordance with the ES index number, the IN time and the OUT time obtained by reproducing the sub play (P) Item information 126-subSP, the relevant TS object is reproduced as the sub pass. By these, the button menu explained with reference to FIG. 20 to FIG. 26 is reproduced as the sub pass.

As explained in detail with reference to FIG. 1 to FIG. 34, according to the embodiments, it is possible to efficiently change the display of the button menu, during the reproduction, display and output of the title by the Item, for example, by adopting the button data structure having a plurality of button pages. In addition, by reproducing the button menu by the corresponding Sub Item, and by selectively displaying and outputting the reproduced button menu selectively, it is possible to efficiently display the menu screen, such as the small window and the semitransparent superimpose display, with the title reproduction being continued.

Incidentally, in the above-mentioned embodiments, the explanation is given to the optical disc 100 as an example of the information recording medium and the recorder or player of the optical disc 100 as an example of the information recording/reproducing apparatus. Nevertheless, the present invention is not limited to the optical disc and the player or recorder thereof, but it is applicable to various recording media and the recorders or players thereof, which support other high density recording or high transfer rate.

The present invention is not limited to the above-mentioned embodiments, and various changes may be made, if desired, without departing from the essence or spirit of the invention which can be read from the claims and the entire specification. An information recording medium, an apparatus for and a method of recording the information, an apparatus for and a method of reproducing the information, an apparatus for and a method of recording and reproducing the information, a computer program for recording or reproduction control, and a data structure including a control signal, all of which involves such changes, are also intended to be within the technical scope of the present invention.

INDUSTRIAL APPLICABILITY

An information recording medium, a apparatus for and a method of recording the information, an apparatus for and a method of reproducing the information, an apparatus for and a method of recording and reproducing the information, a computer program for recording or reproduction control, and a data structure including a control signal, all of which are according to the present invention, can be applied to a high-density optical disc for consumer or industrial use, such as a DVD, on which various information, such as the video information, the audio information and the sub-picture information, can be recorded at high density, and further they can be applied to a DVD player, a DVD recorder, and the like. Moreover, they can be applied to an information recording medium, an information recording/reproducing apparatus, or the like, which are mounted on or can be connected to various computer equipment for consumer or industrial use, for example.

The invention claimed is:

1. An information recording medium, readable by a play back unit, on which information recording medium there are recorded information for enabling operation of a play back unit, the recorded information comprising:
   an object data file storing i) a first stream, packetized by a unit of packet, the first stream including video information or still picture information and ii) a second stream, packetized by a unit of packet, the second stream including a plurality of menu information each of which is displayed in response to a user operation and can select a reproduction point of the first stream or a change of reproduction condition of the first stream in response to the user operation;
   a play list information storing i) a plurality of item information each of which specifies the first stream by a unit of an item and ii) a plurality of sub item information each of which specifies the second stream by a unit of a sub item; and
   an object information file including (i) first address table information which is not packetized by a unit of packet and which includes an address of the packet belonging to the first stream which is specified by the item information and (ii) second address table information which is not packetized by a unit of packet and which includes an address of the packet belonging to the second stream which is specified by the sub item information,
   the plurality of item information and the plurality of sub item information being recorded in the play list information independently and separately from each other,
   the object data file, the play list information and the object information file being recorded on the information recording medium independently and separately from each other,
   one menu information of the plurality of menu information specified by the sub item information being superimposed on a display of the first stream during a reproduction of the first stream specified by the item information,
   the first stream and the second stream being recorded such that the reproduction of the video information or the still picture information included in the first stream which is reproduced before the display of the one menu information is kept, by controlling the first stream and the second stream independently and separately, during the one menu information is superimposed,
   said menu information being pre-loaded before reproduction of said video information or said still picture information.

2. The information recording medium according to claim 1, wherein at least one of the plurality of menu information includes button command information for defining the operation.

3. The information recording medium according to claim 1, wherein at least one of the plurality of menu information includes button control information being associated with at least one button image information which is displayed and outputted as a button menu, and for displaying and outputting the button image information.

4. The information recording medium according to claim 1, wherein said second stream is recorded together with said first stream, in a content space in which said first stream is recorded and which occupies one area of a recording area.

5. An information recording apparatus for performing a recording operation with respect to the information recording medium according to claim 1,
   wherein said information recording apparatus records the first stream and the second stream such that the reproduction of the video information or the still picture information included in the first stream which is reproduced before the display of the one menu information is kept, by controlling the first stream and the second stream independently and separately, during the one menu information is superimposed,
   said menu information being read before a reproduction of said video information or said still picture information.

6. An information recording method for performing a recording operation with respect to the information recording medium according to claim 1,
   wherein said information recording method records the first stream and the second stream such that the reproduction of the video information or the still picture information included in the first stream which is reproduced before the display of the one menu information is kept, by controlling the first stream and the second stream independently and separately, during the one menu information is superimposed,
   said menu information being read before a reproduction of said video information or said still picture information.

7. An information reproducing apparatus for performing a recording operation with respect to the information recording medium according to claim 1,
   information reproducing apparatus comprising:
   a first device for reproducing the first stream;
   a second device for displaying the plurality of menu information; and
   instructing device for instructing the display of the plurality of menu information during the reproduction of the first stream,
   information reproducing apparatus superimposing one menu information of the plurality of menu information specified by the sub item information on a display of the first stream during a reproduction of the first stream specified by the item information,
   information reproducing apparatus keeping the reproduction of the video information or the still picture information included in the first stream which is reproduced before the display of the one menu information during the one menu information is superimposed.

8. An information reproducing method for performing a recording operation with respect to the information recording medium according to claim 1,
   said information reproducing method comprising:
   a first process of reproducing the first stream;
   a second process of displaying the plurality of menu information; and
   instructing process of instructing the display of the plurality of menu information during the reproduction of the first stream,
   said information reproducing method superimposing one menu information of the plurality of menu information specified by the sub item information on a display of the first stream during a reproduction of the first stream specified by the item information,
   said information reproducing method keeping the reproduction of the video information or the still picture information included in the first stream which is reproduced before the display of the one menu information during the one menu information is superimposed.

* * * * *